US012110722B2

(12) United States Patent
Scheuring et al.

(10) Patent No.: US 12,110,722 B2
(45) Date of Patent: Oct. 8, 2024

(54) COUNTERBALANCE MECHANISM WITH OPTIONAL WATERSHIELD, KICKER SPRING, FRICTION BEARING, AND FAIL SAFE SPRING RETENTION MECHANISM

(71) Applicant: MAGNA CLOSURES INC., Newmarket (CA)

(72) Inventors: Joseph Scheuring, Richmond Hill (CA); Wieslaw Nowicki, Mississauga (CA)

(73) Assignee: MAGNA CLOSURES INC., Newmarket (CA)

( * ) Notice: Subject to any disclaimer, the term of this patent is extended or adjusted under 35 U.S.C. 154(b) by 155 days.

(21) Appl. No.: 17/554,969

(22) Filed: Dec. 17, 2021

(65) Prior Publication Data

US 2022/0136294 A1 May 5, 2022

Related U.S. Application Data

(63) Continuation of application No. PCT/CA2020/050905, filed on Jun. 29, 2020.
(Continued)

(51) Int. Cl.
*E05F 1/10* (2006.01)
*E05C 17/30* (2006.01)

(52) U.S. Cl.
CPC ............ *E05F 1/1058* (2013.01); *E05C 17/30* (2013.01); *E05Y 2201/218* (2013.01);
(Continued)

(58) Field of Classification Search
CPC ..... E05F 1/1058; E05F 1/1075; E05F 1/1091; E05F 7/06; E05C 17/30; E05Y 2201/218;
(Continued)

(56) References Cited

U.S. PATENT DOCUMENTS 2,661,206 A * 12/1953 Gregoire .................. B60G 3/24 267/286
RE29,545 E 2/1978 Deisenroth
(Continued)

FOREIGN PATENT DOCUMENTS

DE 102021128511 B3 * 11/2022
WO 2013071236 A1 5/2013
(Continued)

*Primary Examiner* — Jeffrey O'Brien

(57) ABSTRACT

A counterbalance mechanism for coupling with a closure panel to assist in opening and closing of the closure panel between a fully closed position and a fully open position of the closure panel, the counterbalance mechanism including: a housing coupled at one end to one of the closure panel and a body of a vehicle by a first connector and at another end by a second connector to the other of the body and the closure panel, the housing containing an extension member and a spring positioned along a longitudinal axis, the spring positioned adjacent to the first connector; the first connector having a body with a connection portion coupled by a connection to an end of the housing positioned at the one end; and a spring retention mechanism for inhibiting extension of the spring out of the one end of the housing, the spring retention mechanism including: a spring retainer positioned between the spring and the end; and a retainer pin positioned between the spring retainer and the end; wherein upon decoupling of the connection portion with the end, the retainer pin inhibits movement of the spring and the spring retainer towards the one end along the longitudinal axis.

12 Claims, 37 Drawing Sheets

Related U.S. Application Data

(60) Provisional application No. 62/870,278, filed on Jul. 3, 2019, provisional application No. 62/868,199, filed on Jun. 28, 2019.

(52) U.S. Cl.
CPC ... *E05Y 2201/264* (2013.01); *E05Y 2201/474* (2013.01); *E05Y 2900/546* (2013.01)

(58) Field of Classification Search
CPC ......... E05Y 2201/265; E05Y 2201/474; E05Y 2201/636; E05Y 2900/546
See application file for complete search history.

(56) References Cited

U.S. PATENT DOCUMENTS

| | | | | |
|---|---|---|---|---|
| 4,367,968 | A * | 1/1983 | Ishida | F16C 11/069 403/379.5 |
| 4,844,567 | A * | 7/1989 | Chalabian | G07F 11/045 49/386 |
| 4,854,558 | A | 8/1989 | Newton | |
| 5,704,569 | A * | 1/1998 | Daniels | B64C 1/1415 74/105 |
| 6,755,458 | B1 | 6/2004 | Oberheide | |
| 7,070,226 | B2 | 7/2006 | Cleland et al. | |
| 7,234,757 | B2 | 6/2007 | Mitchell | |
| 7,546,663 | B2 | 6/2009 | Duffy | |
| 7,556,639 | B2 | 7/2009 | Rothman et al. | |
| 7,566,092 | B2 | 7/2009 | Paton et al. | |
| 7,866,729 | B2 | 1/2011 | Porat et al. | |
| 10,871,019 | B2 | 12/2020 | Scheuring et al. | |
| 11,136,811 | B2 * | 10/2021 | Scheuring | F16H 25/20 |
| 11,840,874 | B2 * | 12/2023 | Scheuring | E05F 3/16 |
| 2008/0201903 | A1 | 8/2008 | Sovis | |
| 2008/0250720 | A1 | 10/2008 | Oxley et al. | |
| 2009/0200830 | A1 | 8/2009 | Paton et al. | |
| 2014/0137477 | A1 * | 5/2014 | Ooe | E05F 15/622 49/358 |
| 2014/0200615 | A1 | 7/2014 | Yeh | |
| 2015/0376929 | A1 | 12/2015 | Scheuring et al. | |
| 2016/0069117 | A1 | 3/2016 | Leonard et al. | |
| 2016/0144694 | A1 | 5/2016 | Shchokin et al. | |
| 2017/0044814 | A1 | 2/2017 | Scheuring et al. | |
| 2019/0017311 | A1 | 1/2019 | McGettrick et al. | |
| 2019/0106925 | A1 | 4/2019 | McCorkell | |
| 2019/0128323 | A1 | 5/2019 | Scheuring et al. | |
| 2019/0169907 | A1 | 6/2019 | Leonard et al. | |
| 2019/0211604 | A1 | 7/2019 | Scheuring et al. | |
| 2019/0211605 | A1 | 7/2019 | Scheuring et al. | |
| 2019/0249477 | A1 * | 8/2019 | Leonard | F16H 25/2454 |
| 2020/0024883 | A1 * | 1/2020 | Scheuring | F16H 25/20 |
| 2020/0123830 | A1 * | 4/2020 | Scheuring | E05F 3/221 |
| 2020/0165856 | A1 | 5/2020 | Scheuring et al. | |
| 2020/0190883 | A1 | 6/2020 | Scheuring et al. | |
| 2020/0308889 | A1 * | 10/2020 | Scheuring | E05F 3/18 |
| 2020/0408025 | A1 | 12/2020 | Zeabari et al. | |

FOREIGN PATENT DOCUMENTS

| | | | |
|---|---|---|---|
| WO | 2014043780 | A1 | 3/2014 |
| WO | 2015061885 | A1 | 5/2015 |
| WO | 2020220114 | A1 | 11/2020 |
| WO | 2020257949 | A1 | 12/2020 |

* cited by examiner

COUNTERBALANCE MECHANISM WITH OPTIONAL WATERSHIELD, KICKER SPRING, FRICTION BEARING, AND FAIL SAFE SPRING RETENTION MECHANISM

CROSS-REFERENCE TO RELATED APPLICATIONS

The application is a continuation of PCT PCT/CA2020/050905, filed Jun. 29, 2020, which claims priority to U.S. Provisional Patent Application No. 62/870,278, filed Jul. 3, 2019, and U.S. Provisional Patent Application No. 62/868,199, filed Jun. 28, 2019, and Chinese Patent Application no. 201910614271.9, filed Jul. 9, 2019, the contents of which are hereby incorporated herein by reference.

FIELD

This disclosure relates to a counterbalance system for a closure panel.

BACKGROUND

Some vehicles are equipped with a closure panel, such as a lift gate, which is driven between an open position (position 2) and a closed position (position 1) using an electric drive system. Hold systems have been proposed to provide such vehicles with the capability of assisting the operator of the closure panel, in order to maintain a third position hold (or position 2) during opening and closing operations, so as to help counteract the weight of the closure panel itself. Without these hold systems, the closure panel may sag back down at the top end of the operational opening range due to the closure panel weight providing a closure torque greater than an opening torque provided by the electric drive system. Such proposed hold systems are, in some instances, complex and expensive and may not offer adequate failsafe modes (in the event of electric motor failure or loss of power) while at the same time maintaining adequate manual efforts by the operator. Also recognized is a need to provide a counterbalance mechanism that can offer efficient counterbalance force customization for different closure panel weights and configurations (e.g. differing centers of gravity), including the ability to accommodate for third position hold or stop and hold functionality of the closure panel.

Further disadvantages of current hold systems include bulky form factors which take up valuable vehicle cargo space, requirement to have additional lift support systems in tandem such as gas struts and other counterbalance mechanisms, unacceptable impact on manual open and close efforts requiring larger operator applied manual force at the panel handle, and oversized electronic motors to assist in initial opening of the closure panel.

Further disadvantages for current counterbalance mechanisms can include safety issues with contained coil springs being expelled from the spindle tube should the ball socket connection with the tube fail. This type of failure can happen during testing and assembly, but also during an accident, or if there is a defect in the connection with the ball socket.

Further disadvantages for current spindle or counterbalance mechanisms can include in a gate close position, with the spindle installed with the motor in the lower position, water may leak between the spring cover and outer tube to the motor and gear box ultimately damaging the motor and gear box.

Further disadvantages for current spindle or counterbalance mechanisms can include using electromechanical power actuators to provide a “stop and hold” lift gate function throughout the entire range of pivotal lift gate travel, regardless of environmental conditions and the vehicle grade. Typically, friction is associated with the spindle-type drive mechanism, such as back-drive friction which can be added to the spindle-type drive mechanism by increasing the gear ratio associated with the reduction gearbox or by reducing the lead of the rotary power screw associated with the spindle-type drive mechanism. However, increasing these ratios also increases the motor size and speed requirements which can ultimately result in undesirable noise and back-EMF being generated by the motor during a manual closing of the lift gate. Further disadvantages for current spindle or counterbalance mechanisms can include using springs to provide counterbalancing for “stop and hold” lift gate function throughout the entire range of pivotal lift gate travel, regardless of environmental conditions and the vehicle grade. Typically, counterbalance springs function throughout the entire range of pivotal lift gate travel, and may cause noise during their extension and retraction.

A need therefore exists for an improved methods, devices and system from moving closure members in motor vehicles and other devices. Accordingly, a solution that addresses, at least in part, the above-noted shortcomings and advances the art is desired.

SUMMARY

It is an object of the present invention to provide a counterbalance mechanism that obviates or mitigates at least one of the above presented disadvantages.

A first aspect provided is a counterbalance mechanism for coupling with a closure panel to assist in opening and closing of the closure panel between a closed position and an open position of the closure panel, the counterbalance mechanism including: a housing coupled at one end to one of the closure panel and a body of a vehicle by a first connector and at another end by a second connector to the other of the body and the closure panel, the housing containing an extension member and a spring positioned along a longitudinal axis, the spring positioned adjacent to the first connector; the first connector having a body with a connection portion coupled by a connection to an end of the housing positioned at the one end; and a spring retention mechanism for inhibiting extension of the spring out of the one end of the housing, the spring retention mechanism including: a spring retainer positioned between the spring and the end; and a retainer pin positioned between the spring retainer and the end; wherein upon decoupling of the connection portion with the end, the retainer pin inhibits movement of the spring and the spring retainer towards the one end along the longitudinal axis.

A second aspect provided is a method for providing a counterbalance mechanism for a closure panel of a vehicle, the method including the steps of: providing a first connector at an end of a housing containing a spring extending along a longitudinal axis of the housing; providing a connection between the end and a body of the connector; and installing a spring retention mechanism between the spring and the end in order to inhibit extension of the spring in the event of failure of the connection.

A still further aspect for a counterbalance mechanism is a connection between an end and a body of a connector, such that the connection is a shear connection comprising a hole in a connection portion of the body aligned with a hole in an extension member positioned along the longitudinal axis, such that a shear pin is positioned in the holes.

A still further aspect is a counterbalance mechanism for coupling with a closure panel to assist in opening and closing of the closure panel between a closed position and an open position of the closure panel, the counterbalance mechanism including: a housing coupled at one end to one of the closure panel and a body of a vehicle by a first connector and at another end by a second connector to the other of the body and the closure panel, the housing containing an extension member and a spring positioned along a longitudinal axis, the spring positioned adjacent to the first connector; the first connector having a body with a connection portion coupled by a connection to an end of the housing positioned at the one end; and a spring retention mechanism positioned between the spring and the end for inhibiting extension of the spring out of the one end of the housing upon decoupling of the connection portion with the end.

A still further aspect provided is a counterbalance mechanism for coupling with a closure panel to assist in opening and closing of the closure panel between a closed position and an open position of the closure panel, the counterbalance mechanism including: a housing coupled at one end (60) to one of the closure panel and a body of a vehicle by a first connector and at another end by a second connector to the other of the body and the closure panel, the housing containing an extension member and a spring positioned along a longitudinal axis, the spring positioned adjacent to the first connector; the first connector having a body with a connection portion coupled by a connection to an end of the housing positioned at the one end; and a spring retention mechanism positioned between the spring and the end for inhibiting extension of the spring out of the one end of the housing upon decoupling of the connection portion with the end; wherein the spring retention mechanism has a predisposed failure point greater than the predisposed failure point of the connection portion.

In accordance with another aspects, there is provided a friction bearing mechanism for coupling with a counterbalance mechanism of a closure panel of a vehicle, the friction bearing mechanism including: a bearing housing defining a longitudinal axis; an outer collar positioned within the bearing housing and about the longitudinal axis; an inner collar positioned within the bearing housing between the outer collar and the longitudinal axis; one or more bearings mounted in a bearing cage and positioned between the inner collar and the outer collar, such that the inner collar is rotatable relative to the outer collar about the longitudinal axis; and one or more friction elements positioned between the inner collar and the outer collar adjacent to the one or more bearings, the one or more friction elements biased into engagement with a friction surface of the inner collar; wherein relative rotation of the inner collar with respect to the outer collar causes generation of a friction force between the one or more friction elements and the friction surface.

According to a related aspect, the bearing housing is mounted within a housing of the counterbalance mechanism.

According to a related aspect, the friction bearing mechanism further includes a lead screw connected to the inner collar, such that rotation of the lead screw causes said relative rotation of the inner collar.

According to a related aspect, the friction bearing mechanism further includes an extensible member positioned in an upper housing of the housing along the longitudinal axis and mounted to a travel member coupled to one end of the lead screw.

According to a related aspect, the friction bearing mechanism further includes a bearing cap positioned between the inner collar and the outer collar, such that the one or more friction elements are mounted on the bearing cap.

According to a related aspect, the biased into engagement is provided by a positioning of the outer collar in the housing by a friction fit between the outer collar and the bearing housing.

According to a related aspect, the one or more friction elements are comprised of a resilient material.

According to a related aspect, the resilient material is rubber.

According to a related aspect, the one or more friction elements are of a serpentine shape to facilitate said biased into engagement.

In accordance with yet another aspect, there is provided a method for operating a friction bearing mechanism of a counterbalance mechanism including the steps of: mounting a bearing housing on a lead screw of the counterbalance mechanism, the lead screw defining a longitudinal axis, the bearing housing having an outer collar positioned within the bearing housing and about the longitudinal axis and an inner collar positioned within the bearing housing between the outer collar and the longitudinal axis; providing relative movement about the longitudinal axis between the inner collar and the outer collar by one or more bearings mounted in a bearing cage and positioned between the inner collar and the outer collar; and generating a friction force between one or more friction elements and a friction surface of the inner collar during said relative movement, the one or more friction elements positioned between the inner collar and the outer collar adjacent to the one or more bearings, the one or more friction elements biased into engagement with the friction surface of the inner collar.

In accordance with yet another aspect, there is provided a method for operating a friction bearing mechanism of a counterbalance mechanism may also be provided including the steps of: mounting a bearing housing on a rotatable member of the counterbalance mechanism, the rotatable member defining a longitudinal axis, the bearing housing having an outer collar positioned within the bearing housing and about the longitudinal axis and an inner collar positioned within the bearing housing between the outer collar and the longitudinal axis, providing relative movement about the longitudinal axis between the inner collar and the outer collar via one or more bearings positioned between the inner collar and the outer collar, and generating a friction force between one or more friction elements and a friction surface of at least one of the inner collar and the outer collar during said relative movement, the one or more friction elements positioned between the inner collar and the outer collar, the one or more friction elements biased into engagement with the friction surface of the inner collar.

In accordance with yet another aspect, there is provided a friction bearing mechanism for coupling with a counterbalance mechanism of a closure panel of a vehicle, the counterbalance mechanism comprising a first component and a second component rotatable relative to each other the friction bearing mechanism including: an outer collar coupled to one of the first and second component about a longitudinal axis; an inner collar positioned between the outer collar and the longitudinal axis; one or more bearings positioned between the inner collar and the outer collar, such that the inner collar is rotatable relative to the outer collar about the longitudinal axis; and one or more friction elements biased into engagement with a friction surface of at least one of the inner collar and the outer collar; wherein relative rotation of the inner collar with respect to the outer collar causes generation of a friction force between the one or more friction elements and the friction surface.

In accordance with yet another aspect there is provided a counterbalance mechanism having a friction bearing mechanism as substantially shown and described herein.

In accordance with yet another aspect there is provided a power actuator having a friction bearing mechanism as substantially shown and described herein.

In accordance with another aspects, there is provided a friction bearing mechanism for coupling with a counterbalance mechanism of a closure panel of a vehicle, the friction bearing mechanism including: a bearing housing defining a longitudinal axis; an outer collar positioned within the bearing housing and about the longitudinal axis; an inner collar positioned within the bearing housing between the outer collar and the longitudinal axis; one or more bearings mounted in a bearing cage and positioned between the inner collar and the outer collar, such that the inner collar is rotatable relative to the outer collar about the longitudinal axis; and one or more friction elements positioned between the outer collar and a shaft coupled to the inner collar along the longitudinal axis, the one or more friction elements biased into engagement with a friction surface of the shaft; wherein relative rotation of the inner collar with respect to the outer collar causes generation of a friction force between the one or more friction elements and the friction surface.

In accordance with yet another aspect, there is provided a counterbalance mechanism for coupling with a closure panel to assist in opening and closing of the closure panel between a fully closed position and a fully open position of the closure panel, the counterbalance mechanism including: a housing coupled at one end to one of the closure panel and a body of a vehicle by a first connector and at another end by a second connector to the other of the body and the closure panel; the first connector having an end cap with a receiving portion including threading positioned in an interior of the housing; and a resilient element coupled at one end to the threading in order to establish a threaded connection between the resilient element and the receiving portion.

It is a further object of the present invention to provide a watershield that obviates or mitigates at least one of the above presented disadvantages.

A further aspect provided is a biasing member for coupling with a closure panel to assist in opening and closing of the closure panel between a fully closed position and a fully open position of the closure panel, the biasing member including: a housing coupled at one end to one of the closure panel and a body of a vehicle by a first connector and at another end by a second connector to the other of the body and the closure panel, the housing having an inner tube positioned adjacent to an outer tube, such that outer tube extends and retracts along a longitudinal axis with respect to the inner tube during operation of the biasing member; and a water shield connected adjacent to an end of the inner tube, such that an overlap portion of the water shield overlaps with a portion of an exterior surface of the outer tube when the outer tube is in a retracted position with respect to the inner tube, the water shield spaced apart by a gap from the exterior surface to inhibit contact between the water shield and the exterior surface during said operation of the biasing member.

A further aspect provided is a method for providing a water shield for a biasing member of a closure panel of a vehicle, the method including the steps of: providing a housing coupled at one end to one of the closure panel and a body of a vehicle and at another end to the other of the body and the closure panel, the housing having an inner tube positioned adjacent to an outer tube, such that outer tube extends and retracts along a longitudinal axis with respect to the inner tube during operation of the biasing member providing a water shield connected adjacent to an end of the inner tube, such that an overlap portion of the water shield overlaps with a portion of an exterior surface of the outer tube when the outer tube is in a retracted position with respect to the inner tube; and implementing said extends and retracts along the longitudinal axis while maintaining a gap between the exterior surface and the water shield in order to inhibit contact between the water shield and the exterior surface during said operation of the biasing member.

Other aspects, including methods of operation, and other embodiments of the above aspects will be evident based on the following description and drawings.

BRIEF DESCRIPTION OF THE DRAWINGS

Reference is made, by way of example only, to the attached figures, wherein.

DETAILED DESCRIPTION OF EXAMPLE EMBODIMENTS

Figure 1:
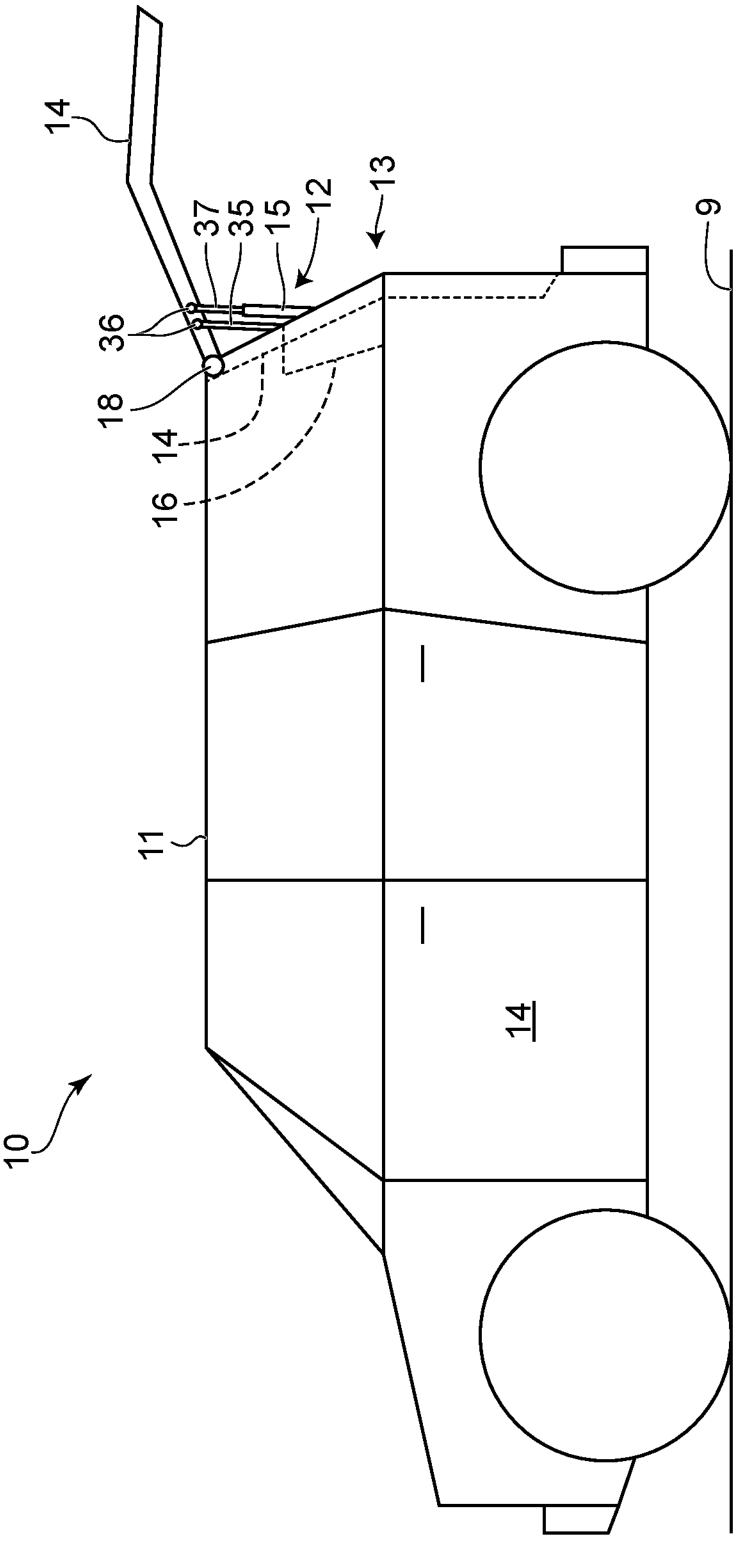
FIG. 1 is a side view of a vehicle with a closure panel assembly.

In this specification and in the claims, the use of the article "a", "an", or "the" in reference to an item is not intended to exclude the possibility of including a plurality of the item in some embodiments. It will be apparent to one skilled in the art in at least some instances in this specification and the attached claims that it would be possible to include a plurality of the item in at least some embodiments. Likewise, use of a plural form in reference to an item is not intended to exclude the possibility of including one of the item in some embodiments. It will be apparent to one skilled in the art in at least some instances in this specification and the attached claims that it would be possible to include one of the item in at least some embodiments.

Provided is a spring retention mechanism 6 (see FIG. 4) for a counterbalance mechanism 15 that can be used advantageously with vehicle closure panels 14 to provide for open and close fail safe modes in the event of power actuator failure or disconnection, in particular for land-based, sea-based and/or air-based vehicles 10. Other applications of the counterbalance mechanism 15, in general for closure panels 14 both in and outside of vehicle 10 applications, include advantageously assisting in optimization of overall hold and manual effort forces for closure panel 14 operation, noise reduction and spring seating, and sealing against the ingress of water into the counterbalance mechanism 15. It is recognized as well that the counterbalance mechanism 15 examples provided below can be used advantageously as the sole means of open and close assistance for closure panels 14 or can be used advantageously in combination (e.g. in tandem) with other closure panel biasing members (e.g. spring loaded hinges, biasing struts, etc.). In particular, the counterbalance mechanism 15 can be friction based and used to provide a holding force (or torque) for the closure panel, as further described below. Further, it is recognized that the counterbalance mechanism 15 can be integrated with a biasing member 37 such as a spring loaded strut and/or provided as a component of a closure panel assembly, as further described below. It is recognized that the biasing member 37, incorporating the friction based counterbalance mechanism 15, can be implemented as a strut (see FIGS. 2, 3, 25A, 25B as an example type of strut). The strut can be of a biasing type (e.g. spring and/or gas charge supplying the bias). The strut can be of an electromechanical type (e.g. driven by an optional integrated motor assembly with spring and/or gas charge supplying a bias).

Figure 2:
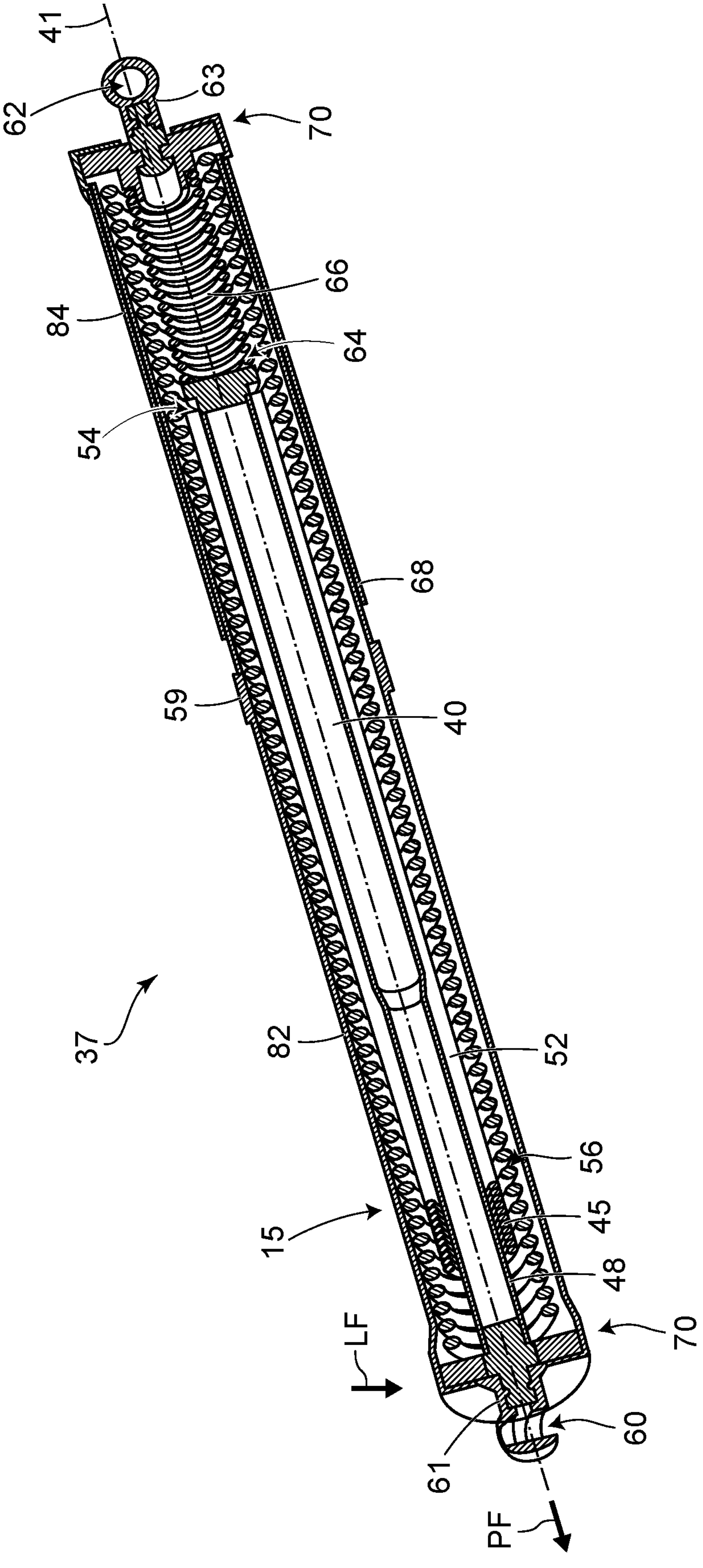
FIG. 2 is an example counterbalance mechanism of the closure panel assembly shown in FIG. 1 or 2.
Figure 2A:
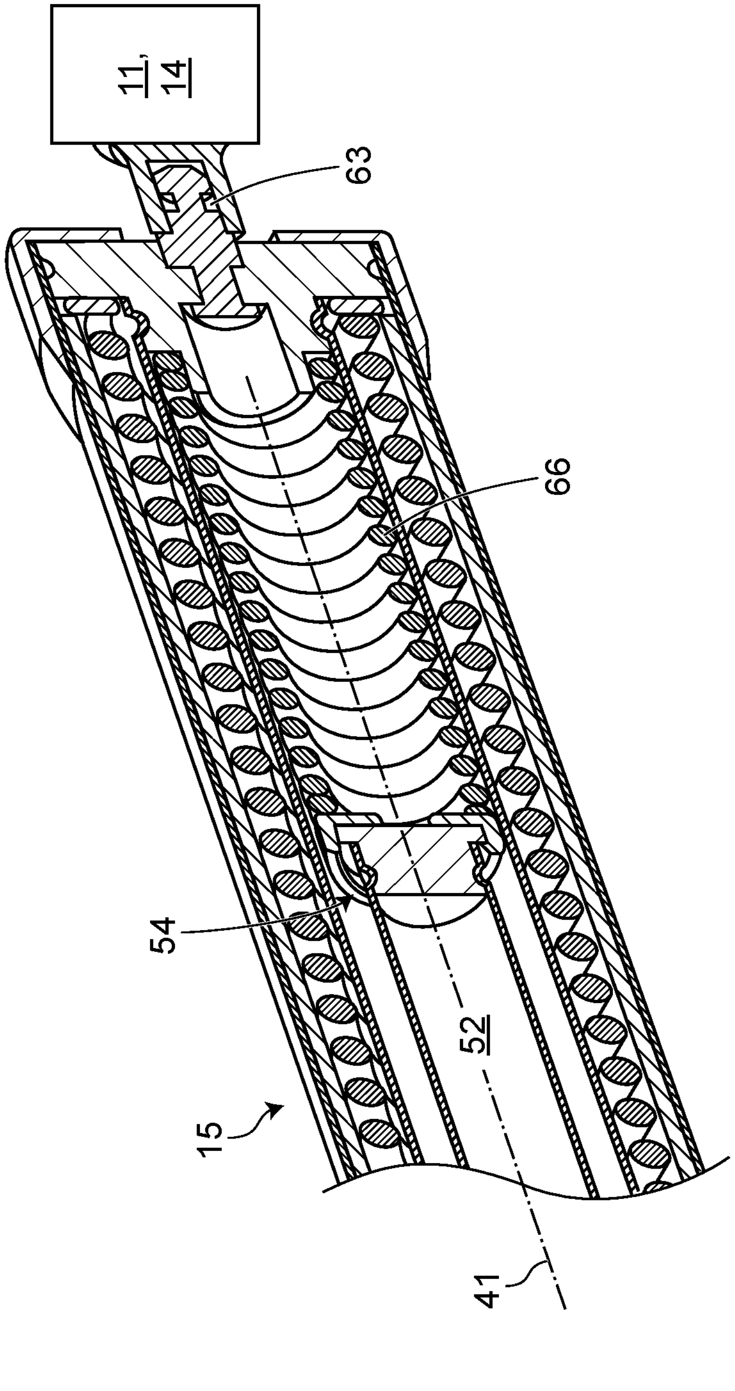
FIG. 2A is an example counterbalance mechanism of the closure panel assembly shown in FIG. 1 or 2 configured with a kicker spring, in accordance with an illustrative embodiment.
Figure 3:
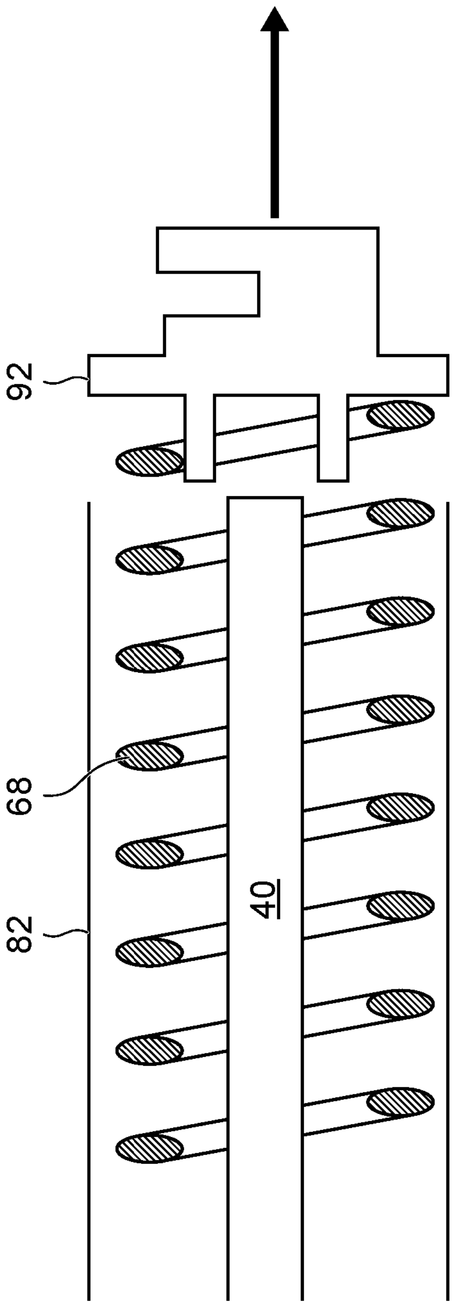
FIG. 3 shows a cross section of a portion of the counterbalance mechanism shown in FIG. 2 without a spring retention mechanism.

Referring to FIG. 1, shown is a vehicle 10 with a vehicle body 11 having one or more closure panels 14. One example configuration of the closure panel 14 is a closure panel assembly 12 including a counterbalance mechanism 15 (e.g. incorporated in a biasing member 37 embodied as a strut by example) and an optional closure panel drive system 16 (e.g. incorporating an electrically powered motor/drive). For vehicles 10, the closure panel 14 can be referred to as a partition or door, typically hinged, but sometimes attached by other mechanisms such as tracks, in front of an opening 13 which is used for entering and exiting the vehicle 10 interior by people and/or cargo. It is also recognized that the closure panel 14 can be used as an access panel for vehicle 10 systems such as engine compartments and also for traditional trunk compartments of automotive type vehicles 10. The closure panel 14 can be opened to provide access to the opening 13, or closed to secure or otherwise restrict access to the opening 13. FIGS. 1 and 2 illustrate example of the closure panel 14 as a liftgate, and the opening 13 as a rear opening for access to a rear storage compartment. It is also recognized that there can be one or more intermediate hold positions of the closure panel 14 between a fully open position and fully closed position, as provided at least in part by the counterbalance mechanism 15 as further described below. For example, the counterbalance mechanism 15 can assist in biasing movement of the closure panel 14 away from one or more intermediate hold position(s), also known as Third Position Hold(s) (TPHs) or Stop-N-Hold(s), once positioned therein. It is also recognized that the counterbalance mechanism 15 can be provided as a component of the closure panel assembly 12, such that the counterbalance mechanism 15 component can be separate from the one or more biasing struts 37.

The closure panel 14 can be opened manually and/or powered electronically via the closure panel drive system 16, where powered closure panels 14 can be found on minivans, high-end cars, or sport utility vehicles (SUVs) and the like. Additionally, one characteristic of the closure panel 14 is that due to the weight of materials used in manufacture of the closure panel 14, some form of force assisted open and close mechanism (or mechanisms) are used to facilitate operation of the open and close operation by an operator (e.g. vehicle driver) of the closure panel 14. The force assisted open and close mechanism(s) is/are provided by the counterbalance mechanism 15, any biasing members 37 (e.g. spring loaded hinges, spring loaded struts, gas loaded struts, electromechanical struts, etc.) and the closure panel drive system 16 when used as part of the closure panel assembly 12, such that the counterbalance mechanism 15 can be configured to provide a holding torque (or force) that acts against the weight of the closure panel 14 on at least a portion of the panel open/close path about the third position hold, in order to help maintain the position of the closure panel 14 about the third position hold.

As discussed above, the counterbalance mechanism 15 is also configured to provide an opening torque (also referred to as an opening force) that acts against the weight of the closure panel 14 to bias the closure panel 14 towards the open position. Therefore it is recognized advantageously that the counterbalance mechanism 15 is configured to provide an opening torque (or force) that acts against the weight of the closure panel 14 to bias the closure panel 14 towards the open position (e.g. biased away from the fully closed position and towards the open position) and can also provide a closing torque (also referred to as a closing force) that acts with the weight of the closure panel 14 to bias the closure panel 14 towards the closed position (e.g. biased away from the fully open position and towards the closed position). Discussion of the spring retention mechanism 6 of the counterbalance mechanism 15 is configured is provided further below.

In terms of vehicles 10, the closure panel 14 may be a lift gate as shown in FIG. 1, or it may be some other kind of closure panel 14, such as an upward-swinging vehicle door (i.e. what is sometimes referred to as a gull-wing door) or a conventional type of door that is hinged at a front-facing or back-facing edge of the door, and so allows the door to swing (or slide) away from (or towards) the opening 13 in the body 11 of the vehicle 10. Also contemplated are sliding door embodiments of the closure panel 14 and canopy door embodiments of the closure panel 14, such that sliding doors can be a type of door that open by sliding horizontally or vertically, whereby the door is either mounted on, or suspended from a track that provides for a larger opening 13 for equipment to be loaded and unloaded through the opening 13 without obstructing access. Canopy doors are a type of door that sits on top of the vehicle 10 and lifts up in some way, to provide access for vehicle passengers via the opening 13 (e.g. car canopy, aircraft canopy, etc.). Canopy doors can be connected (e.g. hinged at a defined pivot axis and/or connected for travel along a track) to the body 11 of the vehicle at the front, side or back of the door, as the application permits. Other types of closure panels 14 are contemplated such as trunks and frunks for example and without limitation.

Referring again to FIG. 1, in the context of a vehicle application of a closure panel by example only, the closure panel 14 is movable between a closed position (shown in dashed outline) and an open position (shown in solid outline). In the embodiment shown, the closure panel 14 pivots between the open position and the closed position about a pivot axis 18, which is preferably configured as horizontal or otherwise parallel to a support surface 9 of the vehicle 10. In other embodiments, the pivot axis 18 may have some other orientation such as vertical or otherwise extending at an angle outwards from the support surface 9, for example ground plane, of the vehicle 10. In still other embodiments, the closure panel 14 may move in a manner other than pivoting, for example, the closure panel 14 may translate along a predefined track or may undergo a combination of translation and rotation between the open and closed position.

Referring again to FIG. 1, as discussed above, the counterbalance mechanism 15 examples provided below for the closure panel assembly 12 can be used as the sole means of open and close assistance for the inhibition of sag by the closure panels 14 themselves, or can be used in combination (e.g. in tandem or otherwise integrated) with one or more other closure panel biasing members 37 (e.g. spring loaded hinges, struts such as gas struts or spring loaded struts, etc.) that provide a primary connection of the closure panel 14 to the vehicle body 11 at a pivot connection 18,36 (see FIG. 1). In general operation of the closure panel 14, the closure panel drive system 16 can be coupled to a distal end of a link rod 35 (also referred to as lever mechanism or arm or element) used to connect the closure panel 14 as a secondary connection of the closure panel to the vehicle body 11, such that the closure panel biasing member 37 and the link rod 35 can be pivotally attached to the closure panel 14 at spaced apart locations as shown. In this manner, the other end of the link rod 35 pivotally connects to the closure panel 14 at pivot connection 36. It is recognized that the link rod 35 itself can be configured as a non-biasing element (e.g. a solid rod) or can be configured as a biasing element (e.g. a gas or spring assisted extension strut), as desired.

Referring again to FIG. 1, one or more optional closure panel biasing members 37 can be provided which urge the closure panel 14 towards the open position throughout at least some portion of the path between the open position and the closed position and which assist in holding the closure panel 14 in the open position. The closure panel biasing members 37 can be, for example, gas extension struts which are pivotally connected at their proximal end to the closure panel 14 and at their distal end to the vehicle body 11. In the embodiment shown, there are two biasing members 37 (one on the left side of the vehicle 10 and one on the right side of the vehicle 10), however one biasing member 37 is obscured by the other in the view shown.

Figure 21:
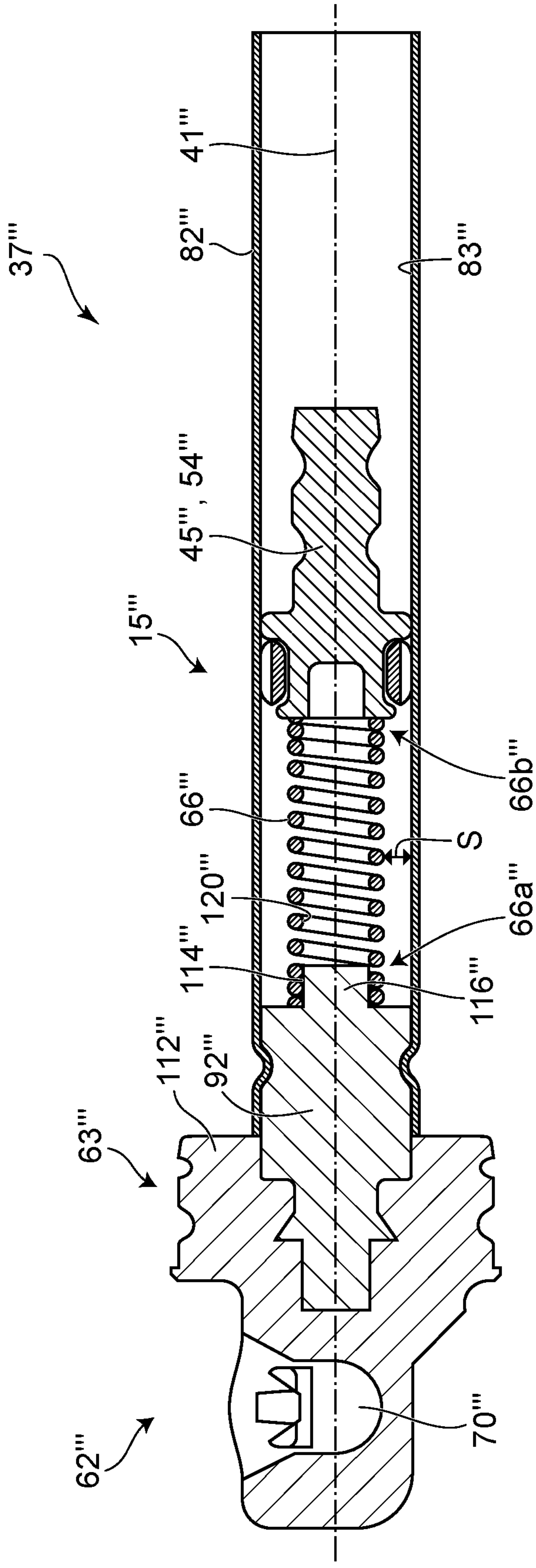
FIG. 21 shows an embodiment, in cross section, of a connection between a resilient element and an end connector of the counterbalance mechanism shown in FIG. 2.

Referring to FIGS. 2, 4, 5 and 6, shown is an example configuration of the counterbalance mechanism 15 including an extension member 40 (e.g. rod, tube, etc.) defining a longitudinal axis 41. The extension member 40 can have a travel member 45 (as a friction producing element) with varying contact surface area between the travel member 45 (as a friction mechanism) and the extension member 40, and/or varying contact pressure between the travel member 45 and the extension member 40, relying upon friction elements 48. A support member 52 can be coupled to the closure panel 14 (see FIG. 1) or the vehicle body 11 at a distal end 54 (adjacent to a resilient element 66, such as a kicker spring for example) and coupled to the travel member 45 at a proximal end 56, thus providing for the relative motion of the travel member 45 along the longitudinal axis 41. The resilient element 66 may in one possible configuration coupled to a second connector 63 using a threaded connection 114 as illustrated in FIG. 21, and as will be further described herein below in greater details. Alternatively, the support member 52 can be provided as a lead screw, not shown, and as such the travel member 45 rotates about and along the lead screw as the travel member 45 travels along the longitudinal axis 41.

Referring again to FIGS. 2, 4, 5 and 6, shown is a biasing element 37 referred to as a biasing strut with a body 59 having a first end 60 (e.g. having a first connector 61 such as a ball joint having a ball or socket 70) for connecting to a closure panel 14 (or a vehicle body/frame 11) and a second end 62 (e.g. having a second connector 63 such as a ball joint having a ball or socket 70) for connecting to a vehicle body/frame 11 (or a closure panel 14), depending upon the configuration orientation of the biasing element 37 when installed in the closure panel system 12 (see FIG. 1). It is recognized that as the counterbalance mechanism 15 is operated, the ends 60, 62 either extend or retract with respect to one another along the longitudinal axis 41. As shown in FIG. 2, the counterbalance mechanism 15 can be subject to pulling, illustrated using the reference PF, (or pushing forces) along the longitudinal axis 41 as well as lateral forces illustrated using reference LF with respect to the longitudinal axis 41. The forces are subjected to the ball joint/socket 70 at the end 60 and thus can lead to premature failure of the ball joint/socket 70 (i.e. of first connector 61) and thus cause undesirable separation of the ball joint/socket 70 from a sliding tube 82 during operation of the counterbalance mechanism 15 (see FIG. 7).

In this configuration, the counterbalance mechanism 15, by example only, has the extension member 40 positioned in an interior 64 (of the sliding tube 82) of the body 59 and the travel member 45 coupled to the proximal end 56 of the support member 52. The distal end of 54 the support member 52 is coupled to the second end 62 (for example via a resilient element 66—also referred to as a kicker spring) of the biasing element 37 (e.g. strut) and the proximal end 48 of the extension member 40 is coupled to the other end 60. The distal end of 54 the support member 52 may in one configuration be non-permanently coupled coupled to the second end 62 via the resilient element 66—such that the kicker spring only influences the extension or retraction of the biasing element 37 (e.g. strut) for a certain travel e.g. an initial "kick" between fully retracted and partially extended states of the biasing element 37. As shown by example, the biasing element 37 can be a strut having a resilient element of a spring 68 for contributing to the counterbalance torque during operation of the closure panel 14 in moving between the open and closed positions (see FIG. 1).

Figure 6:
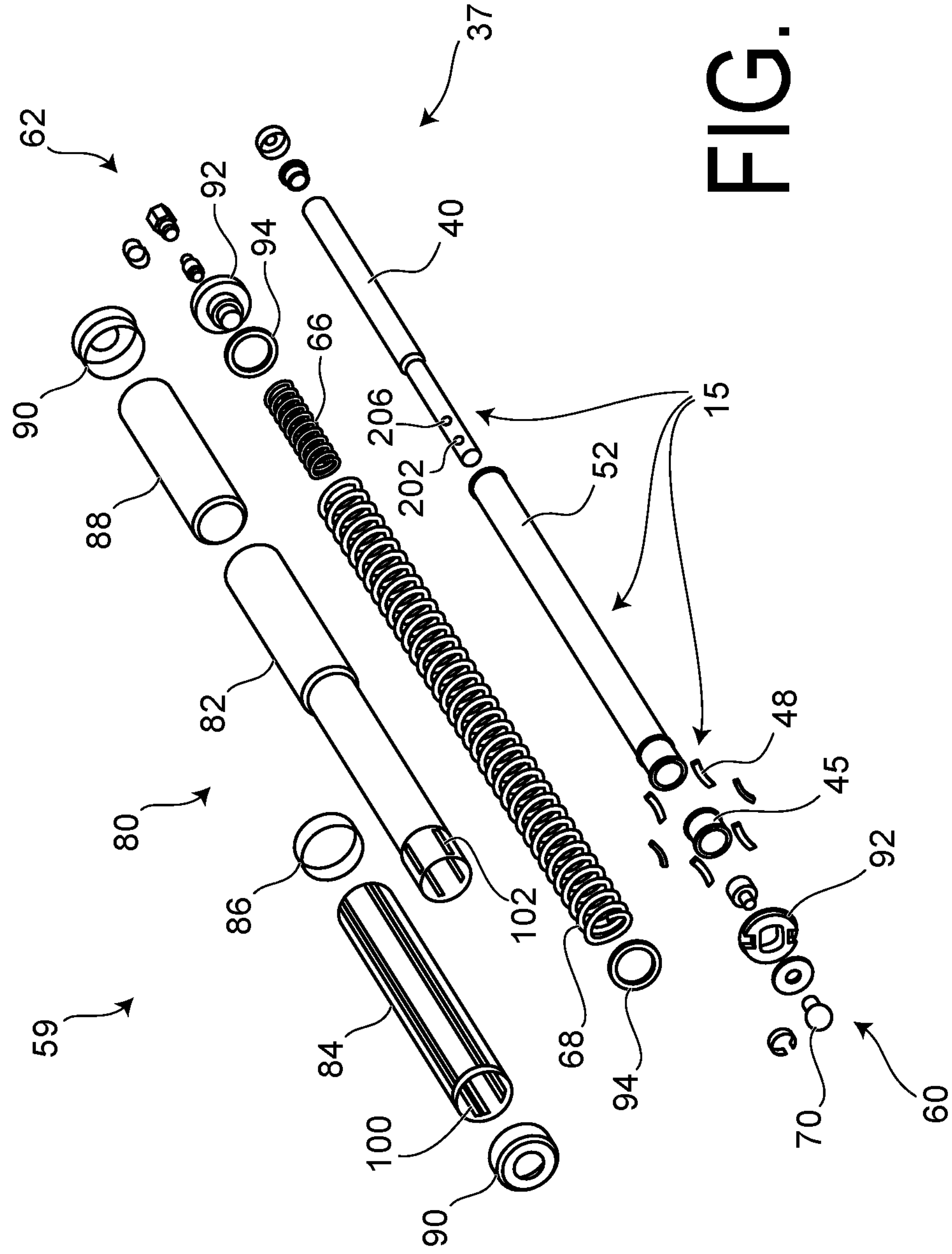
FIG. 6 is an exploded view of the biasing strut of FIG. 2.

Referring to FIG. 6, shown is the biasing strut 37 example for housing the counterbalance mechanism 15. The body 59 of the biasing strut is composed of a number of body elements 80 for facilitating extension and compression of the body 59 during operation of the closure panel 14 between the open and closed positions (see FIG. 1), thereby providing for the body 59 to act as a protective housing for the internal components (e.g. springs 66, 68) of the biasing strut 37 and the enclosed counterbalance mechanism 15. The body 59 can have the optional body elements 80 of a cover tube 84, a sliding tube 82, a sliding cover 86, a filler tube 88, and end covers 90. The elements of the biasing strut 37 example for housing the counterbalance mechanism 15 of FIGS. 2 and 6 may be further referred to herein in the context of the other illustrative embodiments and examples using the same reference numbers of FIGS. 2 and 6 but offset by factors of prime (e.g. ", "', "") denoting likely named elements for convenience.

Internally, the spring 68 can be mounted between end caps 92 (part of the first 61 and second 63 connectors) via spring seats 94 (also referred to as a spring retainer 94 as further described below; see FIG. 7C for example). Also shown are a series of splines 100 on the sliding tube 82 configured to cooperate with mating splines 102 on cover tube 84, thus providing for inhibiting of rotation between the component parts of the biasing strut 37 as the biasing strut is operated between the open and closed positions of the closure panel 14. It is recognized that the sliding tube 82 moves (e.g. extends) along the longitudinal axis 41 as the counterbalance mechanism 15 operates, thus providing for extension and retraction of the sliding tube 82 with respect to the cover tube 84.

Figure 4:
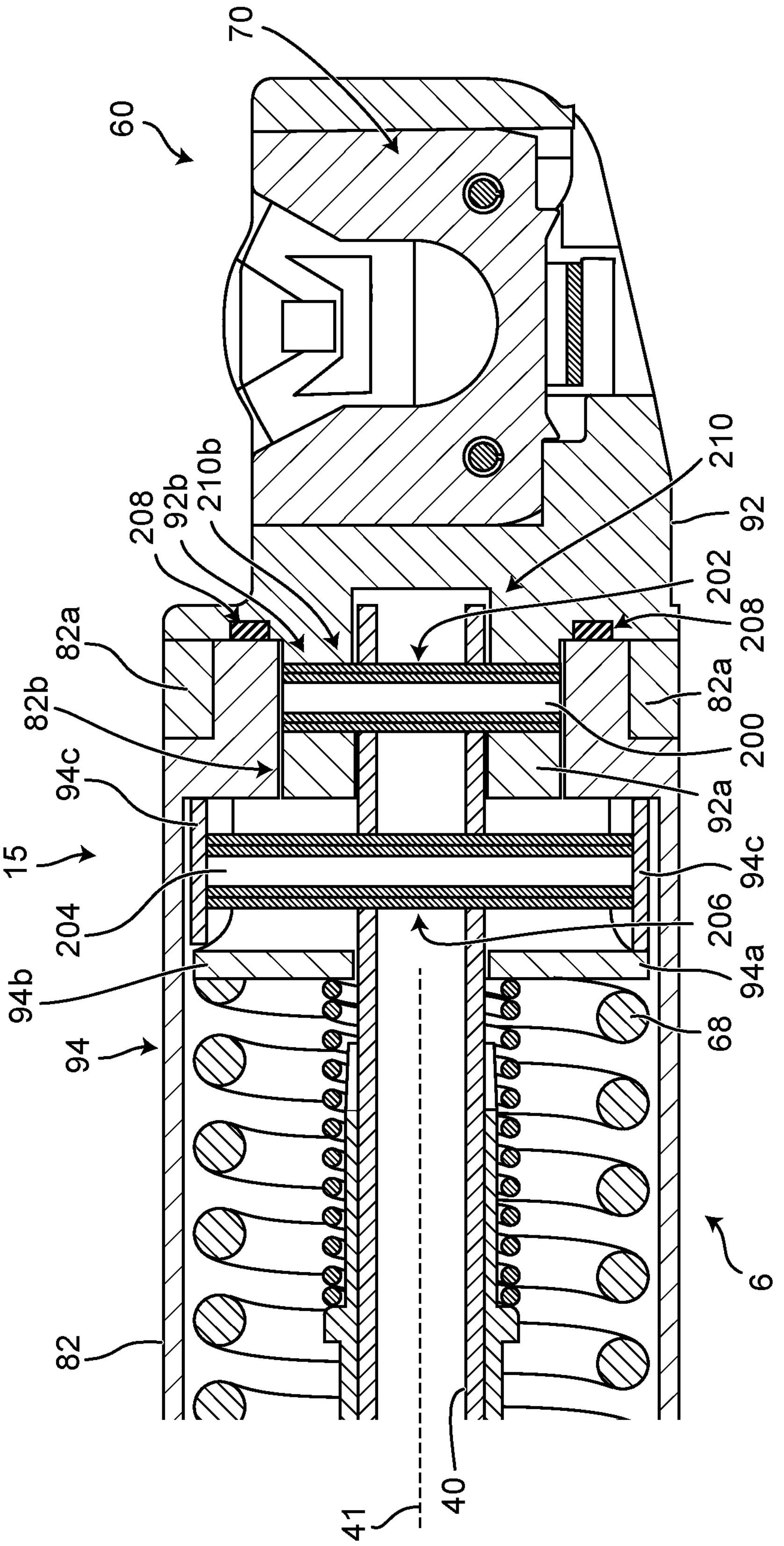
FIG. 4 is a cross sectional view of an assembled spring retention mechanism of the counterbalance mechanism of FIG. 2.
Figure 5:
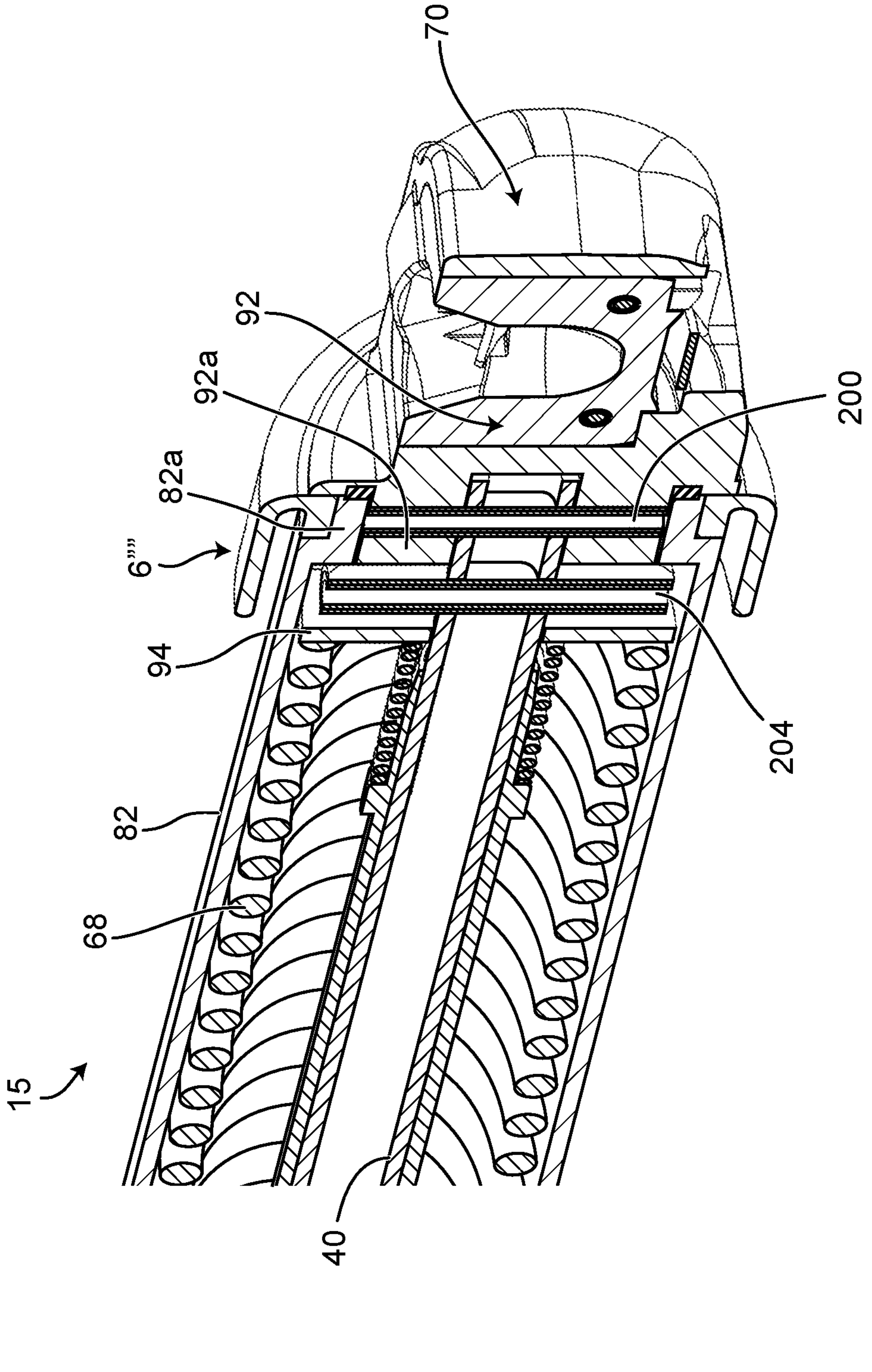
FIG. 5 is a cross sectional perspective view of the assembled spring retention mechanism of FIG. 4.

Referring to FIG. 4, the sliding tube 82 has an end **82*a* having an aperture 82*b* for receiving a connection portion 92*a* of the endcap 92 (also considered a body 92 of the ball joint 70 or ball socket as the case may be of the end 60). The connection portion 92*a* can have a connection 210 to the end 82*a* by a crimp connection 210*a* (see FIG. 7*a*), or as shown by example in FIG. 4 by a connection 210*b* as a shear pin 200 inserted in a hole 202 of the extension member 40. For example, the connection portion 92*a* can also have a mating hole 92*b* aligned with the hole 202, such that once aligned, the shear pin 200 can be inserted into the holes 92*b*, 202 to thus couple the body 92 of the ball joint 70 to the counterbalance mechanism 15. It is recognized that the shear pin 200 may not be connected (i.e. disconnected) with the sliding tube 82, as shown in FIG. 4 by example. It is recognized that the sliding tube 82 can also be referred to as an extension portion 82 of the counterbalance mechanism 15. Further, the cover tube 84 can be referred to as a housing 84 of the counterbalance mechanism, such that the extension portion 84 extends/retracts with respect to the housing 84**.

As such, it is recognized that the connection 210 between the connection portion **92*a* of the ball joint/socket 70 can be provided in one embodiment as a crimp connection 210*a* as is known in the art. As such, it is recognized that the connection 210 between the connection portion 92*a* of the ball joint/socket 70 can be provided in a further embodiment as a screw type connection (not shown) as is known in the art. As such, it is recognized that the connection 210 between the connection portion 92***a* of the ball joint/socket 70 can be provided in a novel further embodiment as the connection 210*b* involving the shear pin 200, the holes 202, 92*b* and the extension member 40.

Also shown in FIG. 4 is the spring retention mechanism 6 including a retaining pin 204, a hole 206 in the extension member 40, and the spring retainer 94. As shown, the spring retainer 94 is disengaged with the pin 206 (as situated in the hole 206 of the extension member 40), thus proving for the spring 68 to bias the spring retainer 94 against the end 82*a* of the sliding tube 82 in order to compress a seal 208 against the body 92 off the ball socket/joint 70. In other words, the spring retainer 94 acts as a bypass around the pin 204 in order to couple the bias of the spring 68 to act against the end 82*a* of the sliding tube 82.

The spring retainer 94 has a main body 94*a* oriented transverse to the longitudinal axis 41, e.g. having an aperture 94*b* for allowing the extension member 40 to pass there through. The main body 94*a* is also connected to an extension portion 94*c*, which extends along the longitudinal axis 41 between the main body 94*a* and the end 82*a* of the sliding tube 82. As shown, once assembled, the spring 68 acts against the main body 94*a* and thus biases the extension portion 94*c* into contact with the end 82*a* of the sliding tube 82. Further, the aperture 94*b* provides for the extension member 40 to pass there through.

As discussed above, the spring retention mechanism 6 retains the spring 68 within the sliding tube 82 during the event of the body 92 of the ball joint/socket 70 becoming separated from the sliding tube 82, in the event of failure of a crimp connection between the connection portion 92*a* and the end 82*a*—not shown, or in the event of a failure in the shear pin 200 retaining the connection portion (of the body 92) to the extension member 40. An example depiction of the separation of the body 92 from the sliding tube 82 is shown by example in FIG. 3, such that the spring retainer 94 is absent and thus the spring 68 is allowed to undesirably exit the end 82*a* of the sliding tube 82 (while propelling the ball joint/socket 70 away from the sliding tube 82 under influence of the stored potential energy of the spring 68).

Figure 7A:
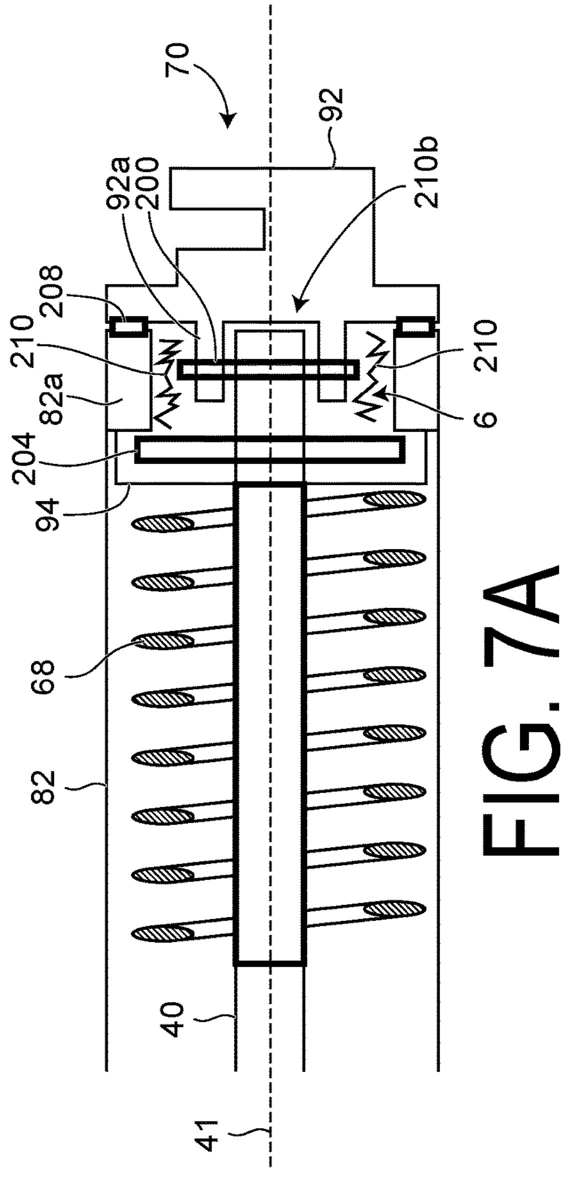
FIGS. 7*a, b*, show an operational example of the spring retention mechanism of FIG. 4.
Figure 7B:
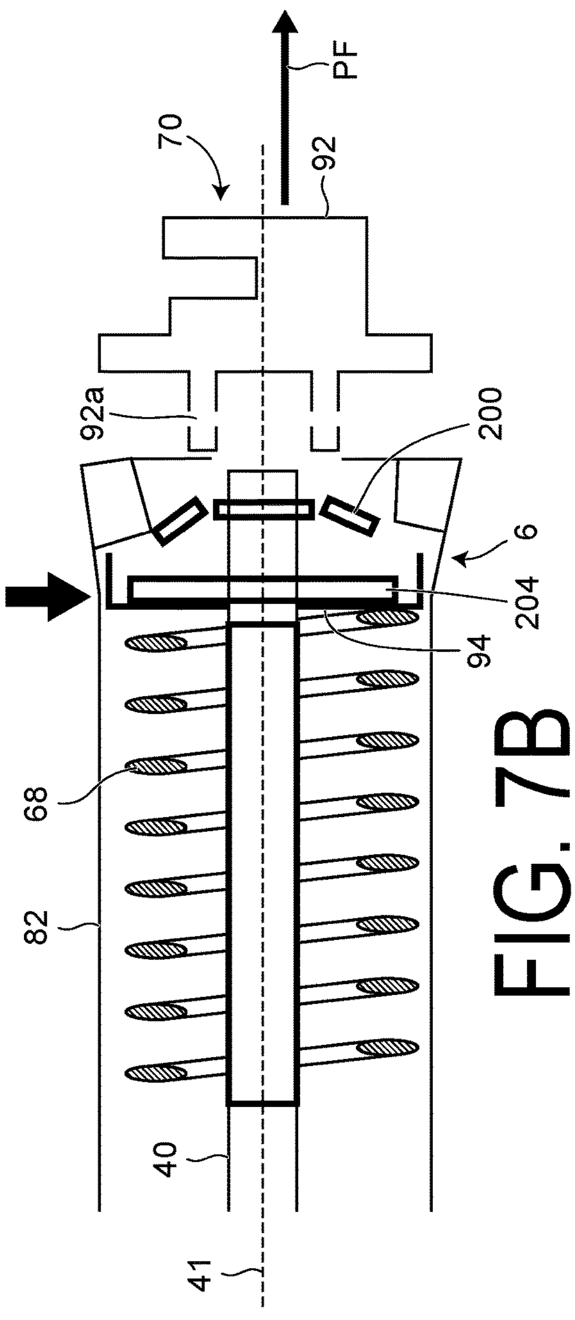
FIG. 7*c* shows a series of views illustrating a spring retainer, in accordance with an illustrative embodiment.
Figure 7C:
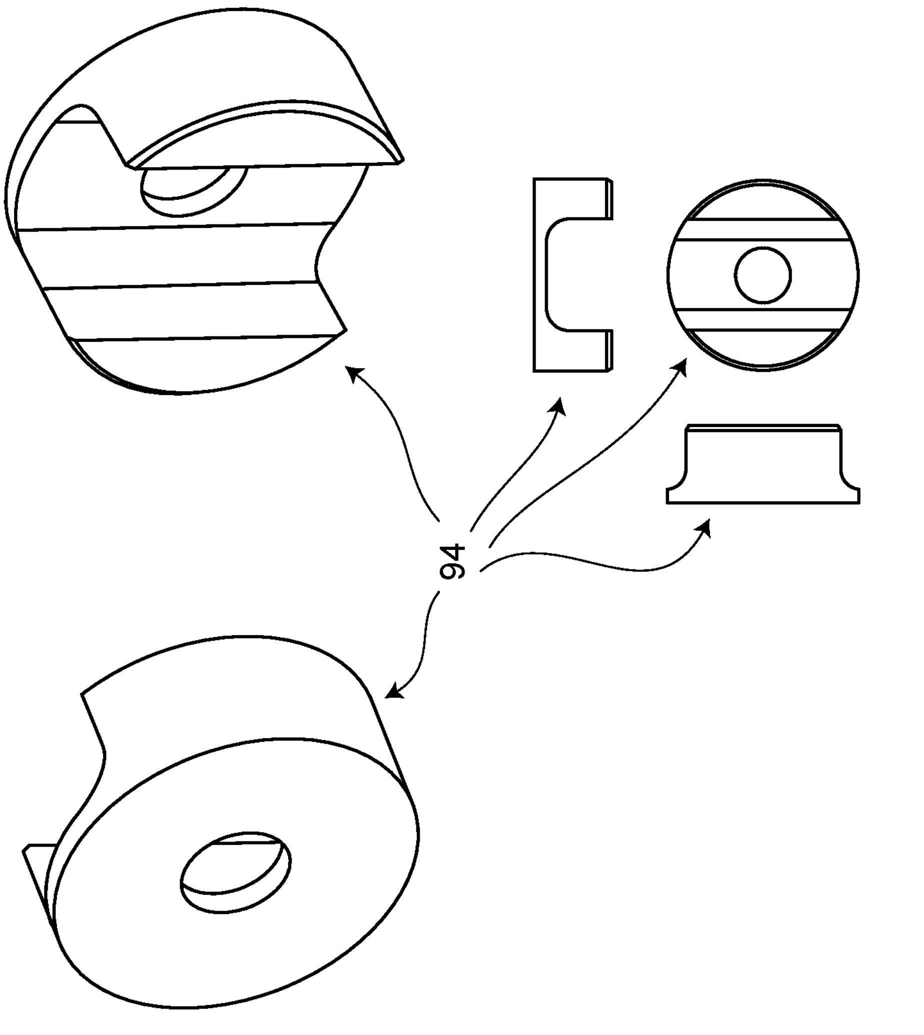

Referring to FIGS. 7*a,b*, shown is an example embodiment of the spring retention mechanism 6 in operation, such that in FIG. 7*a* the spring 68 is held in place by the retaining pin 204 and/or the spring retainer 94. As such, positioning of the spring retainer 94 on the longitudinal axis 41 inhibits the spring 68 from being able to extend out of the end 82*a* of the sliding tube 82. For example, the spring retainer 94 is spaced apart from contact with the retaining pin 204, while being held in position on the longitudinal axis 41 by the position of the body 92 off the ball socket/joint 70 (i.e. the body 92 remains connected to the end 82*a* either as shown by a shear pin 200 connection to the extension member 40 and/or by a crimp connection 210 between the end 82*a* and the connection portion 92*a* of the body 92). In FIG. 7*b*, the crimp connection 210 and/or the shear pin 200 connection has failed (e.g. due to an applied lateral force and/or a pull force) and thus the body 92 of the ball joint/socket 70 becomes detached from the end 82*a*. Upon detachment of the body 92, the bias of the spring 68 pushes the spring retainer 94 up against the retaining pin 204, thus inhibiting extension of the spring 68 out of the end 82*a* of the sliding tube 82. As such, the main body 94*a* (see FIG. 4) of the spring retainer 94 can contact the retaining pin 204.

As such, it is recognized that the retaining pin 204 is not engaged with a hole 206, and as such the spring 68 urges the spring retainer 94 against the sliding tube 82 in order to compress seal against the connector 70, e.g. ball socket 70. In this manner, the spring retainer 94 acts as a bypass around the retaining pin 204 in order to act against the outer tube housing end 60. Further, the retaining pin 204 retains the spring 68 if the spring retainer 94 is no longer capable of engaging the inner tube (e.g. sliding tube 82), which may become deformed from an experienced side load (not shown). Further, it is also recognized that a distance of the hole 206 in the body of the ball socket/joint 70 (for mating with the hole 206 of the extension member 82) to an edge of the connector 70 (e.g. ball socket/joint 70) can be designed to fail at certain loads. For example, the thickness and/or material of the ball socket/joint 70 wall can be designed to fail at certain loads. The failing of the wall of the ball socket/joint 70 can in in alternative or in addition to failing of the retaining pin 204.

Further, it is also recognized that a distance of the hole 206 to an edge of the shaft of the extension member 82 can be designed to fail at certain loads. For example, the thickness and/or material of the extension member 82 wall can be designed to fail at certain loads. The failing of the wall of the ball socket/joint 70 can in in alternative or in addition to failing of the retaining pin 204.

Figure 8:
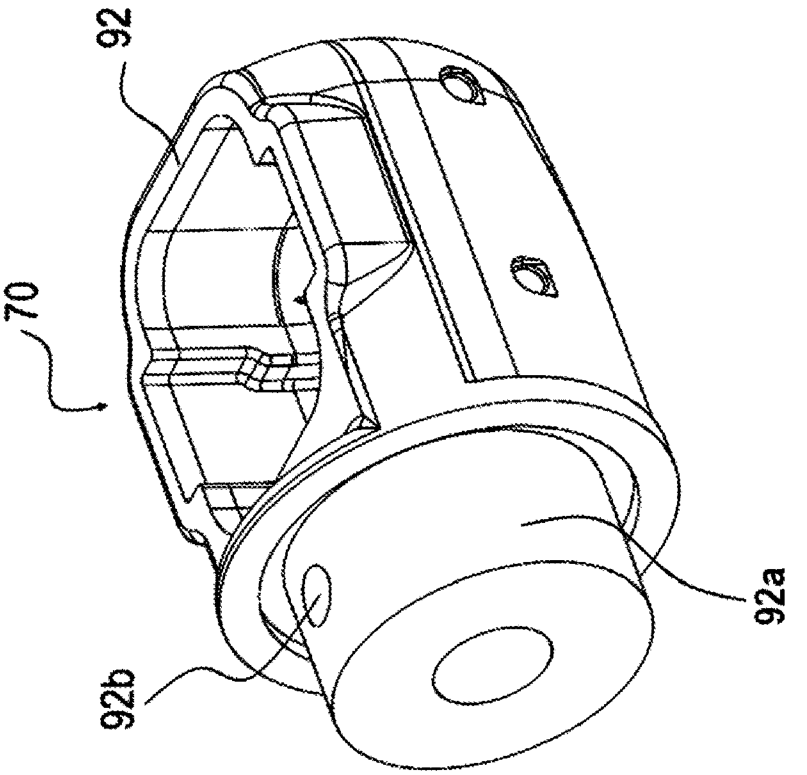
FIG. 8 shows further examples of components of the spring retention mechanism of the counterbalance mechanism of FIG. 4.
Figure 8:
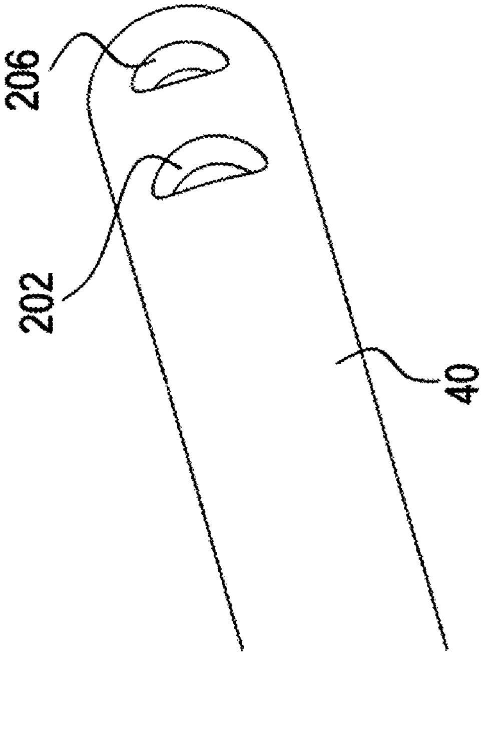

Referring to FIG. 8, shown are further embodiments of the extension member 40 with holes 202, 206 and the body 92 of the ball joint/socket 70.

Figure 9:
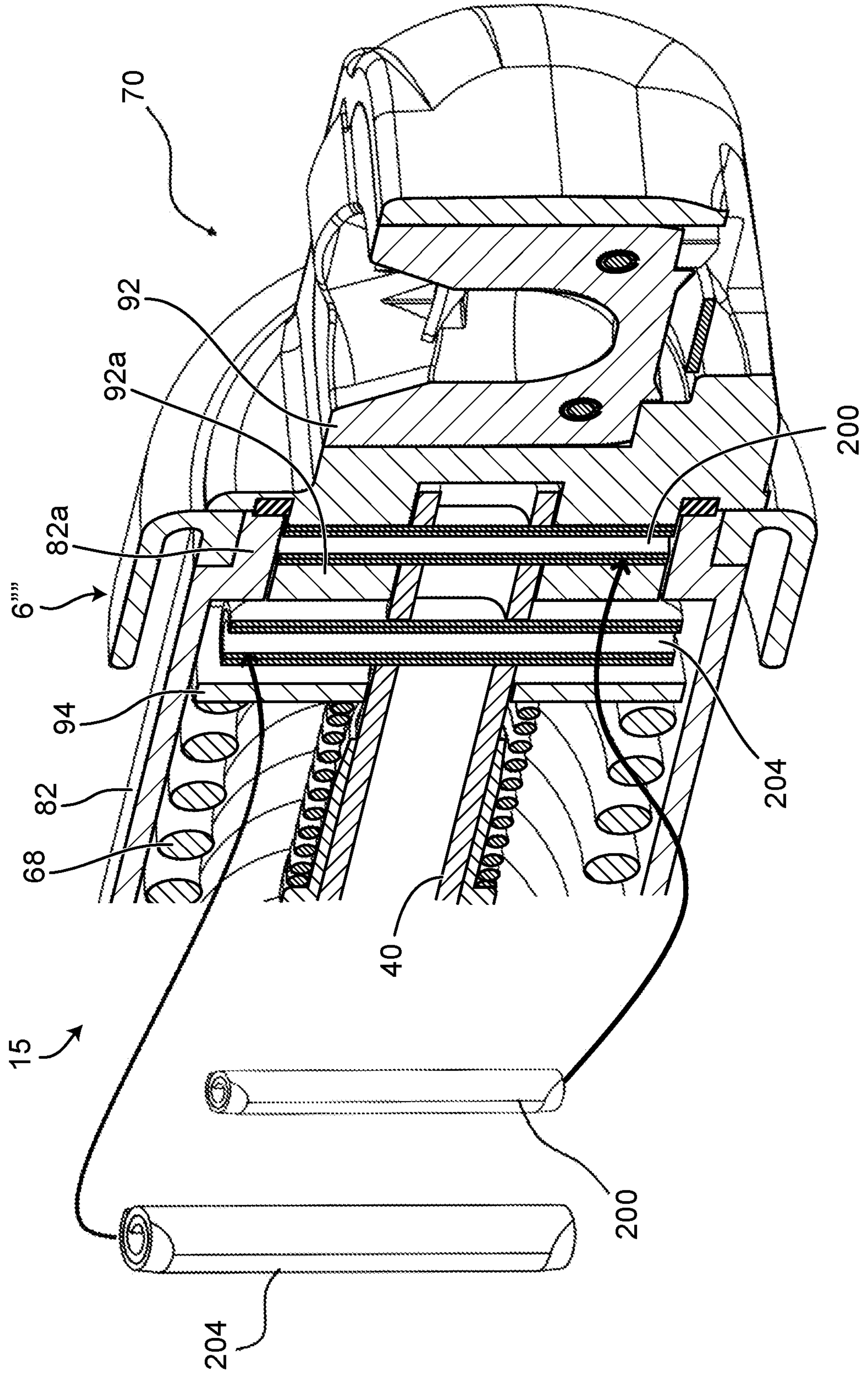
FIG. 9 provides example configurations of the pins of FIG. 4.

FIG. 9 shows example measurements and configurations of the pins 200, 204, such that the retainer pin 204 is larger than the shear pin 200, in order to preferably predispose failure of the shear pin 200 first before a failure of the retainer pin 204 could occur (e.g. in the event of a serious crash). For example, in a two pin design the smaller shear pin 200 would fail first before the larger retainer pin 204, such that when the ball socket 70 separates the retainer pin 204 would retain the spring 68. Further, the spring retention mechanism 6 can have a predisposed failure point greater than the predisposed failure point of the connection portion 92*a*.

In view of the above, it is recognized that the spring retention mechanism can be provided as a safety mechanism of a counterbalance mechanism 15 for inhibiting the coil spring 68 from being expelled from the sliding (e.g. spindle) tube 82 should the ball joint/socket 70 connection 210 with respect to the end 82*a* of the sliding tube 82 fail. This failure may happen during testing and assembly, but also during an accident, or if there is a defect in the connection 210 (e.g. crimp connection 210*a* and/or connection 210*b* with shear pin 200 with extension member 40—see FIG. 7*a,b*, and/or with the threaded connection not shown) with the connection portion 92*a* of the ball joint/socket 70.

In one aspect, a spring retaining mechanism (e.g. assembly) 6 (e.g. spring retainer 94+retainer pin 204) is provided to block the spring 68 from expanding if the ball joint/socket 70 support with respect to the end 82*a* of the sliding tube 82 is lost due to the body 92 of the ball joint/socket 70 becoming uncoupled from the end 82*a* (either due to a loss of the crimp connection 210*a* and/or breakage/release of the shear pin 200 from the hole 202—thus severing the connection 210 between the connection portion 92*a* coupled to the end 82*a* of the sliding tube 82 (e.g. by the crimp connection 210*a* directly with the end 82*a* and/or the connection 210*b* between the shear pin 200 and the extension member 40 via the hole 202)).

In another aspect, the ball joint/socket 70 can have a failure of the connection 210 between the ball joint/socket 70 and the sliding tube 82 (e.g. spindle) which fails at a predetermined force. The illustrative connection 210*b* is a (e.g. shear) pin 200. In general it is recognized that threaded embodiments of the connection 210 can fail at a predetermined level, but depending on the force applied e.g. a lateral load the threads may actually be compressed together which can enhance the connection 210 of the ball joint/socket 70 with the sliding tube 82.

As shown above, it is recognized that the counterbalance mechanism 15 can have a combination of these two features (i.e. including retainer pin 204 and shear pin 200) can be provided. For example, the spring retention mechanism 6 is configured to fail by disconnection of the retaining pin 204 with the extension member 40 after disconnection has occurred of the shear pin 200 with the extension member 40. This failure of the shear pin 200 followed by the retainer pin 204 can be accomplished, for example, by differing shear strengths of the pins 200,204, as desired.

Referring again to FIGS. 2 and 4, shown is the counterbalance mechanism 15 for coupling with a closure panel 14 to assist in opening and closing of the closure panel 14 between a fully closed position and a fully open position of the closure panel 14. The counterbalance mechanism includes: a housing 82, 84 coupled at one end 60 to one of the closure panel 14 and a body 11 of a vehicle 10 by a first connector 61 and at another end 62 by a second connector 63 to the other of the body 11 and the closure panel 14, the housing 82,84 contains an extension member 40 and a spring 68 positioned along a longitudinal axis 41, the spring 68 positioned adjacent to the first connector 61. The first connector has a body 92 with a connection portion 92*a* coupled by a connection 210 to an end 82*a* of the housing 82, 84 positioned at the one end 60. Also included is a spring retention mechanism 6 positioned between the spring 68 and the end 60 for inhibiting extension of the spring 68 out of the one end 60 of the housing 82,84 upon decoupling of the connection portion 92*a* with the end 60.

One aspect of the counterbalance mechanism includes a housing 82, 84 coupled at one end 60 to one of the closure panel 14 and a body 11 of a vehicle 10 by a first connector 61 and at another end 62 by a second connector 63 to the other of the body 11 and the closure panel 14, the housing 82, 84 containing an extension member 40 and a spring 68 positioned along a longitudinal axis 41, the spring 68 positioned adjacent to the first connector 61. The first connector has a body 92 with a connection portion 92*a* coupled by a connection 210 to an end 82*a* of the housing 82, 84 positioned at the one end 60. Also included is a spring retention mechanism positioned between the spring 68 and the end 60 for inhibiting extension of the spring 68 out of the one end 60 of the housing 82, 84 upon decoupling of the connection portion 92*a* with the end 60, wherein the spring retention mechanism 6 has a predisposed failure point greater than the predisposed failure point of the connection portion.

Figure 10:
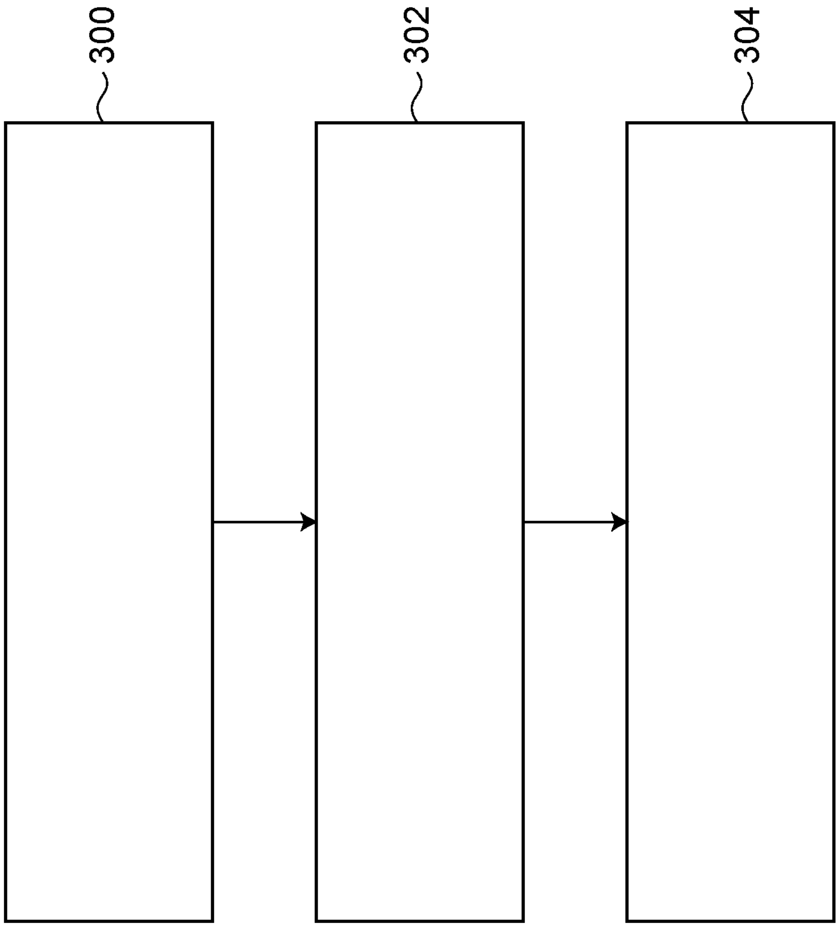
FIG. 10 is an example method for the spring retention mechanism of FIG. 4.

Referring to FIG. 10, shown is a method for providing a counterbalance mechanism 15 for a closure panel 14 of a vehicle 10 (see FIG. 1). At step 300, providing a ball socket connector 61 (e.g. first connector) for a counterbalance mechanism 15. At step 302, providing a connection 210 on the ball socket 70 between the end 82*a* and the body 92 of the ball socket 70. At step 304, installing the spring retention mechanism 6 between the spring 68 and the end 82*a* in order to inhibit extension of the spring 68 in the event of failure of the connection 210.

Figure 11:
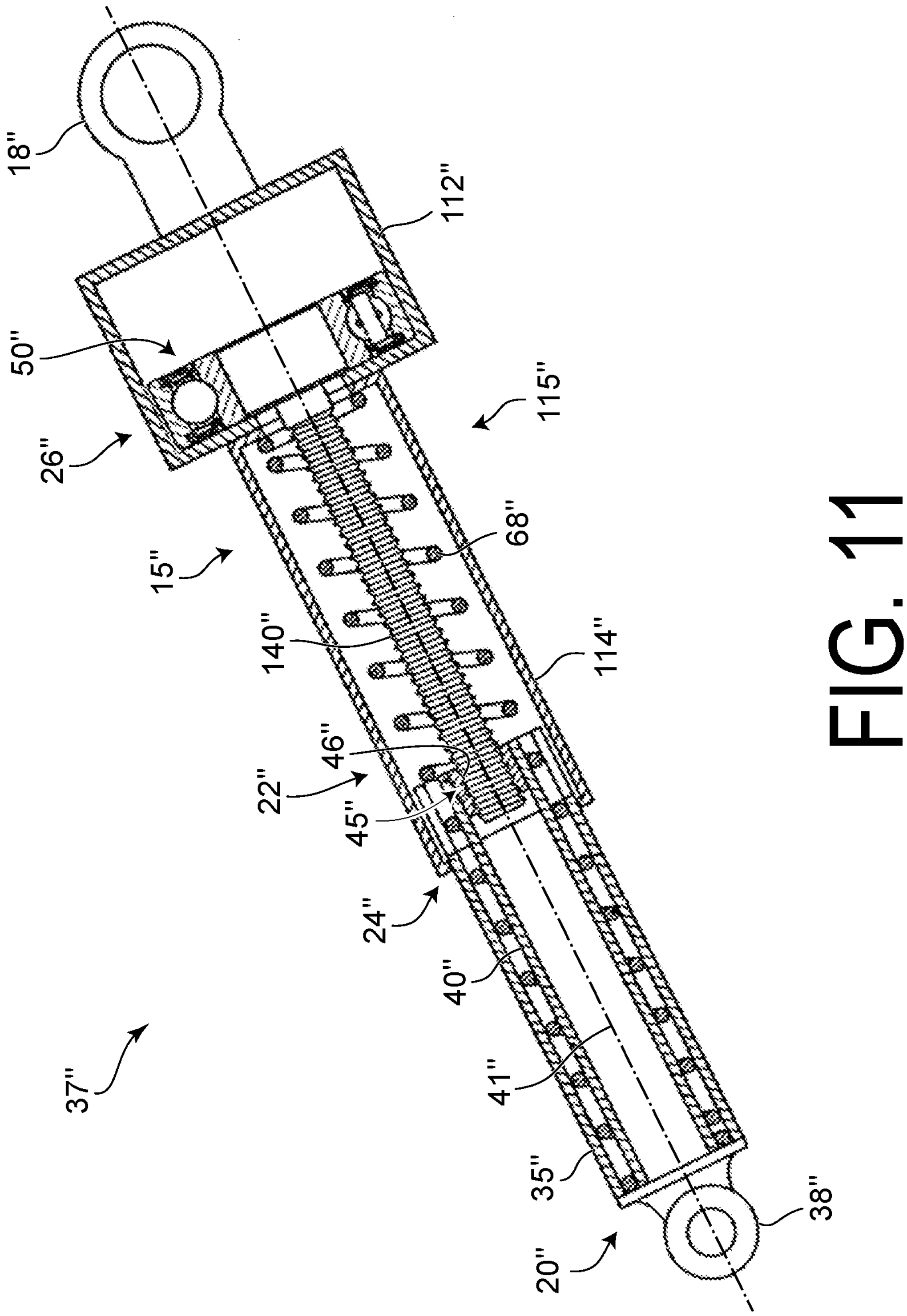
FIG. 11 is an cross sectional view of the counterbalance mechanism of FIG. 1A as a biasing strut, equipped with a friction bearing mechanism, in accordance with an illustrative embodiment.

Now referring additionally to FIG. 11, there is provided a counterbalance mechanism 15" that can be used advantageously with vehicle closure panels 14" to provide for open and close fail safe modes in the event of power actuator failure or disconnection, in particular for land-based, sea-based and/or air-based vehicles. Other applications of the counterbalance mechanism, in general for closure panels both in and outside of vehicle applications, include advantageously assisting in optimization of overall hold and manual effort forces for closure panel operation. It is recognized as well that the counterbalance mechanism examples provided below can be used advantageously as the sole means of open and close assistance for closure panels or can be used advantageously in combination (e.g. in tandem) with other closure panel biasing members (e.g. spring loaded hinges, biasing struts, etc.).

In particular, the counterbalance mechanism 15" can be friction based and used to provide a holding force (or torque) for the closure panel 14", as further described below. Further, it is recognized that the counterbalance mechanism 15" can be integrated with the biasing member 37" (see FIG. 1A) such as a spring loaded strut and/or provided as a component of a closure panel assembly, as further described below. It is recognized that the biasing member 37", incorporating the friction based counterbalance mechanism 15", can be implemented as a strut. The strut can be of a biasing type (e.g. spring and/or gas charge supplying the bias). The strut can be of an electromechanical type (e.g. driven by an optional integrated motor assembly with spring and/or gas charge supplying a bias).

Figure 1A:
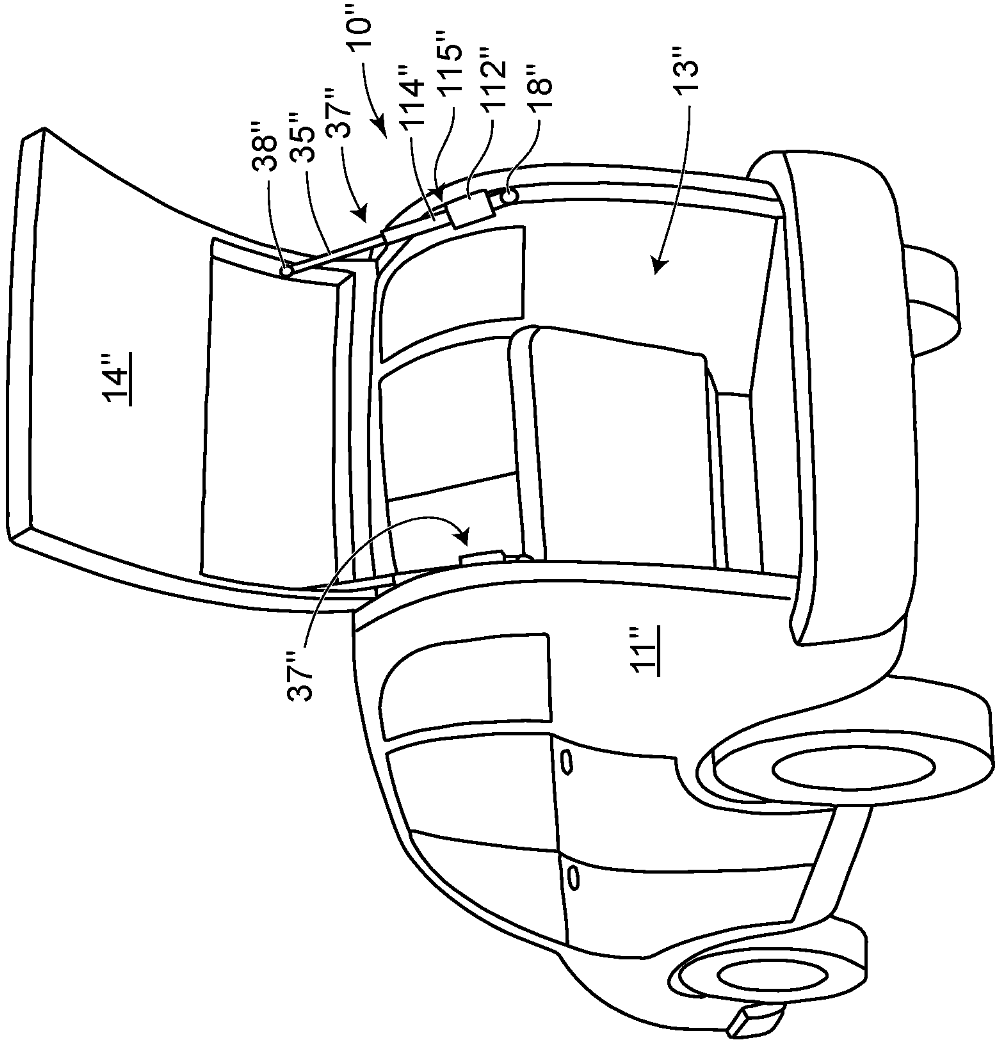
FIG. 1A is a rear perspective view of a vehicle with a closure panel assembly in accordance with an illustrative embodiment.

Referring to FIG. 1A, shown is a vehicle 10" with a vehicle body 11" having one or more closure panels 14". One example configuration of the closure panel 14" is a closure panel assembly including a friction based counterbalance mechanism 37" (e.g. incorporated in a biasing member embodied as a strut by example). For vehicles 10", the closure panel 14" can be referred to as a partition or door, typically hinged, but sometimes attached by other mechanisms such as tracks, in front of an opening 13" which is used for entering and exiting the vehicle 10" interior by people and/or cargo. It is also recognized that the closure panel 14" can be used as an access panel for vehicle 10" systems such as engine compartments and also for traditional trunk compartments of automotive type vehicles 10". The closure panel 14" can be opened to provide access to the opening 13", or closed to secure or otherwise restrict access to the opening 13". It is also recognized that there can be one or more intermediate hold positions of the closure panel 14" between a fully open position and fully closed position, as provided at least in part by the counterbalance mechanism 37" as further described below. For example, the counterbalance mechanism 37" can assist in biasing movement of the closure panel 14" away from one or more intermediate hold position(s), also known as Third Position Hold(s) (TPHs) or Stop-N-Hold(s), once positioned therein. It is also recognized that the counterbalance mechanism 37" can be provided as a component of the closure panel assembly, such that the counterbalance mechanism 37" component can be separate from the one or more biasing struts.

The closure panel 14" can be opened manually and/or powered electronically via the closure panel drive system (not shown), where powered closure panels 14" can be found on minivans, high-end cars, or sport utility vehicles (SUVs) and the like. Additionally, one characteristic of the closure panel 14" is that due to the weight of materials used in manufacture of the closure panel 14", some form of force assisted open and close mechanism (or mechanisms) are used to facilitate operation of the open and close operation by an operator (e.g. vehicle driver) of the closure panel 14". The force assisted open and close mechanism(s) is/are provided by the counterbalance mechanism 37", any biasing members (e.g. spring loaded hinges, spring loaded struts, gas loaded struts, electromechanical struts, etc.) and the closure panel drive system when used as part of the closure panel assembly, such that the counterbalance mechanism 37" is configured to provide a friction based holding torque (or force) that acts against the weight of the closure panel 14" on at least a portion of the panel open/close path about the third position hold, in order to help maintain the position of the closure panel 14" about the third position hold. It is recognized that a counterbalance mechanism 37" as an electromechanical strut can have a lead screw 140" (see FIG. 11) operated either actively (i.e. driven) by a motor 72" (e.g. electrical—see FIG. 14), or operated passively such that the lead screw 140" is free to rotate about its longitudinal axis due but is not actively driven by a motor. Lead screw 140" is an example of a rotatable (second) component of the counterbalance mechanism 37". For example, and with reference to FIG. 14A included herein for illustration of an embodiment of an electromechanical strut of FIG. 4A of commonly owned U.S. Pat. No. 10,100,568 entitled "Electromechanical strut with lateral support feature", (the '568 patent) the entire contents of which are incorporated by reference herein and adapted for illustration of use of friction bearing mechanism 50". FIG. 14A corresponds to FIG. 4A of '568 patent but having reference numerals offset by a factor of "*". Friction bearing mechanism 50" may also be employed with a power actuator, or power drive unit, such as the type shown in U.S. Pat. No. 9,174,517 entitled "Power swing door actuator", the entire contents of which are incorporated by reference herein.

In terms of vehicles 10", the closure panel 14" may be a lift gate as shown in FIG. 1A, or it may be some other kind of closure panel 14", such as an upward-swinging vehicle door (i.e. what is sometimes referred to as a gull-wing door) or a conventional type of door that is hinged at a front-facing or back-facing edge of the door, and so allows the door to swing (or slide) away from (or towards) the opening 13" in the body 11" of the vehicle 10". Also contemplated are sliding door embodiments of the closure panel 14" and canopy door embodiments of the closure panel 14", such that sliding doors can be a type of door that open by sliding horizontally or vertically, whereby the door is either mounted on, or suspended from a track that provides for a larger opening 13" for equipment to be loaded and unloaded through the opening 13" without obstructing access. Canopy doors are a type of door that sits on top of the vehicle 10" and lifts up in some way, to provide access for vehicle passengers via the opening 13" (e.g. car canopy, aircraft canopy, etc.). Canopy doors can be connected (e.g. hinged at a defined pivot axis and/or connected for travel along a track) to the body 11" of the vehicle at the front, side or back of the door, as the application permits.

Referring again to FIG. 1A, in the context of a vehicle application of a closure panel by example only, the closure panel 14" is movable between a closed position and an open position (as shown). In the embodiment shown, the closure panel 14" can pivot between the open position and the closed position about a pivot axis, which is preferably configured as horizontal or otherwise parallel to a support surface of the vehicle 10". In other embodiments, the pivot axis may have some other orientation such as vertical or otherwise extending at an angle outwards from the support surface of the vehicle 10". In still other embodiments, the closure panel 14" may move in a manner other than pivoting, for example, the closure panel 14" may translate along a predefined track or may undergo a combination of translation and rotation between the open and closed position.

The counterbalance mechanism 37" provides connections of the closure panel 14" to the vehicle body 11" at a pivot mount 18", 38" (see FIG. 1A). The counterbalance mechanism 37" includes a lower housing 112", an upper housing 114", and an extensible member (e.g. shaft/rod) 35". The pivot mount 18", located at an end of lower housing 112" can be pivotally mounted to a portion of the vehicle body 11" that defines an interior cargo area in the vehicle 10". A second pivot mount 38" is attached to the distal end of extensible member 35", relative to upper housing 114", and is pivotally mounted to the lift gate 14" of the vehicle 10". It is recognized that the housings 112", 114" can be generically referred to as housing 115".

Referring to FIG. 11, shown is an example configuration of the counterbalance mechanism 37" including an elongate member 40" (e.g. rod, tube, etc.) of the extensible member 35", defining a longitudinal axis 41". As such, the elongate member 40" can be coupled to the pivot mount 38" at a distal end 20" and coupled to a travel member 45" at a proximal end 22". The travel member 45" is coupled to the lead screw 140" at one end 24", thus providing for the relative motion of the travel member 45" along the longitudinal axis 41". The travel member 45" can be coupled to threads 141" of the lead screw 140" by a threaded bore 46", and as such the travel member 45" rotates about and along the lead screw 140" as the travel member 45" travels along the longitudinal axis 41". It is also recognized that the travel member 45" does not rotate on the lead screw 140", rather the travel member 45" travels linearly along the longitudinal axis 41" and linearly along a body of the lead screw 140" as the lead screw 140" rotates about the longitudinal axis 41" and within the threaded bore 46". Accordingly, as the lead screw 140" rotates, the extensible member 35" also extends or retracts with respect to the housing 115".

The counterbalance mechanism 37" can also optionally include a biasing element 68" to assist with the opening and closing of the closure panel 14". At the other end 26" of the lead screw, a friction bearing mechanism 50" can be connected to the lead screw 140" by one of the collars 52", 54" (e.g. an inner collar 54"—see FIGS. 12 to 14B for example), such that the connected collar 52", 54" and lead screw 140" experience conjoint rotation. As such, as further described below, as the lead screw 140" is rotated about the longitudinal axis 41", the friction bearing mechanism 50" is also operated and thus provides a friction force during movement of the extensible member 35" in and out of the housing 115". While illustratively the friction bearing member 50" is shown rotatably supporting a lead screw 140", friction bearing member 50" may be provided to support other rotable members of the counterbalance mechanism 37", such as a rotating motor shaft 51* (see FIG. 14A for example), a rotating component of a geartrain, such as a planetary geartrain 32* provided between the lead screw 140" and the motor 72", or the like.

Figure 12:
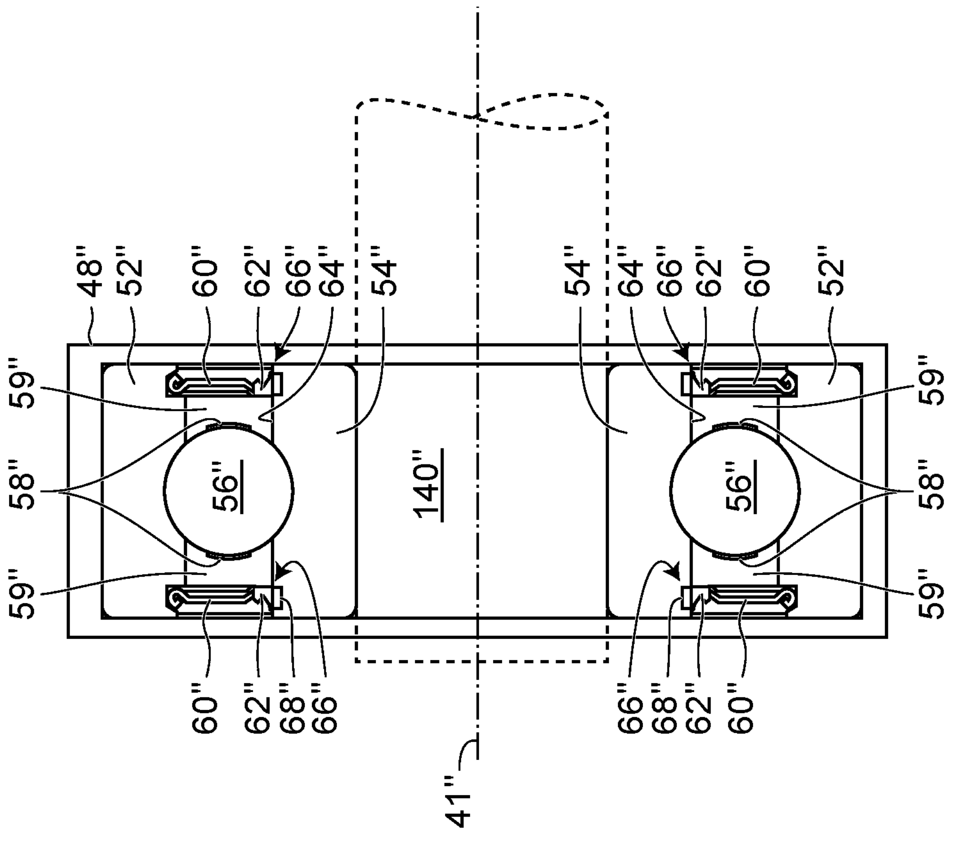
FIG. 12 is an isolated cross sectional view of the friction bearing mechanism of FIG. 11.

Referring to FIGS. 11, 12, shown is a cross sectional view of the friction bearing mechanism 50", including a bearing housing 48", an outer collar 52" fixed to the bearing housing 48", an inner collar 54" connected to the end 26" of the lead screw 140", and bearings 56" positioned between the outer collar 52" an the inner collar 54" such that relative displacement (about the longitudinal axis 41") of the inner collar 54" with respect to the outer collar 52" causes rotation of the bearings 56". The bearing housing 48" is fixed/mounted to the lower housing 112" (see FIG. 11) according to one possible configuration for illustration, such that the outer collar 52" is inhibited from rotating as the inner collar 54" and lead screw 140" (an example of a second component.) rotate about the longitudinal axis 41". Alternatively, bearing housing 48" may not be provided and outer collar 52" is fixed/mounted to the lower housing 112", the lower housing 112" being an example of a nonrotatable (first) component. The first component and the second component of the counterbalance mechanism 37" may rotate relative to one another. For example, the first component may rotate while the second component does not rotate. For example the second component may rotate while the first component does not rotate. For example, the first and second component may both rotate. A bearing cage 58" (e.g. a ring cage) houses the bearings 56" between the inner collar 54" and outer collar 52", such that the bearing cage 58" is also free to rotate about the longitudinal axis 41" as the inner collar 54" is displaced relative to the outer collar 52" while the lead screw 140" rotates.

The friction bearing mechanism 50" also has a bearing cap 60" for positioning the bearing cage 58" between the inner collar 54" and outer collar 52". A void 59" between the bearing 56"/bearing cage 58" and the bearing cap 60" can be used to retain a quantity of lubrication fluid (e.g. bearing grease) in order to provide lubrication for rotation of the bearings 56" within the bearing cage 58". Further, one or more friction elements 62" (e.g. composed of a friction generating material such as but not limited to rubber, or plastic—e.g. a resilient material) are mounted to the bearing cap 60", acting as a friction member biasing element 63" for example, and are biased into engagement with a friction surface 64" of the inner collar 54". Bearing cap 60" may be provided as an integral unit having a resilient biasing element, made of metal for example which may act as a spring and having a friction generating portion such as plastic forming the friction elements 62". It is recognized that such components may be provided not integrally formed be connected together. This biasing can be provided, for example, by a friction fit between the outer collar 52" and the inner collar 54", thus compressing the friction elements(s) 62" between the inner collar 54" and the outer collar 52". For illustration only, a series of friction generation regions 68" are shown, where a friction force 66" would be generated between the friction surface 64" and the friction element(s) 62" as the inner collar 54" is rotated about the longitudinal axis 41" relative to the outer collar 52". For example, the bearing cage 58" could be positioned such that contact between the bearing cage 58" and the bearing cap 60" and/or the friction element(s) 62" is also provided to generate friction (see FIG. 13B for example).

Figure 13:
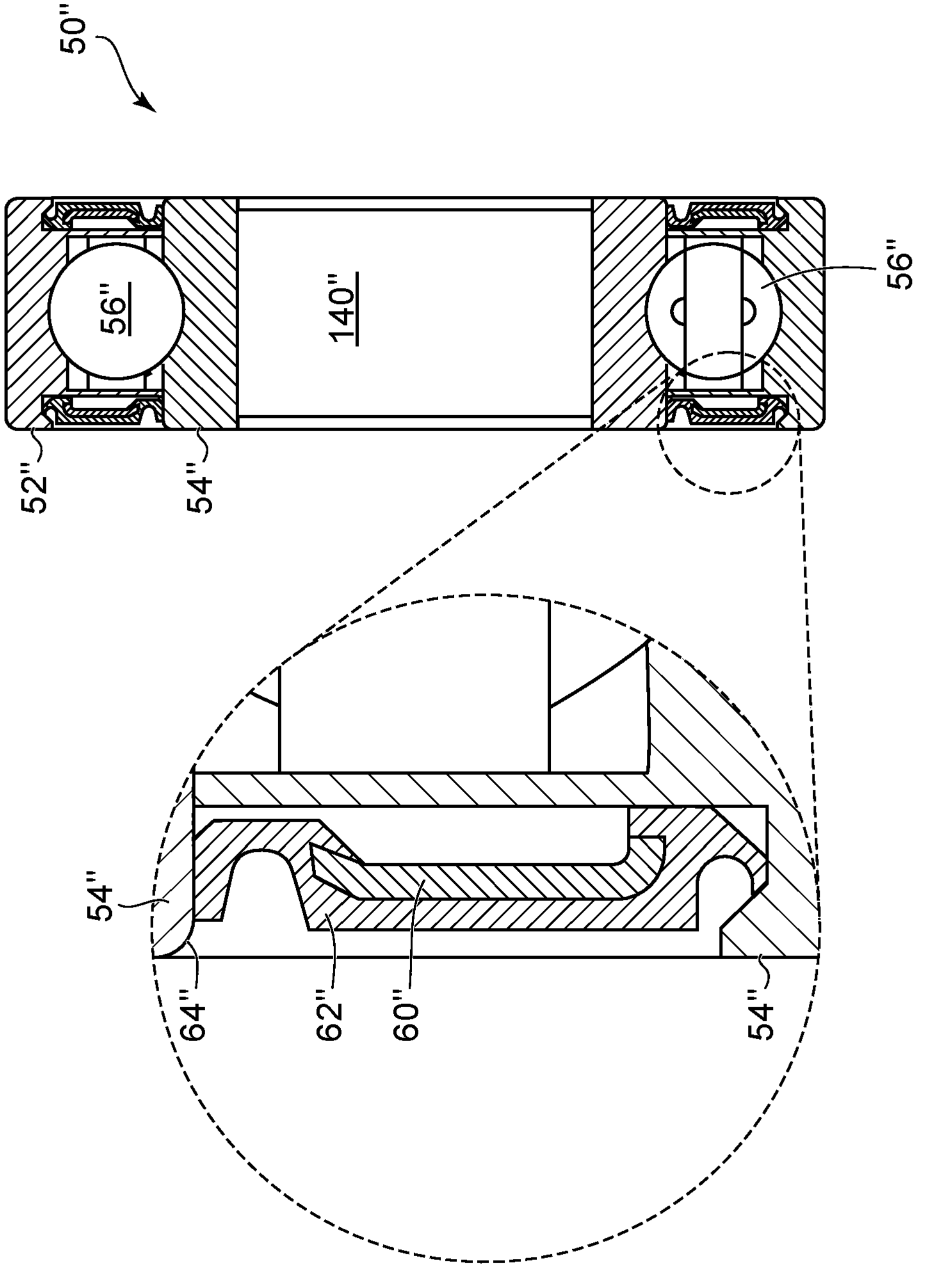
FIG. 13 is an enlarged view of a portion of the friction bearing mechanism of FIG. 12.
Figure 13A:
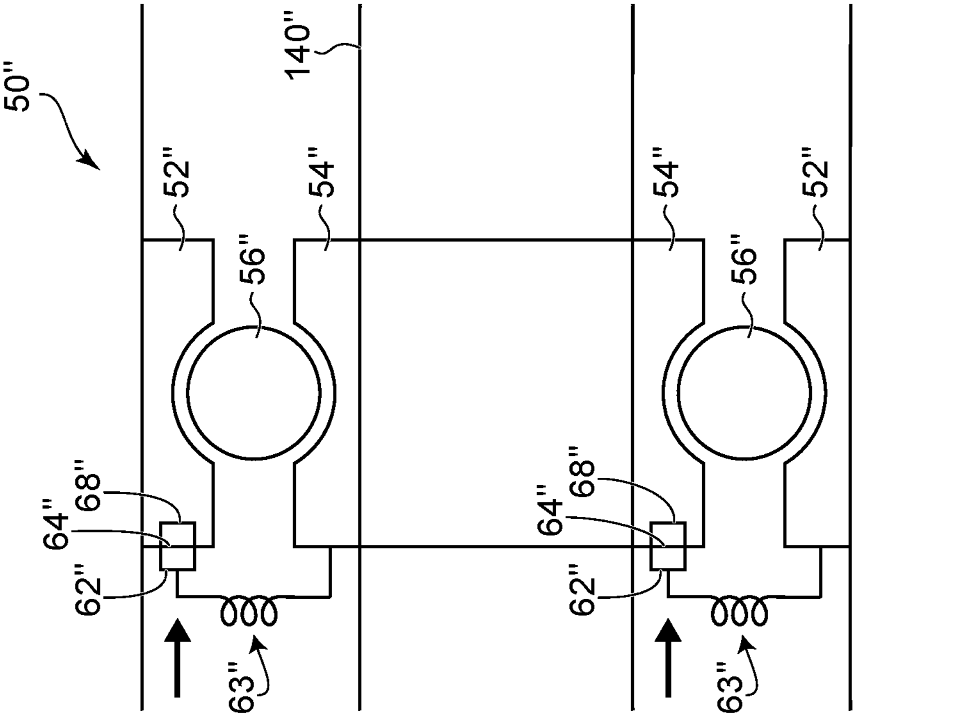
FIGS. 13A and 13B are illustrative embodiments of the friction bearing mechanism of FIG. 13.

FIG. 13A shows an enlarged views of the friction element(s) 62" in contact with the friction surface 64" now provided on a axial surface 64" of the outer collar 52" in accordance with another possible configuration, as biased there against by a friction member biasing element 63" which may be the bearing cap 60" or component acting between the inner collar 54" and the outer collar 52". It is recognized that a shape of the friction element(s) 62" can be of a serpentine shape to facilitate the biasing into engagement with the friction surface 64". FIG. 13A further shows another embodiment illustrating a friction element(s) 62" in biased contact with the inner collar 54", under influence of the friction member biasing element 63", illustratively acting against the outer collar 52".

Figure 13B:
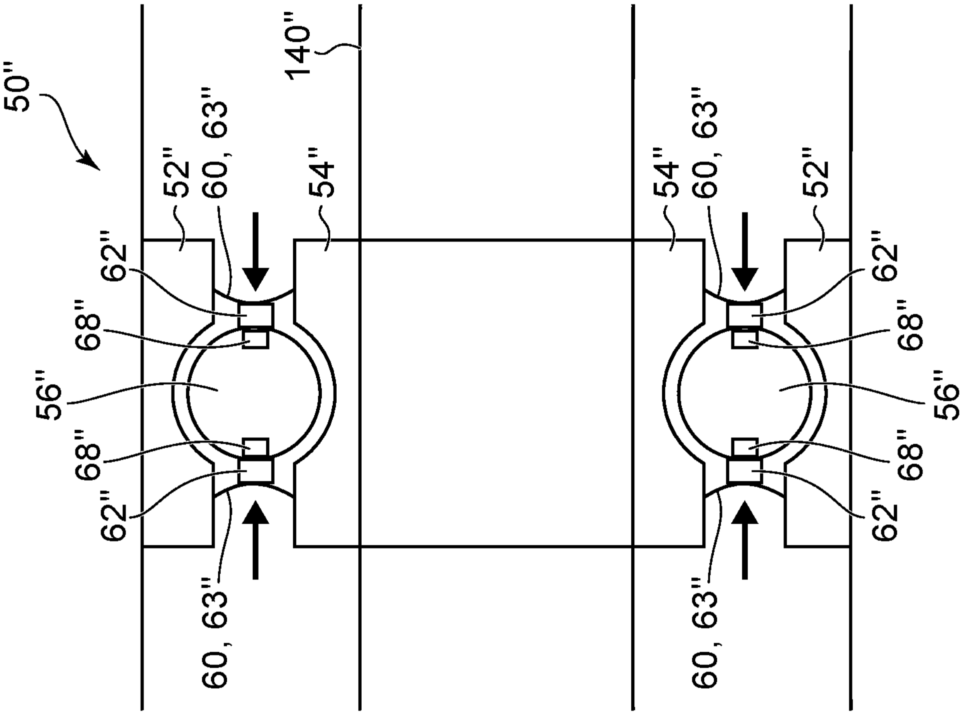

FIG. 13B shows another embodiment illustrating a friction element(s) 62" in biased contact with bearings 56" under influence of a friction member biasing element 63", illustratively embodied as bearing cap 60". The embodiment of FIG. 13B illustrates the generation of friction indirectly between the inner and outer collar 54", 52", as opposed to directly between the inner and outer collar as shown in FIG. 12 and FIG. 13A, by resisting the rotation of bearings 56" normally known to be employed to eliminate friction between the inner and outer collar 54", 52" by rolling.

It is understood that the purpose of bearings 56" are known to minimize friction between the inner collar 54" and outer collar 52", thus bearings 56" provide an insignificant amount of friction compared to the friction generated by friction members 62". As a result, bearings 56" provide the load bearing function to friction bearing mechanism 50" while friction members 62" introduce friction against rotation of the between the inner collar 54" and outer collar 52", which may be a controlled amount of friction, to the friction bearing mechanism 50" for contributing to hold open and the like functions as described herein above.

Figure 14:
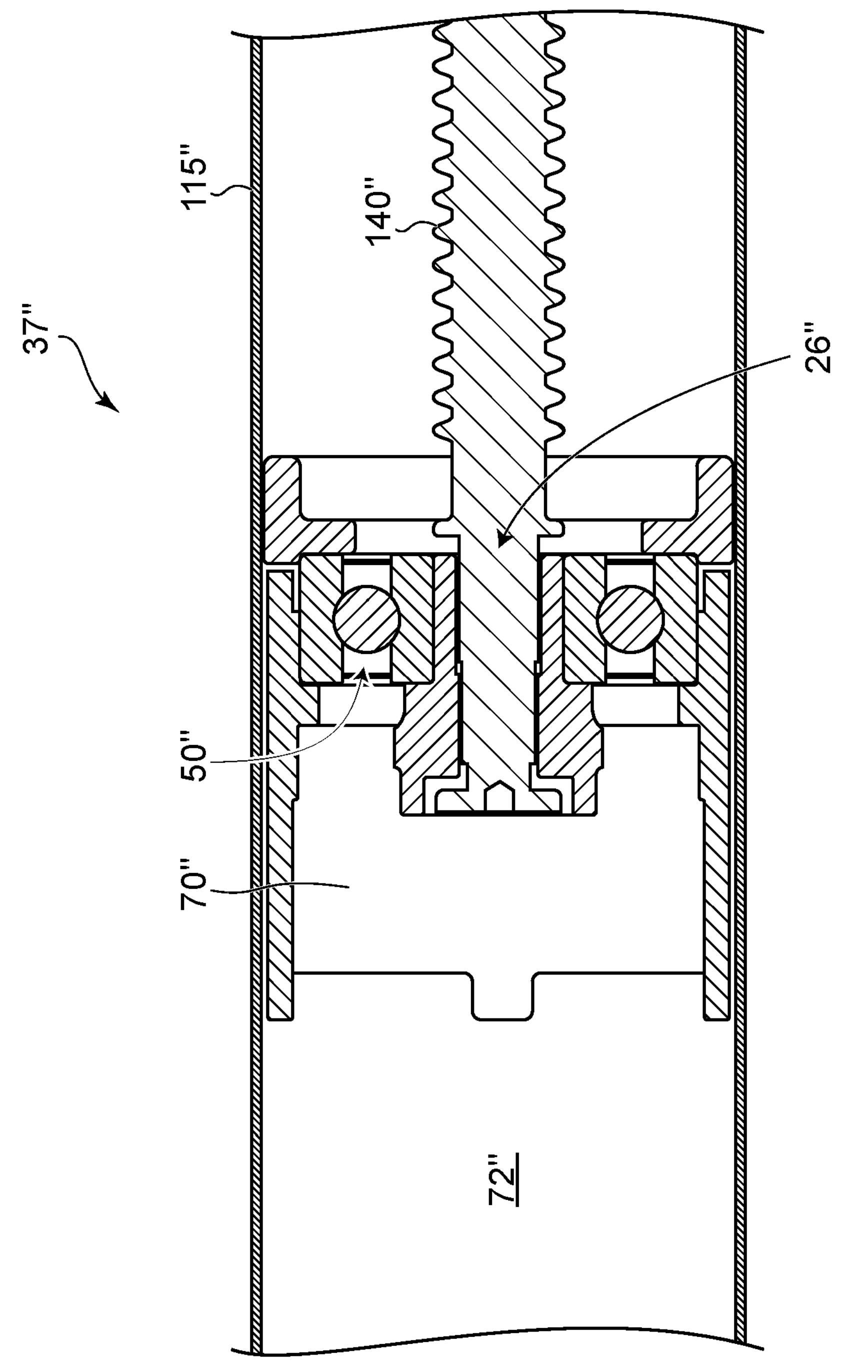
FIG. 14 is a partial cross sectional view of the biasing strut of FIG. 11 showing a configuration having the friction bearing mechanism mounted to a motor shaft, in accordance with an illustrative embodiment.
Figure 14A:
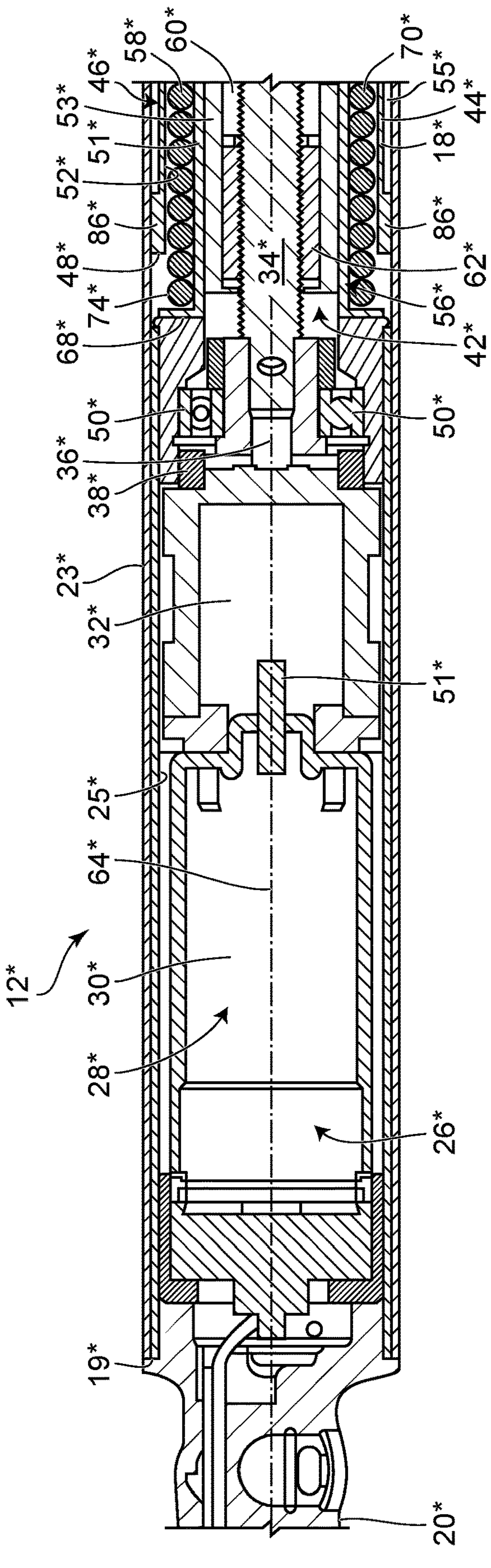
FIG. 14A is a partial cross sectional view of the biasing strut of FIG. 11 showing a configuration having the friction bearing mechanism mounted to a lead screw shaft, in accordance with an illustrative embodiment.

FIG. 14 shows a cross section of the counterbalance mechanism 37" including the friction bearing mechanism 50", a section of the lead screw 140", the housing 115", and an optional coupling 70" to an optional electric motor 72" (for use in actively driving the rotation of the lead screw 140" about the longitudinal axis 41" in a powered strut configuration—see FIG. 11). Friction bearing mechanism 50" is shown coupled to a first component e.g. housing 115" and to a second component e.g. lead screw 140".

Figure 15:
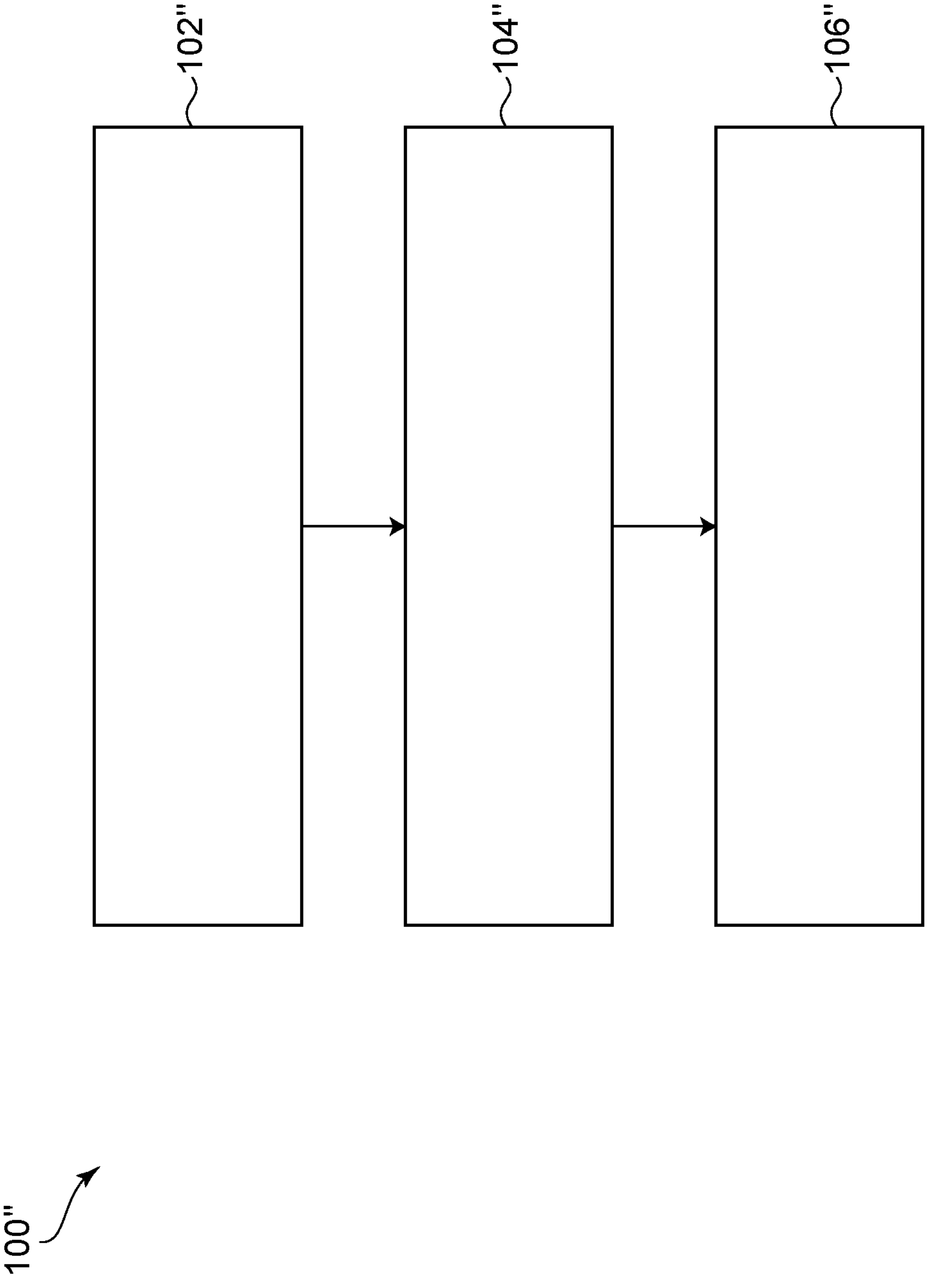
FIG. 15 is an example method of operation of the friction bearing mechanism of FIG. 12.

Referring to FIG. 15, shown is an example operation 100" of the friction bearing mechanism 50". At step 102", the bearing housing 48" is mounted on the lead screw 140" of the counterbalance mechanism 37", the lead screw 140" defining the longitudinal axis 41", the bearing housing 48" having the outer collar 52" positioned within the bearing housing 48" (and about the longitudinal axis 41") and an inner collar 54" positioned within the bearing housing 48" between the outer collar 52" and the longitudinal axis 41". At step 104", providing relative movement (e.g. passively by opening or closing the closure panel 14" manually by a user of the vehicle 10"—see FIG. 1A, or actively by operating the electric motor 72"—see FIG. 14) about the longitudinal axis 41" between the inner collar 54" and the outer collar 52" by one or more bearings 56" mounted in the bearing cage 58". At step 106", generating a friction force 66" between the one or more friction elements 62" and the friction surface 64" provided on at least one of the inner collar 54", the outer collar 52", and the bearing 56" during the relative movement. It is recognized that the one or more friction elements 62" are biased into engagement with the friction surface 64".

Another method for operating a friction bearing mechanism 50" of a counterbalance mechanism may also be provided including the steps of mounting a bearing housing 48" on a rotatable member (e.g. a lead screw or motor shaft, or other rotatable shaft) of the counterbalance mechanism 37", the bearing housing 48" having an outer collar 52" positioned within the bearing housing 48" and about a longitudinal axis 41" and an inner collar 54" positioned within the bearing housing 48" between the outer collar 52" and the longitudinal axis, providing relative movement about the longitudinal axis 41" between the inner collar 54" and the outer collar 52" via one or more bearings 56" positioned between the inner collar 54" and the outer collar 52" and generating a friction force between one or more friction elements 62" and a friction surface 64" of at least one of the inner collar 54" and the outer collar 52" and the bearing 56" during said relative movement, the one or more friction elements 62" biased into engagement with the friction surface 64".

Figure 16A:
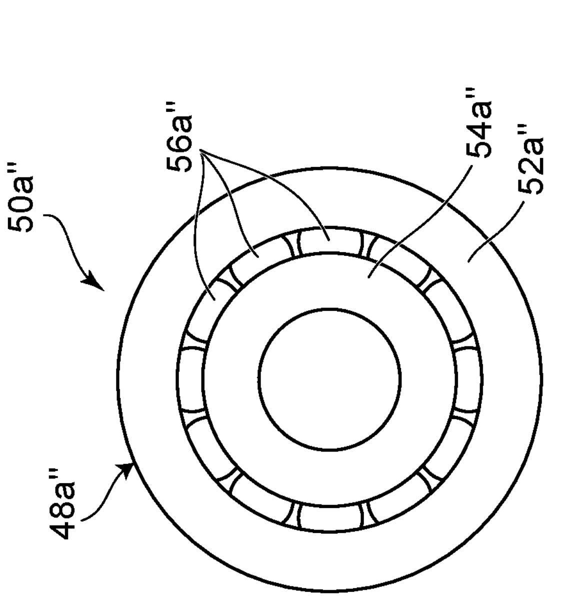
FIG. 16A is a front view of a friction bearing mechanism in accordance with another illustrative embodiment showing one or more friction elements biased into engagement with an inner collar assembly.
Figure 16B:
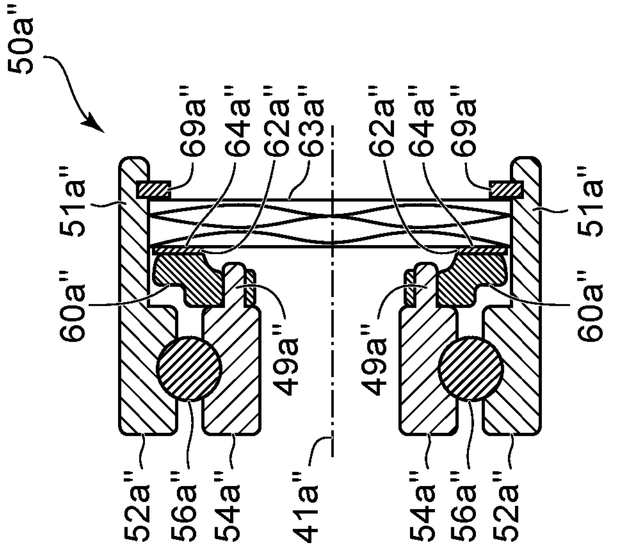
FIG. 16B is a cross-sectional side view of the friction bearing mechanism of FIG. 16A.
Figure 16C:
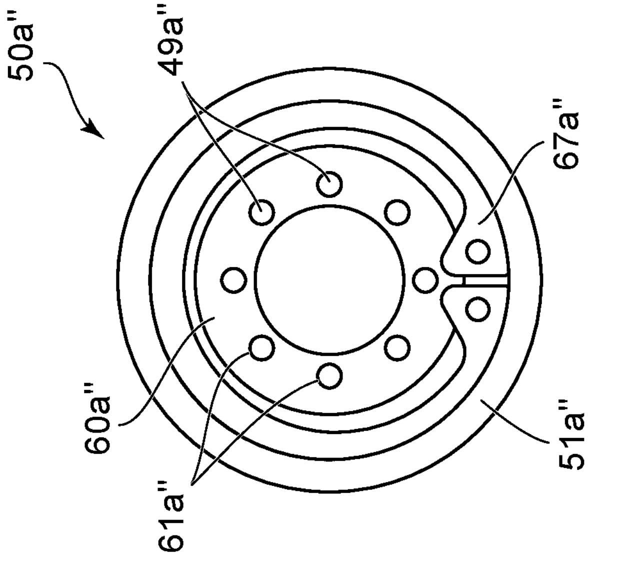
FIG. 16C is an opposite rear view of the friction bearing mechanism of FIG. 16A.

Now additionally referring to FIG. 16A to 16C there is illustrated another embodiment of the friction bearing mechanism 50", referred to using reference number 50*a*". The friction bearing mechanism 50*a*" includes a bearing housing 48*a*" an outer collar 52*a*" fixed to the bearing housing 48*a*", the inner collar 54*a*" connected to the end 26" of the rotatable member e.g. lead screw 140", and bearings 56*a*" positioned between the outer collar 52*a*" and the inner collar 54*a*" such that relative displacement (about the longitudinal axis 41*a*") of the inner collar 54*a*" with respect to the outer collar 52*a*" causes rotation of the bearings 56*a*". The bearing housing 48*a*" may be fixed/mounted to the lower housing 112" (see FIG. 11), such that the outer collar 52*a*" is inhibited from rotating as the inner collar 54*a*" and lead screw 140" rotate about the longitudinal axis 41*a*". Alternatively, bearing housing 48*a*" may not be provided and outer collar 52*a*" is fixed/mounted to the lower housing 112" directly, the lower housing 112" being an example of a nonrotatable (first) component. The friction bearing mechanism 50*a*" also has a bearing cap 60*a*", also referred to as a contact ring, illustratively mounted to the inner collar 54*a*" by press fitting a series of circular apertures 61*a*" formed in the bearing cap 60*a*" onto corresponding series or projections 49*a*" extending from the inner collar 54*a*" parallel to longitudinal axis 41*a*". Bearing cap 60*a*" extends from the connection with the inner collar 54*a*" radially outwards towards a flange 51*a*" extending from outer collar 52*a*" along the longitudinal axis 41*a*". Bearing cap 60*a*" is shown for supported conjoint rotation with inner collar 54*a*" and separated by a gap with outer collar 52*a*". Further, one or more friction elements 62*a*" (e.g. composed of a friction generating material such as but not limited to rubber, or plastic—e.g. a resilient material) are mounted to the bearing cap 60*a*", acting a friction surface(s) 64*a*" of the inner collar 54*a*" against which a friction member biasing element 63*a*" for example is urged into contact with the friction surface 64*a*", and are biased into engagement therewith for generating friction. The one or more friction elements 62*a*" may be a washer for example. The washer may be rotationally keyed to the outer collar 52*a*" but axially free. Friction member biasing element 63*a*" is illustratively shown as a wave spring having an outer periphery acting as a corresponding friction surface for engagement with the friction surface 64*a*". Wave spring may be made of plastic or metal as examples. Bearing cap 60*a*" may be provided as an integral unit with inner collar 54*a*", and made of metal for example. It is recognized that such components may be provided not integrally formed or connected together. In operation as the inner collar 54*a*" rotates relative to the outer collar 52*a*", the ball bearings 56*a*", outer collar 52*a*" and outer collar 54*a*" function as a standard ball bearing having loading capacity (type 6200 for example), and the washer 62*a*" is pressed against the contact ring 60*a*" by the wave spring 63*a*", or in the configuration where the washer 62*a*" is secured to the contact ring 60*a*", as the wave spring 63*a*" is urged against the washer 62" to create a normal force for frictional torque when the contact ring 60*a*" rotates relative to the washer 62*a*", or to the wave spring 63*a*". A resilient clip 69*a*" seated within a radial notch in the flange 51*a*" provides a surface against which wave spring 63*a*" may be compressed against.

Figure 17C:
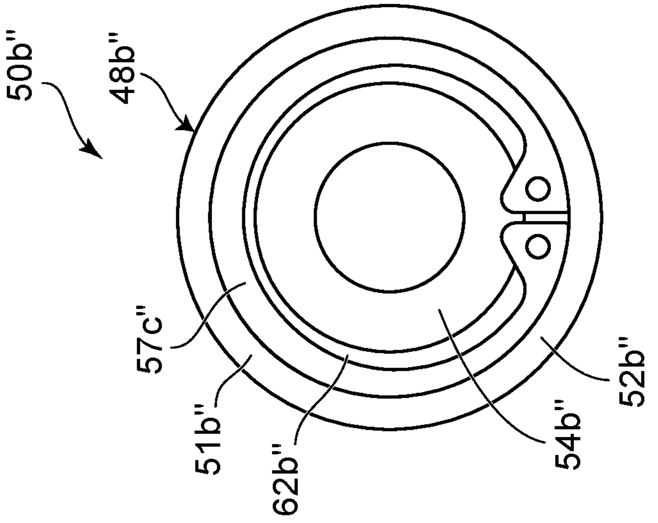
FIG. 17C is an opposite rear view of the friction bearing mechanism of FIG. 17A.
Figure 17B:
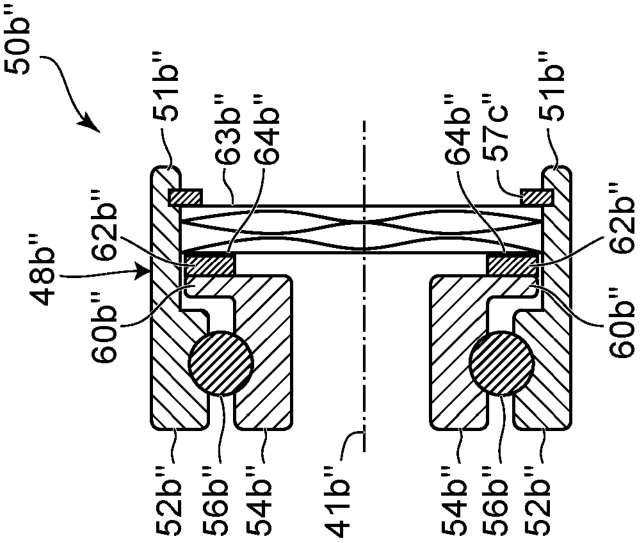
FIG. 17B is a cross-sectional view of the friction bearing mechanism of FIG. 17A.
Figure 17A:
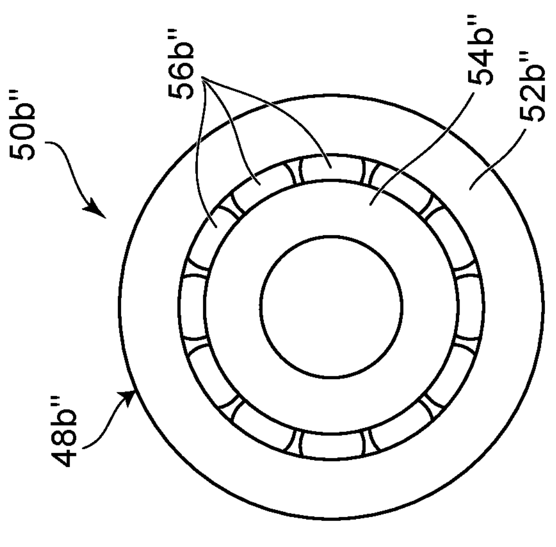
FIG. 17A is a side view of a friction bearing mechanism in accordance with another illustrative embodiment showing one or more friction elements biased into engagement with an inner collar assembly.

Now referring to FIG. 17A to 17C there is illustrated another embodiment of the friction bearing mechanism 50", referred to using reference number 50*b*". The friction bearing mechanism 50*b*", includes a bearing housing 48*b*", an outer collar 52*b*" fixed to the bearing housing 48*b*", the inner collar 54*b*" connected to the end 26" of the lead screw 140" for example, and bearings 56*b*" positioned between the outer collar 52*b*" and the inner collar 54*b*" such that relative displacement (about the longitudinal axis 41*b*") of the inner collar 54*b*" with respect to the outer collar 52*b*" causes rotation of the bearings 56*b*". The bearing housing 48*b*" is fixed/mounted to the lower housing 112" (see FIG. 11), such that the outer collar 52*b*" is inhibited from rotating as the inner collar 54*b*" and lead screw 140" rotate about the longitudinal axis 41*b*". Alternatively, bearing housing 48*b*" may not be provided and outer collar 52*b*" is fixed/mounted to the lower housing 112", the lower housing 112" being an example of a nonrotatable (first) component. The friction bearing mechanism 50*b*" also has a bearing cap shown as a radially extending flange 60*b*", also referred to as a contact ring, illustratively formed integrally to the inner collar 54*b*". Radially extending flange 60*b*" extends from the integral connection with the inner collar 54*b*" radially outwards towards a flange 51*b*" extending from outer collar 52*b*" along the longitudinal axis 41*b*". Radially extending flange 60*b*" is shown for supported conjoint rotation with inner collar 54*b*" and separated by a gap with outer collar 52*b*". Further, one or more friction elements 62*b*" (e.g. composed of a friction generating material such as but not limited to rubber, or plastic—e.g. a resilient material) are positioned next to and may in one configuration be mounted to the radially extending flange 60*b*", having a friction surface 64*b*" acting against a friction member biasing element 63*b*" or for example which is urged into contact with the contact surface of radially extending flange 60*b*", for generating friction. A resilient clip 57*c*" is provided in slotted engagement when in expanded with a circumferentially extending notch 61*b*" formed on the inward facing surface of flange 51*b*" and adjacent friction member biasing element 63*b*" so as to provide a stop surface against which friction member biasing element 63*b*" is biased against. The one or more friction elements 62*b*" may be a washer for example positioned between the radially extending flange 60*b*" and the friction member biasing element 63*b*". The washer may be rotationally keyed to the outer collar 52*b*" but axially free, and for example not connected to radially extending flange 60*b*. Friction member biasing element 63*b*" is illustratively shown as a wave spring having an outer periphery acting as a corresponding friction surface for engagement with the friction surface 64*b*". Alternatively, one or more friction elements 62*b*" (e.g. composed of a friction generating material such as but not limited to rubber, or plastic—e.g. a resilient material) may be mounted to the friction member biasing element 63*b*" and friction surface 64*b*" facing the radially extending flange 60*b*" for engagement therewith when wave spring urges friction elements 62*b*" towards the radially extending flange 60*b*. Radially extending flange 60*b*" may be provided as an integral unit with inner collar 54*b*" in one possible configuration, and made of metal or plastic for example. It is recognized that such components may be provided not integrally formed be connected together. In operation as the inner collar 54*b*" rotates relative to the outer collar 52*b*" the ball bearings 56*b*", outer collar 52*b*" and outer collar 54*b*" function as a standard ball bearing having loading capacity (type 6200 for example), and the washer is pressed against the contact ring by the wave spring to create a normal force for frictional torque when the contact ring rotates relative to the washer.

Figure 18A:
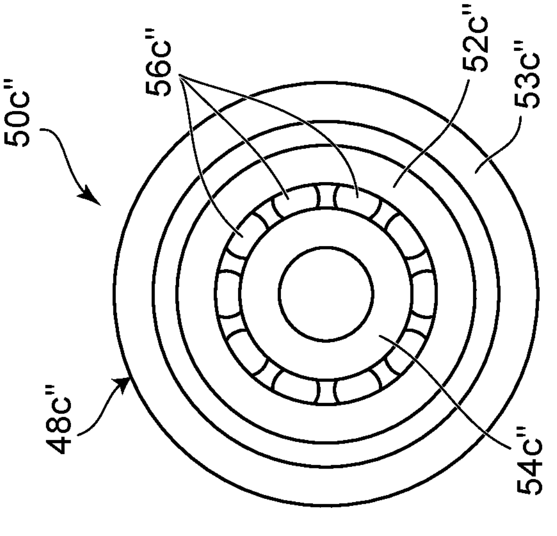
FIG. 18A is a front view of a friction bearing mechanism in accordance with another illustrative embodiment showing a bias acting as one or more friction elements biased into engagement with an inner collar assembly.
Figure 18B:
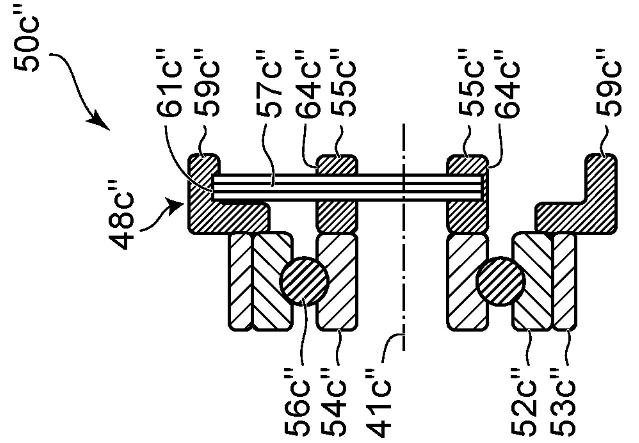
FIG. 18B is a cross-sectional side view of the friction bearing mechanism of FIG. 18A.
Figure 18C:
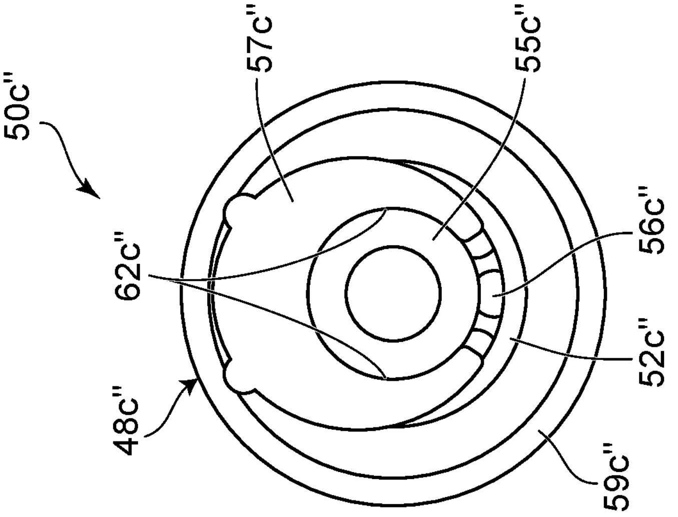
FIG. 18C is an opposite rear view of the friction bearing mechanism of FIG. 18A.

Now referring to FIG. 18A to 18C there is illustrated another embodiment of the friction bearing mechanism 50", referred to using reference number 50*c*". The friction bearing mechanism 50*c*", includes a bearing housing 48*c*", an outer collar 52*c*" press fitted into a slip housing 53*c*", and the inner collar 54c", with the inner collar 54c" which may be connected to the end 26" of the lead screw 140" in an example, and bearings 56c" positioned between the outer collar 52c" and the inner collar 54c" such that relative displacement (about the longitudinal axis 41c") of the inner collar 54c" with respect to the outer collar 52c" causes rotation of the bearings 56c". The bearing housing 48c" may be fixed/mounted to the lower housing 112" (see FIG. 11) via the interposed slip housing 53c", such that the outer collar 52c" is inhibited from rotating as the inner collar 54c" and lead screw 140" rotate about the longitudinal axis 41c". The friction bearing mechanism 50c" also has a slip shaft 55c" shown as axially extending from inner collar 54c", as illustratively formed integrally to the inner collar 54c". Outer collar 52c" includes an axially extending lip 59c". A resilient clip 57c" is interposed between the extending lip 59c" and the slip shaft 55c" such that movement between the extending lip 59c" and the resilient clip 57c" is prevented while movement between the slip shaft 55c" and the resilient clip 57c" is allowed in a manner as will be now described. The resilient clip 57c" is provided in slotted engagement with a circumferentially extending notch 61c" formed on the inward facing surface of axially extending lip 59c" to prevent resilient clip 57c" from slipping out of engagement with axially extending lip 59c". The resilient clip 57c" presents to the slip shaft 55c" one or more friction surface 62c" (e.g. composed of a friction generating material of the resilient clip 57c" itself, or as a coating or additional element, such as but not limited to rubber, or plastic—e.g. a resilient material) are positioned next to and in engagement with the slip shaft 55c" having a friction surface 64c" acting against the one or more friction surface 62c" of the resilient clip 57c", for generating friction. The resilient clip 57c" may be one or a series of stacked resilient clips acting as a friction member biasing element. In operation as the inner collar 54c" rotates relative to the outer collar 52c" the ball bearings 56c", outer collar 52c" and outer collar 54c" function as a standard ball bearing having loading capacity (type 6200 for example), and the one or more friction surface 62c" is pressed against the slip shaft 55c" by the fitted position of the resilient clip 57c" between the axially extending lip 59c" and the slip shaft 55c" to create a normal force for frictional torque when the contact ring rotates relative to the washer.

Figure 19C:
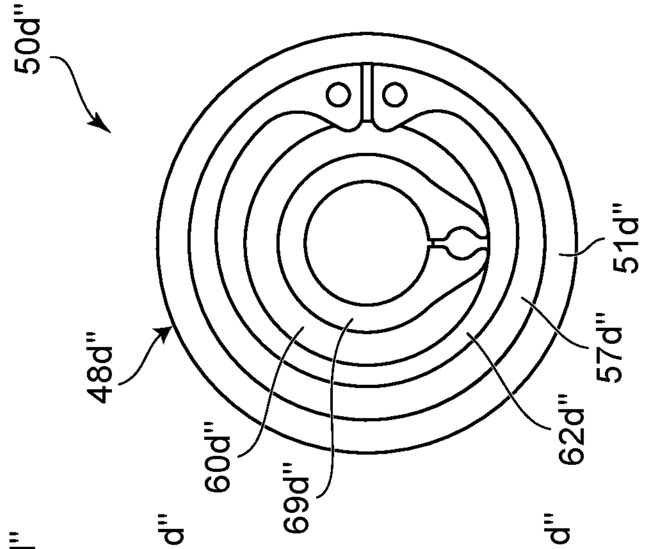
FIG. 19C is an opposite rear view of the friction bearing mechanism of FIG. 19A.
Figure 19B:
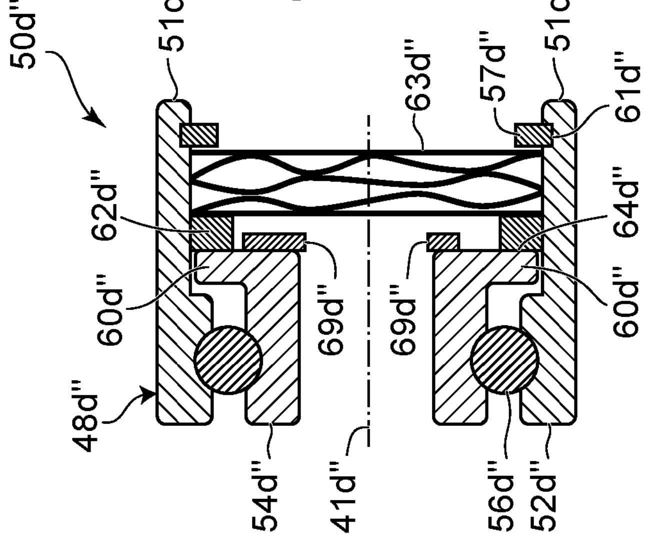
FIG. 19B is a cross-sectional side view of the friction bearing mechanism of FIG. 19A.
Figure 19A:
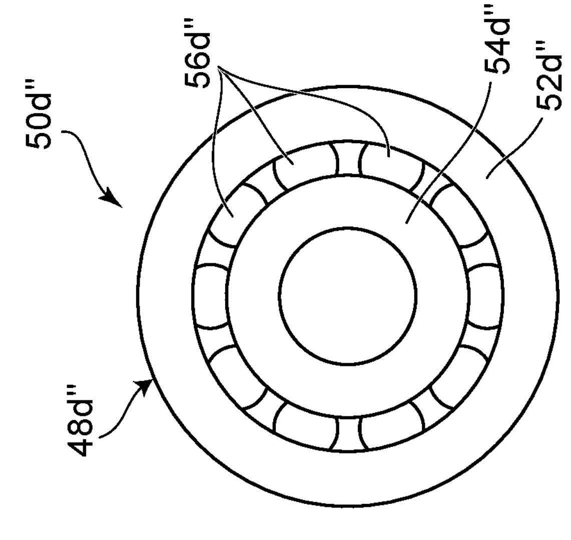
FIG. 19A is a front view of a friction bearing mechanism in accordance with another illustrative embodiment showing one or more friction elements biased into engagement with an inner collar assembly.

Now referring to FIG. 19A to 19C there is illustrated another embodiment of the friction bearing mechanism 50", referred to using reference number 50d". The friction bearing mechanism 50d", includes a bearing housing 48d", an outer collar 52d" and the inner collar 54d", with the inner collar 54d" connected to the end 26" of the lead screw 140", and bearings 56d" positioned between the outer collar 52d" and the inner collar 54d" such that relative displacement (about the longitudinal axis 41d") of the inner collar 54d" with respect to the outer collar 52d" causes rotation of the bearings 56d". The bearing housing 48d" is fixed/mounted to the lower housing 112" (see FIG. 11), such that the outer collar 52d" is inhibited from rotating as the inner collar 54d" and lead screw 140" rotate about the longitudinal axis 41d". The friction bearing mechanism 50d" also has a flange 60d" shown as outwardly radially extending from inner collar 54d", as illustratively formed integrally to the inner collar 54d". A resilient clip 69d" is connected to the flange 60d" for compressively coupling to the lead screw 140" such that rotation between the lead screw 140" and the resilient clip 57c" and the inner collar 54d" is prevented. A resilient clip 57d" is interposed between the an axially projecting flange 51d" extending from outer collar 52d" and the resilient clip 57c" is provided in slotted engagement with a circumferentially extending notch 61d" formed on the inward facing surface of axially projecting flange 51d" to prevent resilient clip 57d" from slipping out of engagement with flange 51d". The resilient clip 57d" presents to the friction member biasing element 63d", shown illustratively as a wave spring, and abutting surface against which friction member biasing element 63d" is biased against. One or more friction surface 62d" (e.g. composed of a friction generating material of the resilient clip 57d" itself, or as a coating or additional element, such as but not limited to rubber, or plastic—e.g. a resilient material) are positioned next to and in engagement with the friction member biasing element 63d" having a friction surface 64d" acting against the one or more friction surfaces of the flange 60d" for generating friction. In operation as the inner collar 54d" rotates relative to the outer collar 52d" the ball bearings 56d", outer collar 52d" and outer collar 54d" function as a standard ball bearing having loading capacity (type 6200 for example), and the one or more friction surface 62d" is pressed against the flange 60d" under urging of the friction member biasing element 63d" to create a normal force for frictional torque.

Figure 20A:
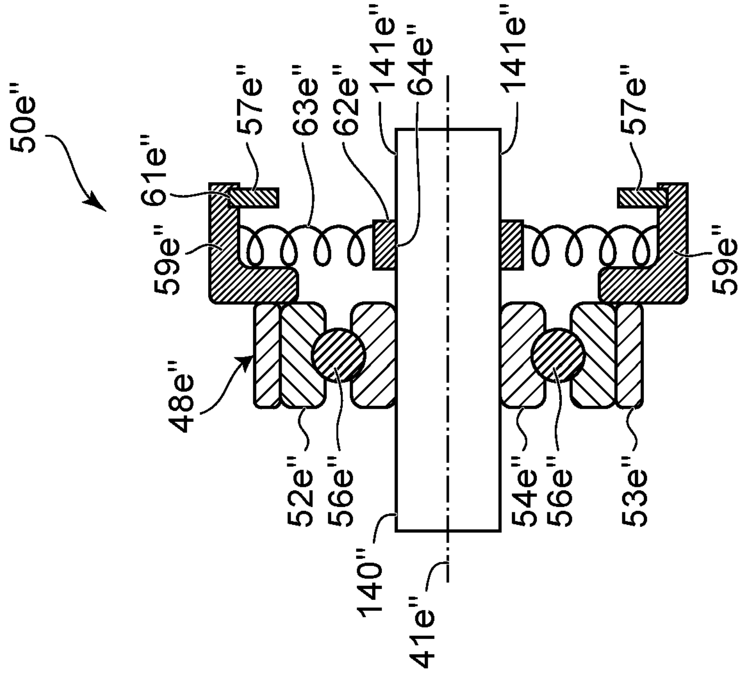
FIG. 20A is a cross-sectional side view of the friction bearing mechanism in accordance with another configuration showing one or more friction elements biased into engagement with the shaft coupled to the inner collar.
Figure 20B:
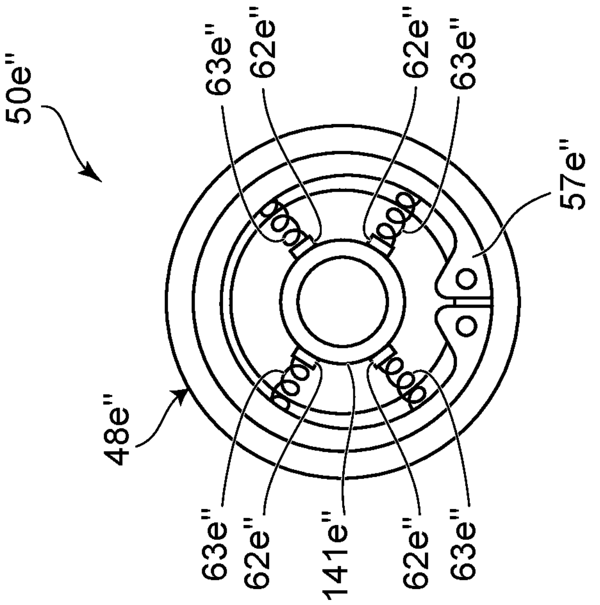
FIG. 20B is a rear view of the friction bearing mechanism of FIG. 20A.

Now referring to FIG. 20A to 20B there is illustrated another embodiment of the friction bearing mechanism 50", referred to using reference number 50e". The friction bearing mechanism 50e", includes a bearing housing 48e", an outer collar 52e" press fitted into a slip housing 53e", and the inner collar 54e", with the inner collar 54e" connected to the end 26" of the lead screw 140", and bearings 56e" positioned between the outer collar 52e" and the inner collar 54e" such that relative displacement (about the longitudinal axis 41e") of the inner collar 54e" with respect to the outer collar 52e" causes rotation of the bearings 56e". The bearing housing 48e" is fixed/mounted to the lower housing 112" (see FIG. 11) via the interposed slip housing 53e", such that the outer collar 52e" is inhibited from rotating as the inner collar 54e" and lead screw 140" rotate about the longitudinal axis 41e". The friction bearing mechanism 50e" also has a flange 59e" shown as axially extending from the slip housing 53e", in one possible configuration. A resilient clip 57e" is provided in slotted engagement with a circumferentially extending notch 61e" formed on the inward facing surface of axially extending flange 59e" to locate friction member biasing element 63e" disposed between the resilient clip 57e" and the flange 59e". The friction member biasing element 63e" biases into engagement with a contact surface 141e" of the lead screw 140" one or more friction elements 62e" (e.g. composed of a friction generating material such as but not limited to rubber, or plastic—e.g. a resilient material), acting a friction surface(s) 64e" (e.g. composed of a friction generating material, or as a coating or additional element, such as but not limited to rubber, or plastic—e.g. a resilient material). In operation as the inner collar 54e" rotates relative to the outer collar 52e" the ball bearings 56e", outer collar 52e" and inner collar 54e" function as a standard ball bearing having loading capacity (type 6200 for example), and the one or more friction surface 64e" is pressed against the contact surface 141e" by bias of the of the friction member biasing element 63e" urging the friction surface 62e" into contact with the lead screw 140" to create a normal force for frictional torque.

Referring additionally now to FIG. 21, shown is an embodiment of the biasing member 37 referred to using the reference numeral 37''' having a counterbalance mechanism 15''' having the resilient element 66 as a kicker spring 66''' coupled at one end 66a''' to an end cap 92''' of the first connector 63''' and positioned at a second end 66b''' adjacent to the travel member 45''' (e.g. coupled to distal end 54 of support tube 52'''—see FIG. 2). It is recognized that the travel member 45''' as shown in FIG. 21 could also be embodied as a spacer, such that the spacer 45''' maintains positioning of the resilient element 66''' with respect to the longitudinal axis 41''' and walls 83''' of the cover tube 80'''. It is recognized that the kicker spring 66''' non-permanently abuts distal end 54''' of support tube 52''' while kicker spring 66''' coupled at one end **66*a*''' to an end cap 92''' maintains positioning of the resilient element 66''' with respect to the longitudinal axis 41''' and walls 83''' of the cover tube 80''' in a manner as will be described herein below. The first connector 63''', as an example embodiment has the socket 70''' positioned in a housing 112''', which receives the endcap 92'''. The resilient element 66''' is coupled at the end 66*a*''' via a threaded connection 114'''** as established.

Figure 22:
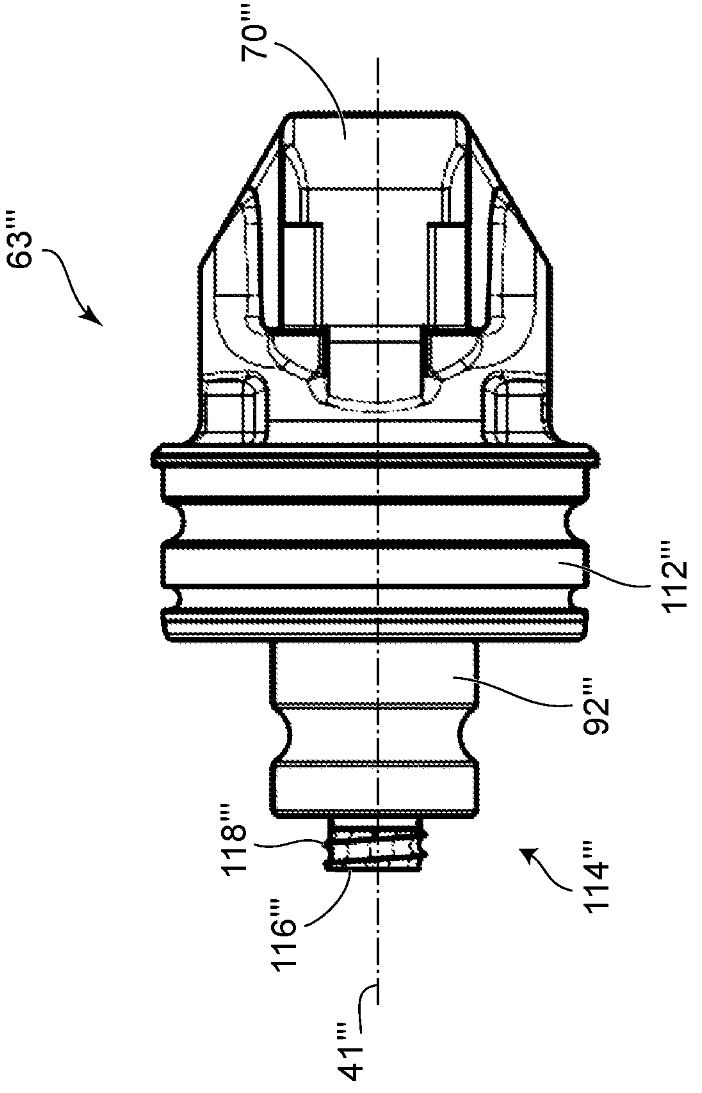
FIG. 22 shows a side sectional view of the end connector of FIG. 21.
Figure 23A:
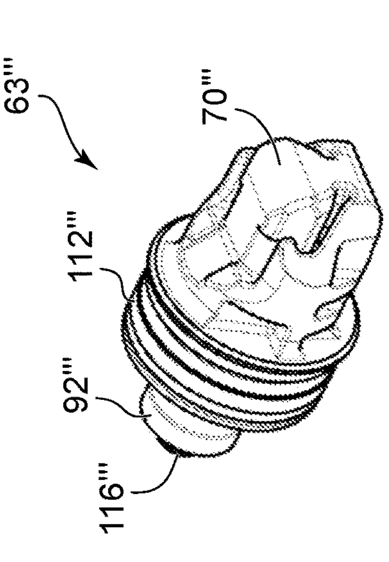
FIG. 23*a, b, c, d* are perspective views of embodiments of the end connector of FIG. 22.
Figure 23B:
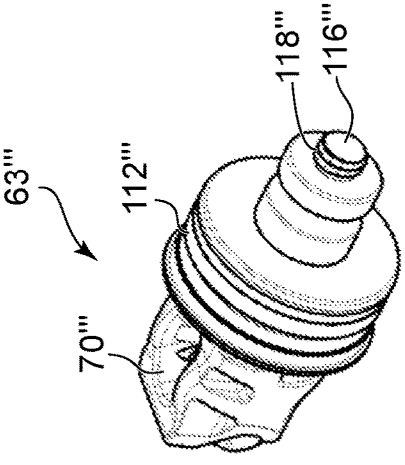
Figure 23C:
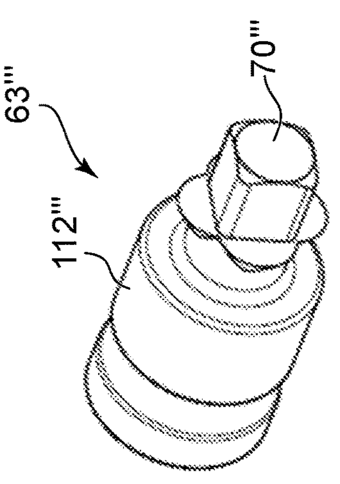
Figure 23D:
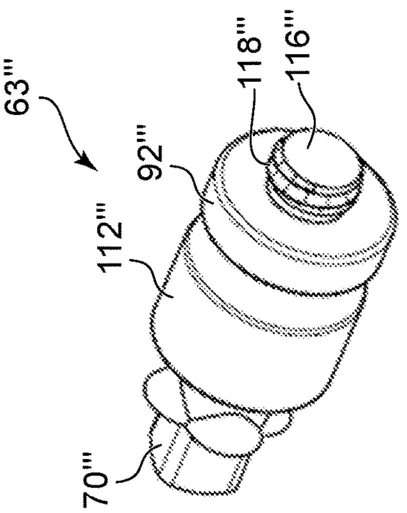

Referring to FIG. 22, shown is a receiving portion 116''' (e.g. male connector) of the endcap 92''' having threads 118''' (e.g. threading) for coupling with a surface 120''' (e.g. of the coil, internal by example—see FIG. 21) of the resilient element 66'''. It is also recognized that the surface 120''' could be configured as an external surface (not shown) and thus be compatible with the threads 118''' of the receiving portion 116''' (configured as a female connector—not shown). Referring to FIGS. 23*a, b, c, d*, shown are two example embodiments of the first connector 63''' in perspective views.

In view of the above, it is recognized that advantageously the threaded connection 114''' (e.g. threading the kicker spring coil 66''' with a thread 118''' on the ball socket 63'''—i.e. first connector) provides an improved coil connection compared to conventional press-fitted coil designs. It is recognized that the threaded connection 118''' can also provide for supporting the resilient element 66''' to have the resilient element 66''' displaced from the cover tube 82''' housing, which as a result less noise can be produced and the resilient element 66''' since the resilient element 66''' is preferably not in contact with any inner tubes (e.g. elongate member 40—see FIG. 6), the resilient element 66''' does not have to be flocked thereby inhibiting a costly step for springs which contact the sides of the tubes.

As shown by example in FIG. 21, during assembly the installer would screw the kicker spring (e.g. resilient element 66''') onto insert (e.g. end cap 92'''), press on the bushing (e.g. housing 112''') and then install on the end 62''' of the counterbalance mechanism 15''' (i.e. onto the cover tube 82''', thus positioning the end **66*b*''' of the resilient element 66''' adjacent to the distal end 54''' or travel member 45''' if so configured (or otherwise configured as a spacer 45'''). Once installed, operation of the resilient element 66''' can be used to assist in opening the closure panel 14''' when at full closed position, or provide a kick to the initial start of the opening of the closure panel 14 over a limited initial angle of opening to closure panel 14. It is also recognized that in order to facilitate screwing the end 66*a*''' of the resilient element 66''' onto the receiving portion 116''', the thread pitch of the threads 118''' can be appropriately sized (e.g. equal or otherwise configured for mating) to the wire diameter (e.g. internal) of the resilient element 66'''**.

In view of the above, due to vehicle environment, many counterbalance mechanism 15''' are packaged with low arm at starting point, as motors can have trouble to open the closure panel 14 (with small stall torque) without additional spring assistance. Therefore, adding a kicker spring 66''', at full closed position, can supplement the motor output. In the current art, used is a flocking kicker spring to assist opening lift gates, such that the flocking spring is press fit onto the end cap. This press fit design has a disadvantage of more cost and complexity over the resilient element 66''' with threaded connection 114'''. Further, as shown in FIG. 21, the resilient element 66''' is spaced apart S from the wall 83''' of the support tube 82''', thereby facilitating enough gap with surroundings components 80''' to inhibit the generation of contact related noise between adjacent components 80''' and the resilient element 66''' during operation of the counterbalance mechanism 15'''. During threading of spring 66''', the spring 66''' is self aligned by the engagement with the threads 118'''. Resilient element 66''' may therefore maintained in proper position by only threaded connection 114''' at one end of the resilient element 66'''.

Figure 24:
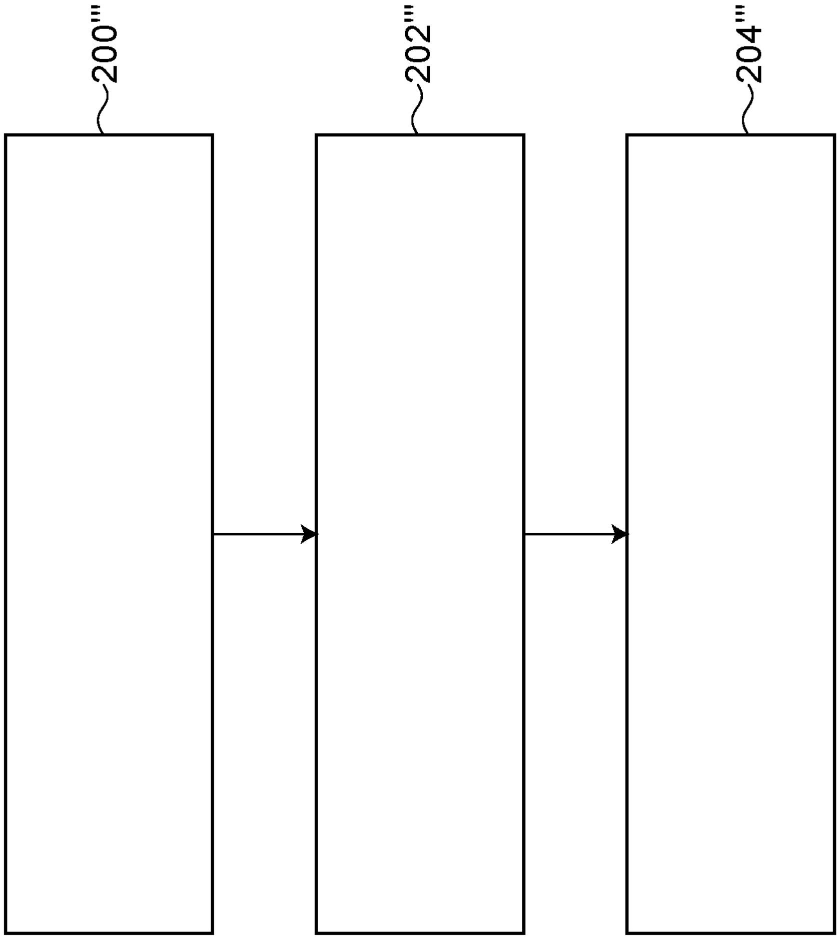
FIG. 24 is an example assembly and operation of the counterbalance mechanism of FIG. 2 equipped with the resilient element and an end connector of the counterbalance mechanism shown in FIG. 21.

Referring to FIG. 24, shown is a method for providing a counterbalance mechanism 15, such as counterbalance mechanism 15''', for a closure panel 14 of a vehicle 10 (see FIG. 1). At step 200''', providing a ball socket connection 63''' (e.g. second connector) for a counterbalance mechanism 15'''. At step 202''', providing the threaded connection 114''' on the ball socket (i.e. first connector 63'''). At step 204''', threading a coiled spring (e.g. resilient element 66''') on the threads 118''' to secure, and align, the coiled spring 66''' to the ball socket 63''', wherein when the kicker spring 66''' is not in contact with the inner surface 83''' of the support tube 82''' (provided as a housing) of the counterbalance mechanism 15''' when secured on the threads 118'''.

Now further referring to FIGS. 25A to 31, provided is a water shield 6'''' (see FIGS. 5, 9 and 26) for preventing the ingress of water into the interior of the biasing member 37 (e.g. a spindle) illustrated as biasing member 37'''' implemented as a strut (see 25A, 25B), which could optionally include the embodiments of counterbalance mechanism 15 described herein above, in addition to other types of counterbalances or spindles or struts, that can be used advantageously with vehicle closure panels 14 to provide for open and close modes (e.g. fail safe in the event of power actuator failure or disconnection), in particular for land-based, sea-based and/or air-based vehicles 10.

In general, the water shield 6'''' (see FIG. 26) can relate to a biasing member 37 (e.g. a spindle, counterbalance mechanism, etc.), and in particular a water sealing configuration for a spindle. The water shield 6'''' is provided on one end of an illustrative biasing member 37'''' (e.g. spindle) to enter into an overlapping arrangement with the outer tube (e.g. sliding tube 84''''—see FIG. 26) when the biasing member 37'''' is in a retracted position (see FIG. 25B), so as to inhibit water seeping into the interior 64 (see FIG. 2). For example water may be flowing downwardly towards the ground 9 under the force of gravity and overlapping water shield 6'''' extending downwardly towards the ground 9 deflects water way away from an opening in the outer tube 82''''. The water shield 6'''' can act as a type of umbrella to deflect or guide water away from this interface between the inner tube (i.e. the cover tube 82''''—see FIG. 27) and outer tube (i.e. the sliding tube 84''''—see FIG. 6).

Figure 27:
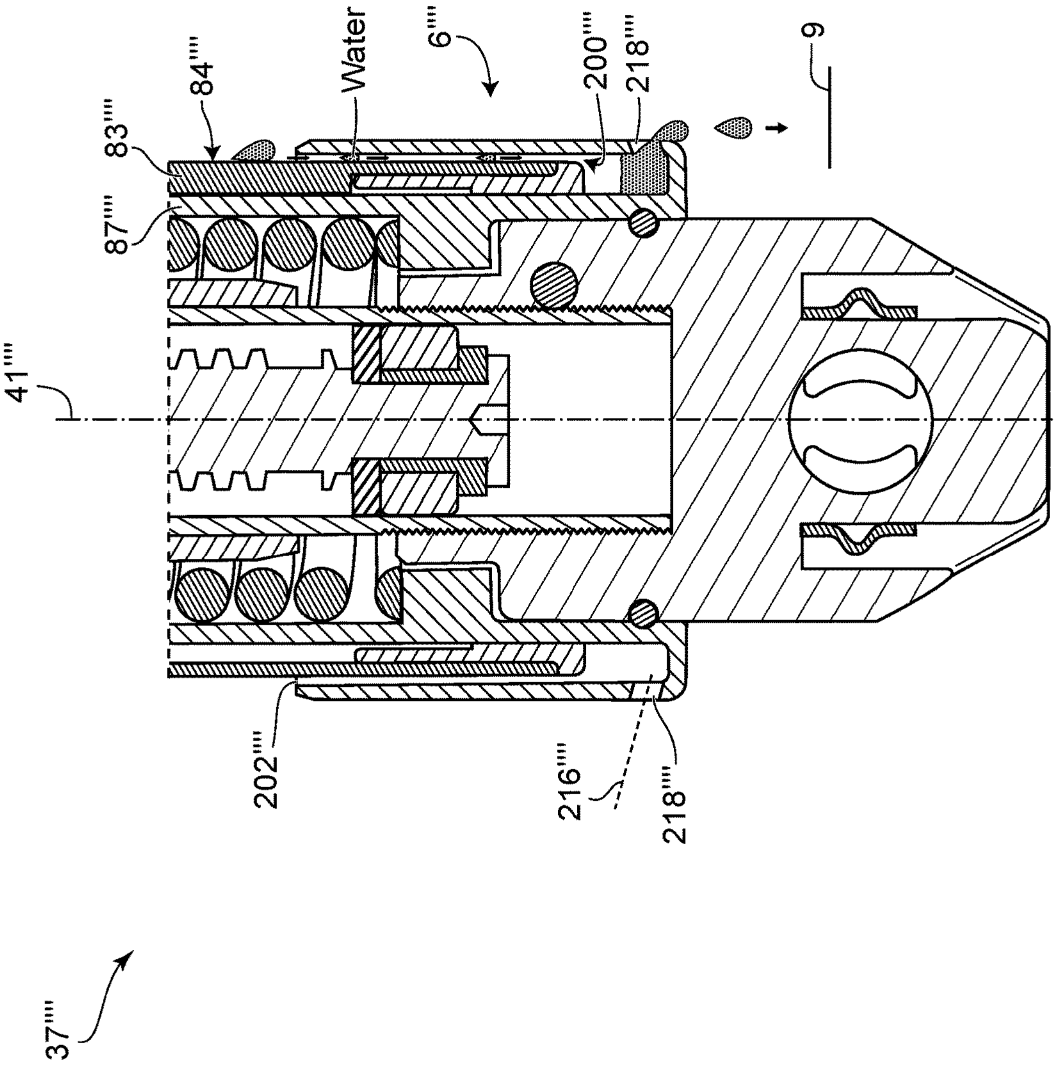
FIG. 27 is a cross sectional view of an assembled water shield of the biasing member of FIG. 1 in an upside down position.
Figure 28:
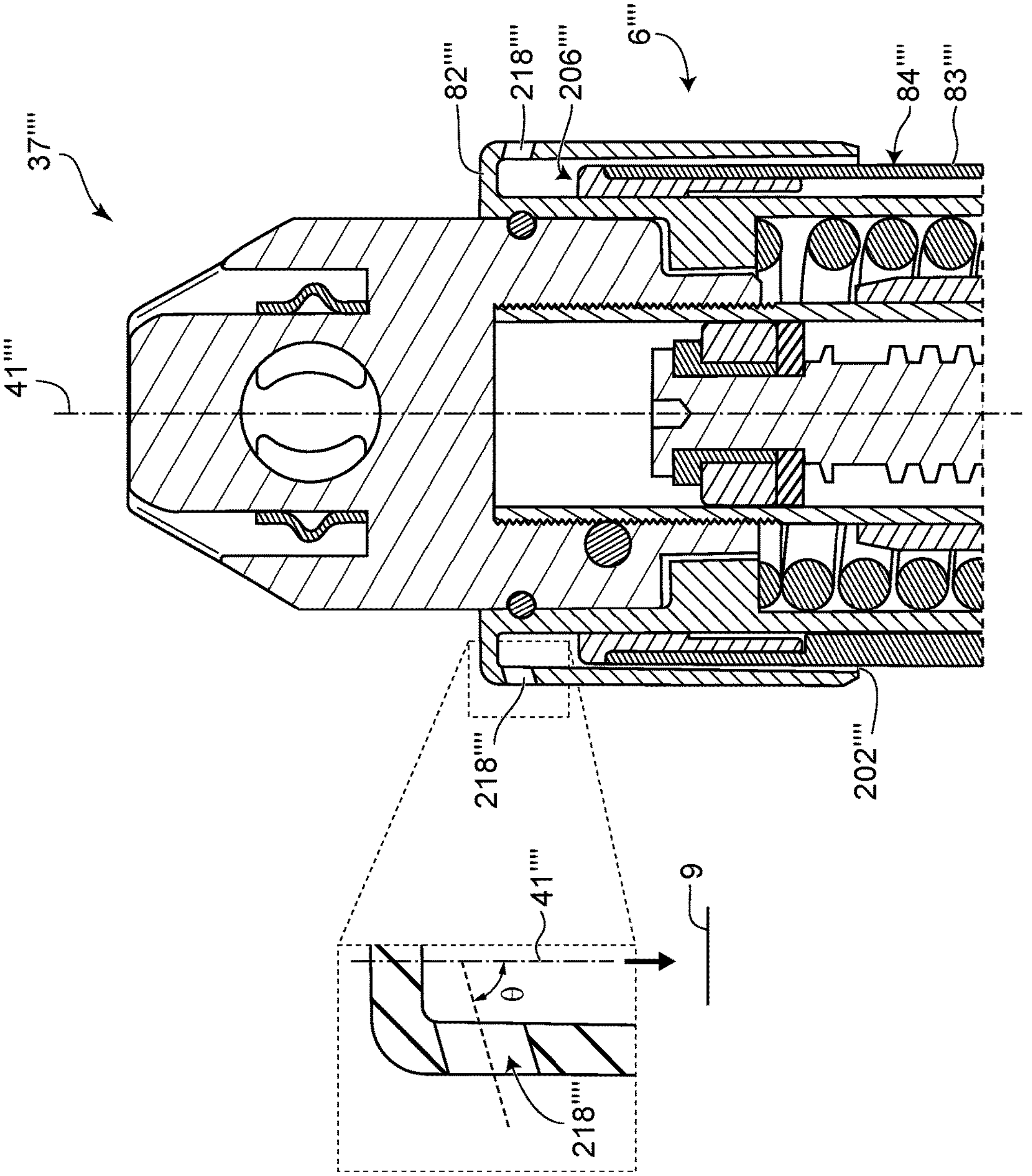
FIG. 28 is a cross sectional view of an assembled water shield of the biasing member of FIG. 1 in a right side up position.

Referring additionally to FIGS. 27 and 28, this type of configuration having the water shield 6'''' can be particularly useful for a biasing member 37'''' installed in an opposite sense than is conventional, where the small tube (e.g. inner/cover tube 82'''') is connected to the body 11 and the large tube (e.g. outer/sliding tube 82'''') to the lift gate (i.e. closure panel 14), or generally a mounting whereby in a retracted position of the biasing member 37'''', a lip 200'''' of the outer tube 82'''' would be facing upwards when the closure panel 14 is in the closed position which would act to collect water dripping down the inner tube 84 and/or continue downwards on the inner tube 84'''' into the interior 64'''' of the biasing member 37 (see FIGS. 2 and 6 by example).

In the conventional configuration when the closure panel 14 is in the closed position, the outer tube 82"" would be positioned above the inner tube 84"" (lip 200"" facing downwards—see FIG. 28) and for example towards the ground 9 such that water would not be able to creep up the inner tube 82"" as it passes over the lip 200"" of the outer tube 84"".

In comparison to the herein described configuration of the water shield 6"", compared to U.S. Pat. Nos. 9,689,188, 9,689,188 describes a cap to seal between tubes when in a retracted position with respect to one another, as the material of the cap engages with the tube surface(s). In comparison with the caps described therein, the water shield 6"" of the present disclosure does not engage, and remains spaced apart from the surface 83"" of the outer tube 84"" tube via gap 202" (see FIG. 26), this way inhibiting any wear/deformation of the water shield 6"" over retract/expand cycling. U.S. Pat. No. 9,689,188 clearly teaches a conventional seal between the tubes can be eliminated if you use a sealing cap, however, this is considered problematic since due to wear or deformation of the rubber cap e.g. causing improper seal, there is no additional sealing to prevent water infiltration. As described the water shield 6"" helps to maintain a water infiltration seal (i.e. inhibiting infiltration of water between the tubes 82"", 84""), while providing a water shield 6"" that limits wear or deformation over time in view of the provided gap 202"".

Referring again to FIG. 26, the water shield 6"" may be configured such that the water shield 6"" has a main body 206"" extending from an end 208"" of the inner tube 82"" and along the longitudinal axis 41"" between the two ends 60"", 62"" of the biasing member 37"". In particular, the main body 206"" has an overlap portion 210"" which overlaps a portion 212"" of the surface 83"" adjacent to the end 60"", when the biasing member 37"" is in the closed or retracted position (see FIG. 25B). As discussed above, it is recognized that the main body 206"" is spaced apart from the surface (i.e. exterior) 83"" of the outer tube 84"" by the gap 202"", in order to inhibit contact between the main body 206"" and the outer tube 84"" during operation of the biasing member 37"". The main body 206"" is connected by a connection portion 207"" adjacent to the end 208"" of the inner tube 82"". Further, optionally the water shield 6"" can have 218"" in the main body 206"" in order to account for drainage of water that has collected in the gap 202"" between the main body 206"" and the inner tube 82"" and/or the outer tube 84"". The main body 206"" may be directly or indirectly connected to the first connector 61"", or to the inner tube 82"", as examples.

Figure 29B:
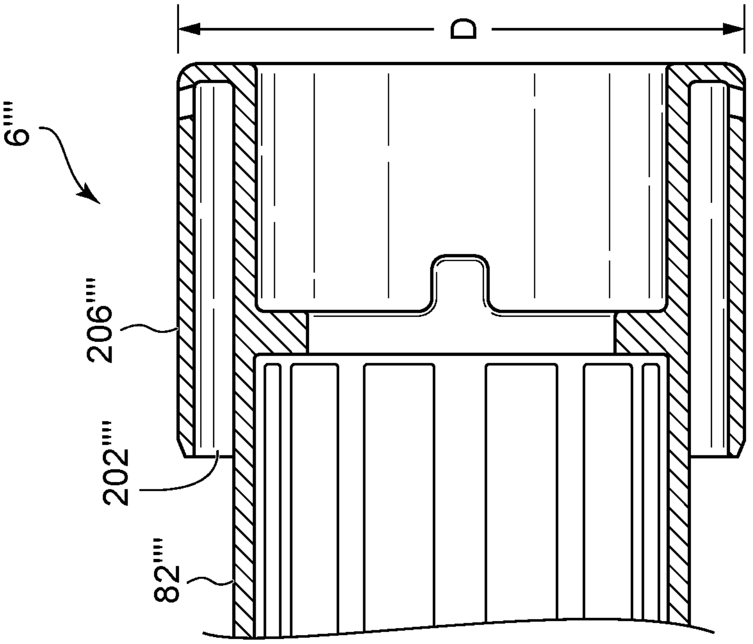
FIGS. 29A and 29B show views of a further embodiment of the water shield of FIG. 26.
Figure 29A:
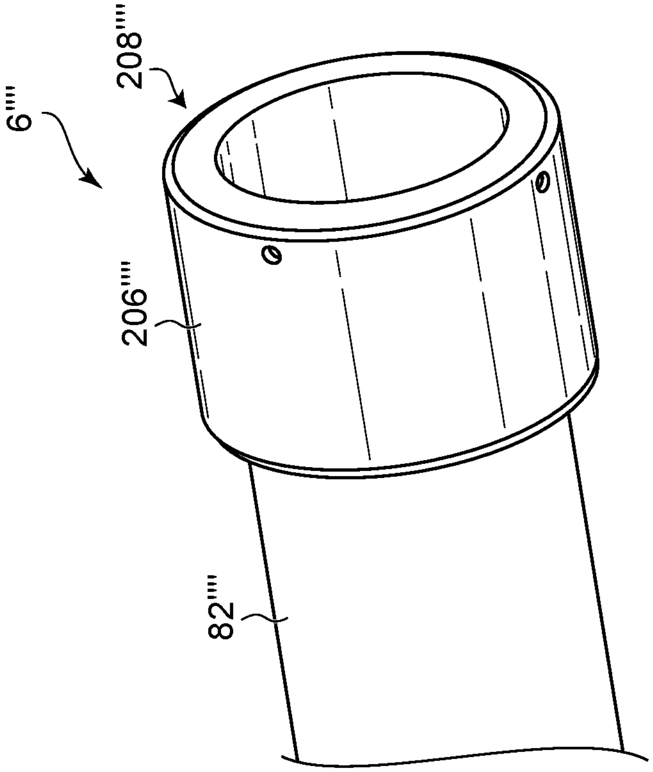

Referring to FIGS. 29A and 29B shown is an embodiment of the water shield 6"", such that the main body 206"" is integral (i.e. one piece) with the end 208"" of the inner tube 82"". Referring again to FIGS. 27 and 28, the main body 206"" has one or more apertures 218"" facilitating drainage of water positioned between the main body 206"" and at least one of the inner tube 82"" and the outer tube 84"". The one or more apertures 218"" can be oriented at an angle to inhibit water from entering the gap 202"", as shown.

Figure 30A:
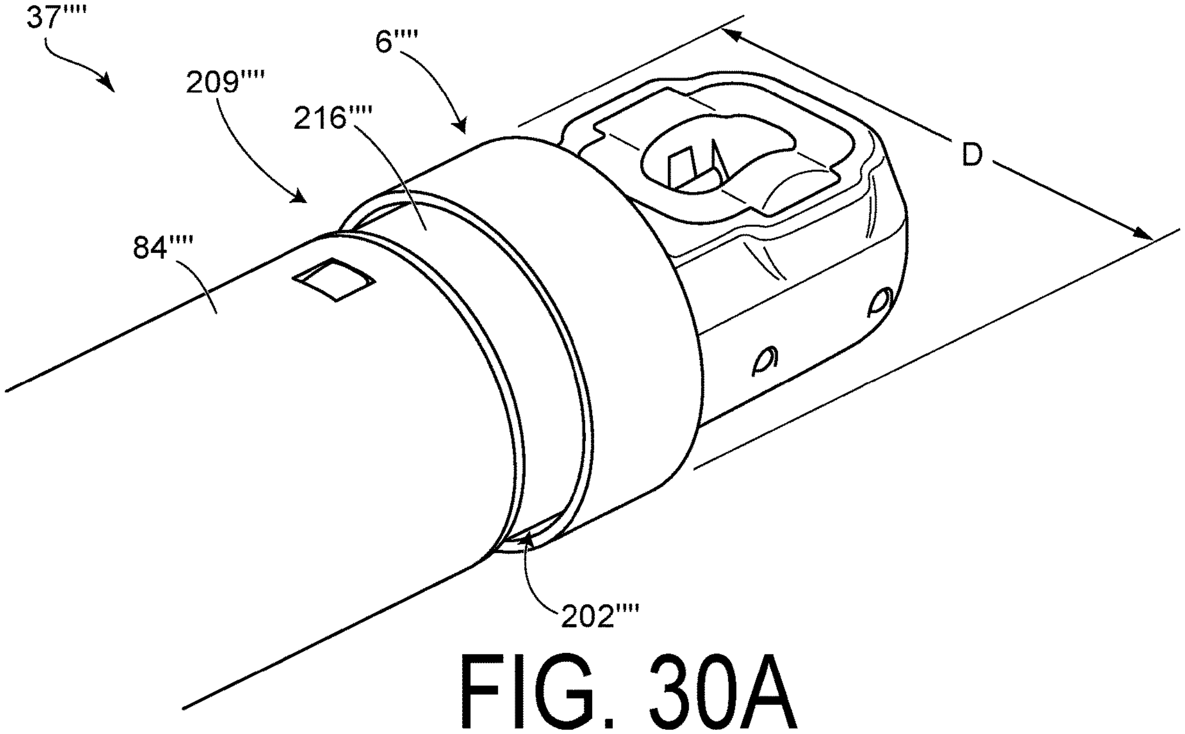
FIGS. 30A and 30B shows a further embodiment of the water shield of FIG. 26 when the biasing member is in a closed position.
Figure 30B:
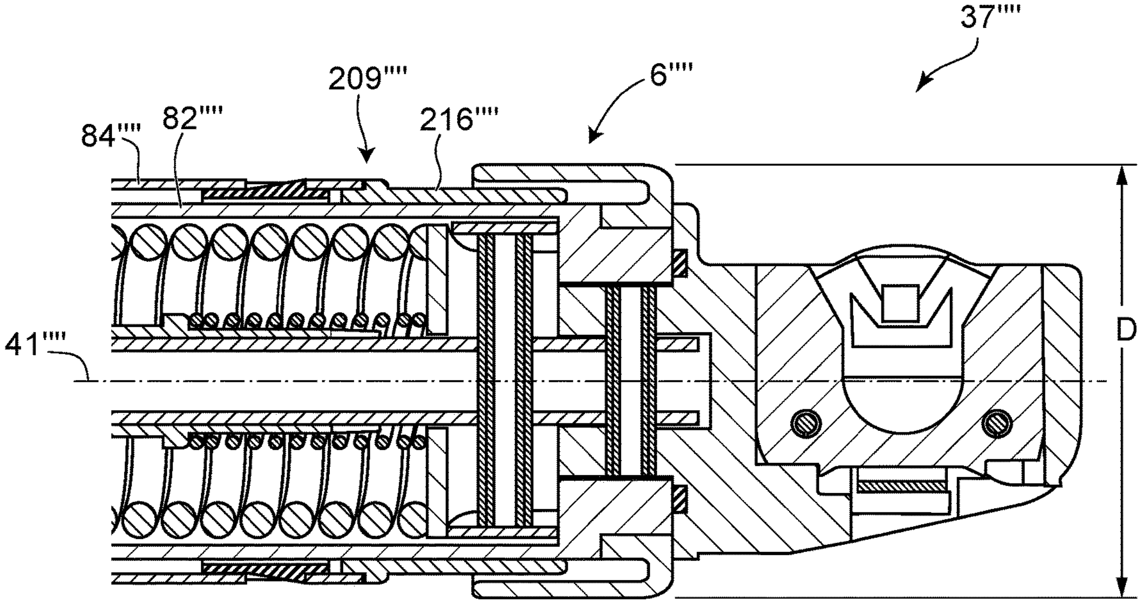

Referring to FIGS. 30A, 30B, shown is an embodiment of the water shield 6"", such that the outer tube 84"" has connected at its end 209"" an extension section 216"" running along the longitudinal axis 41"", such that the extension section is closer to the inner tube 82"" than a wall of the outer tube 84"". In this manner, the gap 202"" can be accommodated for without needing to overly increase the overall diameter D of the biasing member 37"" (as compared to the relatively larger diameter D for the embodiment shown in FIGS. 29A and 29B without the extension section 216""). Therefore in order to account for this gap 202"" between the outer tube 84"" and water shield 6"", which could increase the overall diameter D of the biasing member 37"" (which is not desirable, the end bushing (e.g. extension section 216"") is coupled with the outer tube 84"" extends such that the water shield 6"" overlaps this end bushing (e.g. extension section 216"") when the biasing member 37"" is in the retracted state/position (see FIG. 25B).

Figures 25A, 25B:
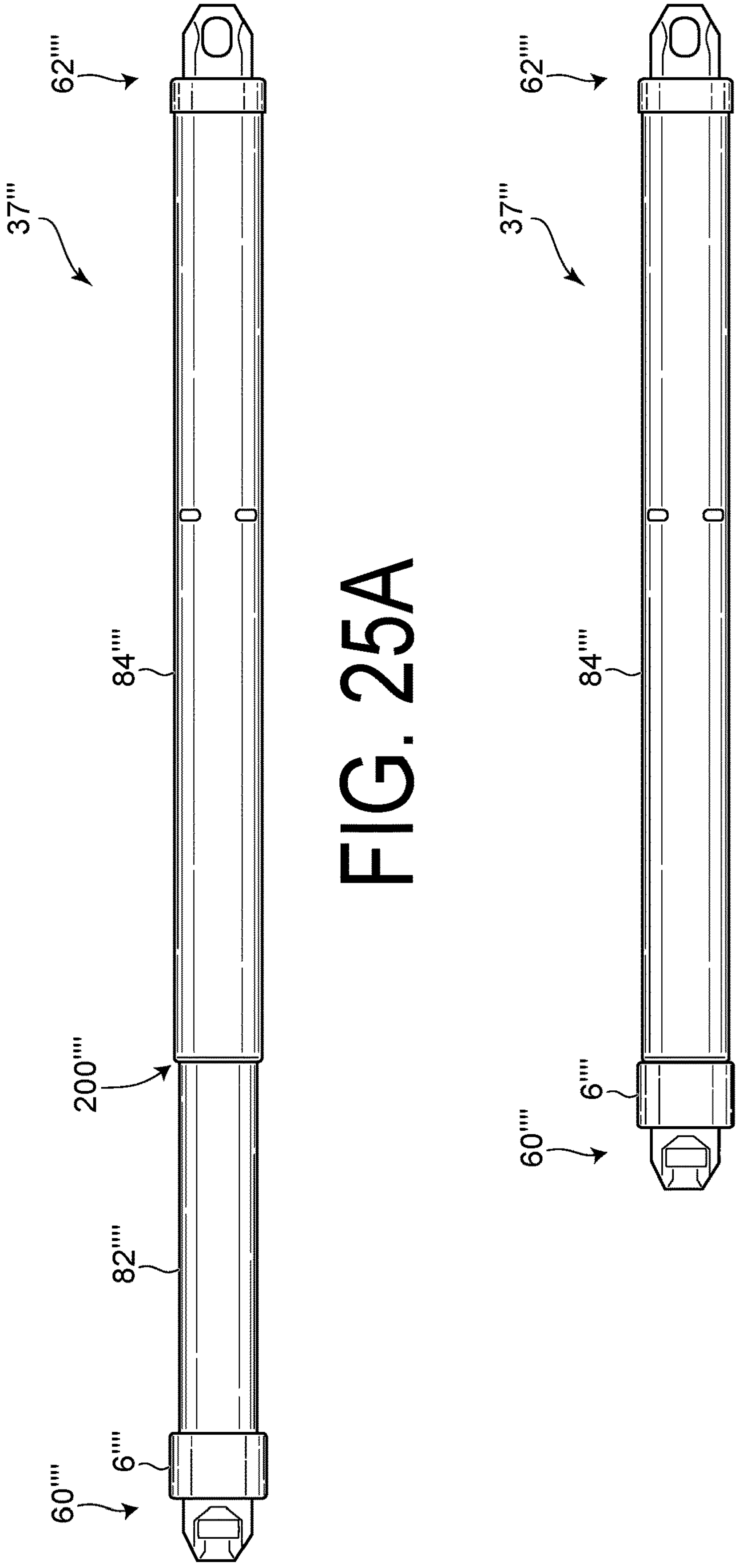
FIGS. 25A and 25B show a further embodiment of a biasing member of FIG. 2 in extended and retracted positions, respectively.
Figure 26:
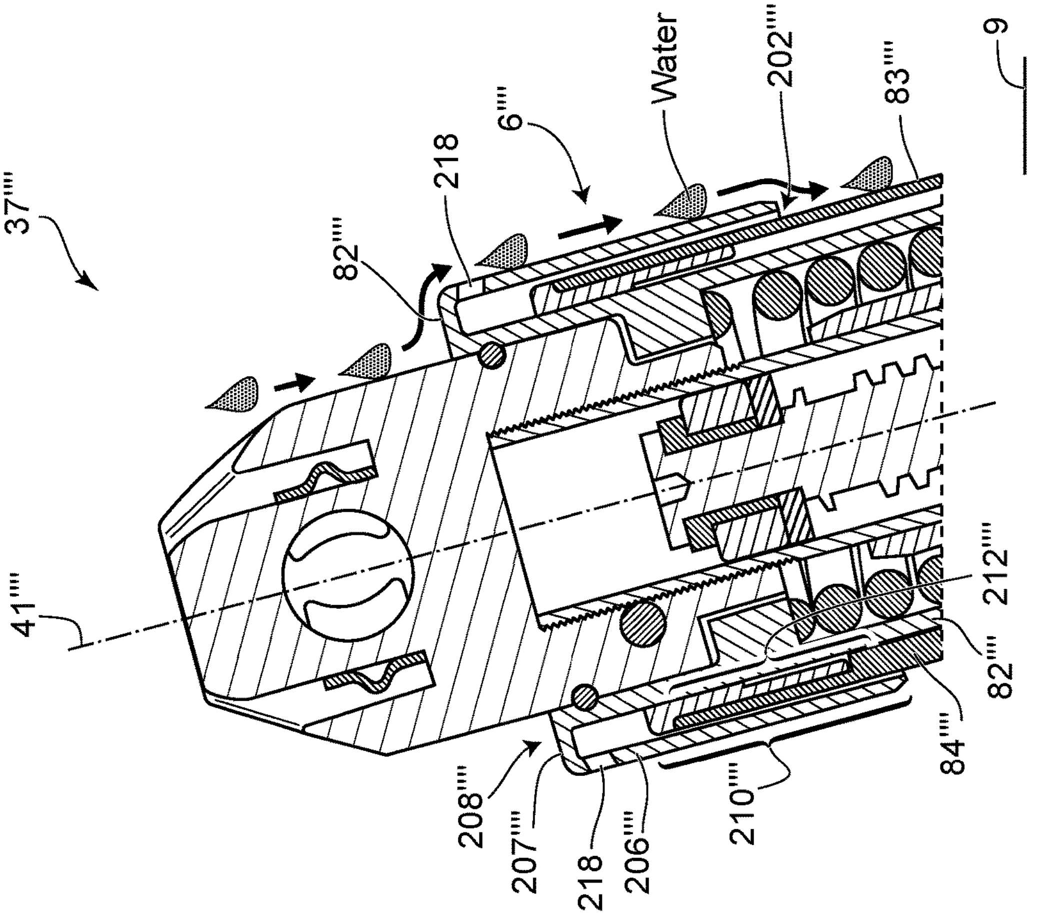
FIG. 26 is a cross sectional view of an assembled water shield of the biasing member of FIG. 1.
Figure 31A:
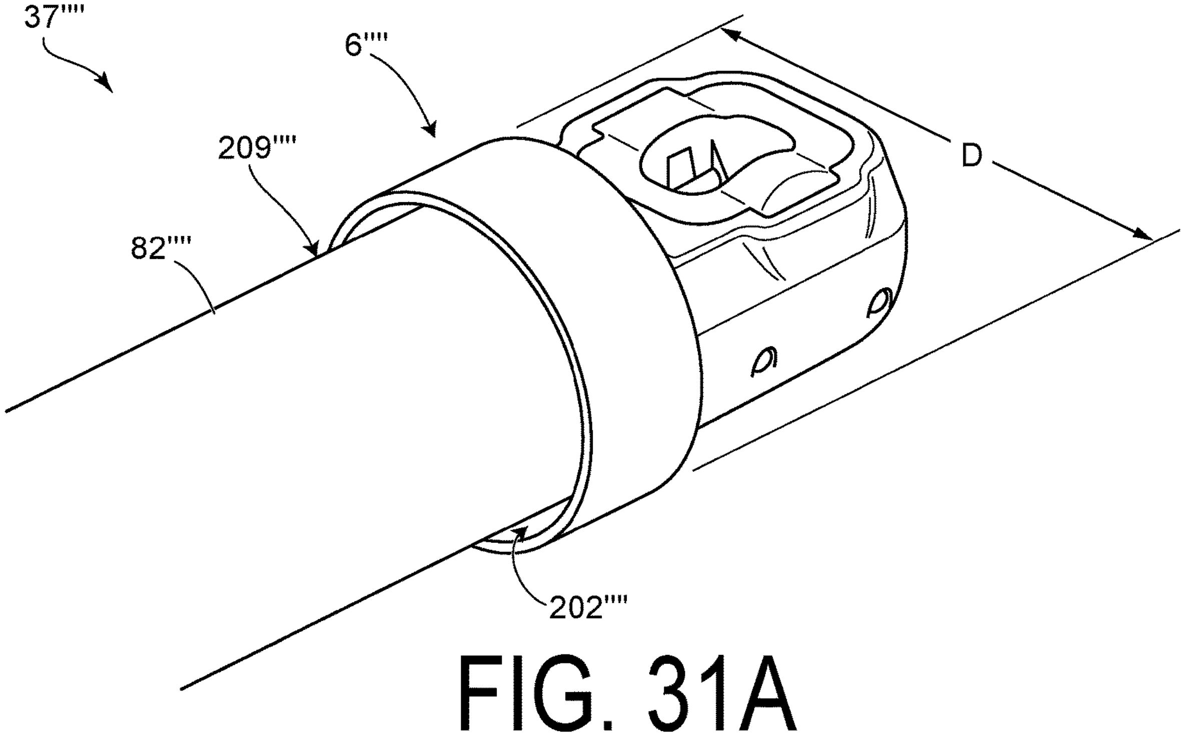
FIGS. 31A and 31B show a further embodiment of the water shield of FIG. 26 when the biasing member is in an open position.
Figure 31B:
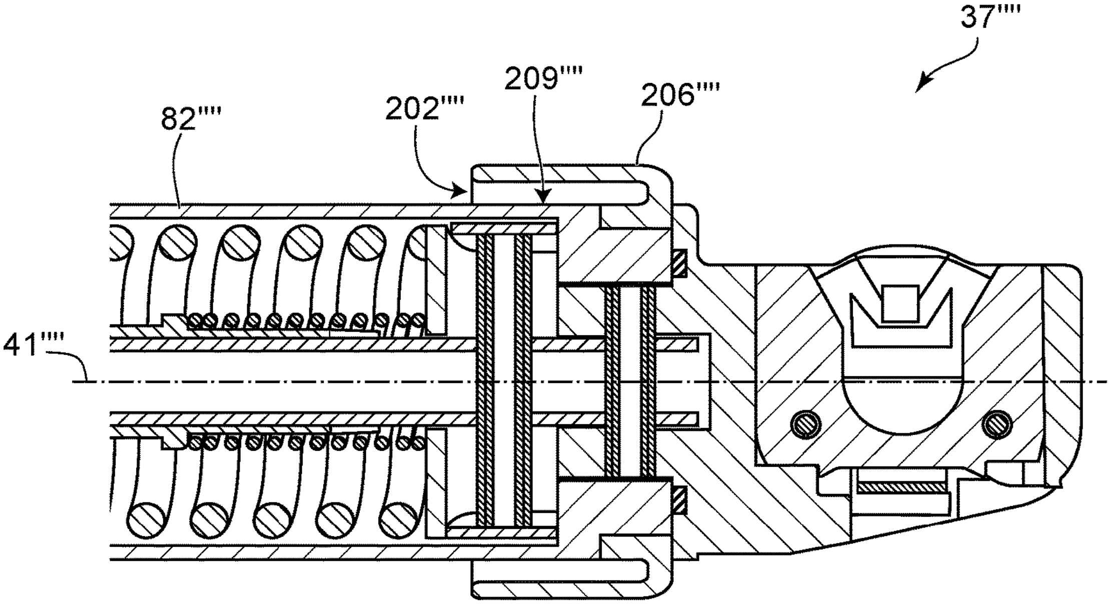

Referring to FIGS. 31A, 31B, and FIG. 9 shown is an embodiment of the water shield 6"", such that the outer tube 84"" has connected at its end 209"" without an extension section 216"" such that the water shield 6"", overlaps with the wall of the outer tube 84"" when the biasing member 37"" is in the retracted state/position (see FIG. 25B).

Figure 32:
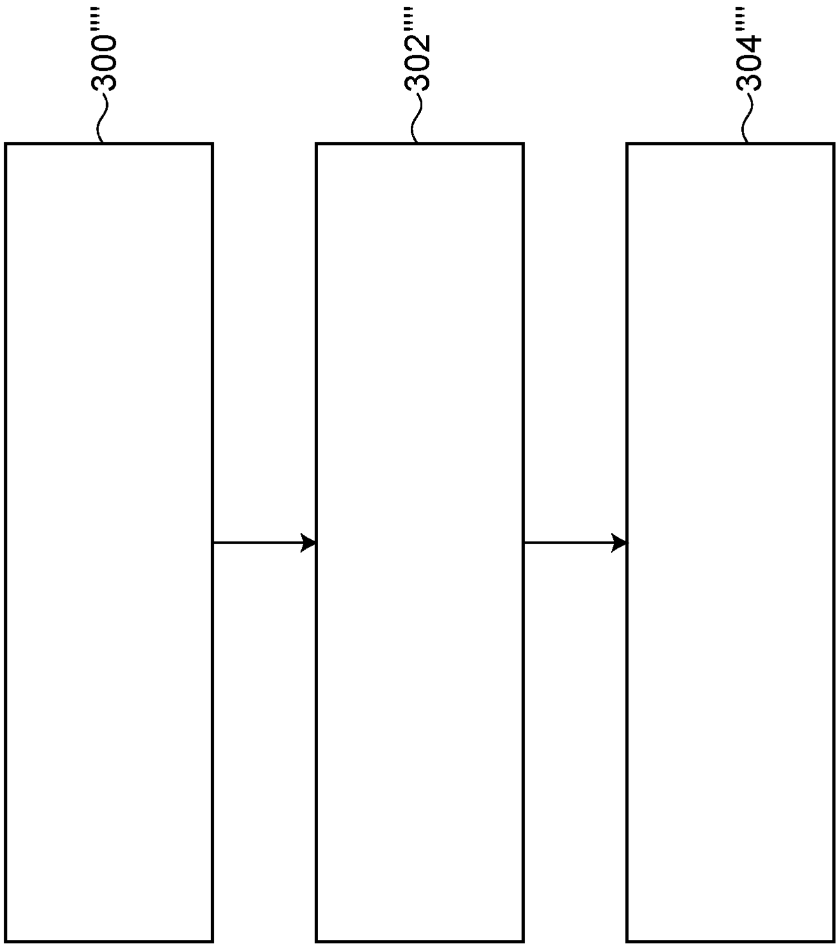
FIG. 32 is an example method for the water shield of FIG. 26.

Referring to FIG. 32, shown is a method for providing a water shield 6"" for a biasing member 37"" of a closure panel 14 of a vehicle 10, the method including the steps of providing 300"" a housing 59"" coupled at one end 60"" to one of the closure panel 14 and a body 11 of a vehicle 10 and at another end 62"" to the other of the body 11 and the closure panel 14, the housing 59"" having an inner tube 82"" positioned adjacent to an outer tube 84"", such that the outer tube 84"" extends and retracts along a longitudinal axis 41"" with respect to the inner tube 82"" during operation of the biasing member 37"". At step 302"", providing the water shield 6"" connected adjacent to the end 208"" of the inner tube 82"", such that an overlap portion 210"" of the water shield 6"" overlaps with a portion 212"" of an exterior surface 83"" of the outer tube 84"" when the outer tube 84"" is in a retracted position with respect to the inner tube 82"". At step 304"", implementing the extension and retraction along the longitudinal axis 41"" while maintaining a gap 202"" between the exterior surface 83"" and the water shield 6"" in order to inhibit contact between the water shield 6"" and the exterior surface 83"" during the operation of the biasing member 37"".

In terms of the watershield 6"", a biasing member 37"" for coupling with a closure panel 14 to assist in opening and closing of the closure panel between a fully closed position and a fully open position of the closure panel, the biasing member including: a housing 59"" coupled at one end 60"" to one of the closure panel and a body 11 of a vehicle 10 by a first connector 61 and at another end 62"" by a second connector 63"" to the other of the body and the closure panel, the housing having an inner tube 82"" positioned adjacent to an outer tube 84"", such that outer tube extends and retracts along a longitudinal axis 41"" with respect to the inner tube during operation of the biasing member; and a water shield connected adjacent to an end 208"" of the inner tube, such that an overlap portion 210"" of the water shield overlaps with a portion 212"" of an exterior surface 83"" of the outer tube when the outer tube is in a retracted position with respect to the inner tube, the water shield spaced apart by a gap 202"" from the exterior surface to inhibit contact between the water shield and the exterior surface during said operation of the biasing member.

The biasing member includes a counterbalance mechanism 15.

The biasing member such that the water shield has a main body 206"" connected to the end of the inner tube by a connection portion 207"", such that the main body projects along the longitudinal axis and the connection portion projects transverse to the longitudinal axis.

The biasing member such that the main body has one or more apertures 218"" facilitating drainage of water positioned between the main body and at least one of the inner tube and the outer tube.

The biasing member such that the one or more apertures are oriented at an angle to inhibit water from entering the gap.

The biasing member such that the main body and the connection portion are integral with the inner tube.

The biasing member further comprising an extension section 216"" connected at an end 209"" of the outer tube 84"", the extension section running along the longitudinal axis, such that the extension section is closer to the inner tube than the outer tube 84"".

The biasing member such that the main body of the water shield overlaps the extension section when the biasing member is in the retracted position.

Further provided can be a method for providing a water shield for a biasing member of a closure panel of a vehicle, the method including the steps of: providing a housing coupled at one end to one of the closure panel and a body of a vehicle and at another end to the other of the body and the closure panel, the housing having an inner tube positioned adjacent to an outer tube, such that outer tube extends and retracts along a longitudinal axis with respect to the inner tube during operation of the biasing member providing a water shield connected adjacent to an end of the inner tube, such that an overlap portion of the water shield overlaps with a portion of an exterior surface of the outer tube when the outer tube is in a retracted position with respect to the inner tube; and implementing said extends and retracts along the longitudinal axis while maintaining a gap between the exterior surface and the water shield in order to inhibit contact between the water shield and the exterior surface during said operation of the biasing member.

Further provided is a closure panel system for a motor vehicle having a closure panel moveable relative to a vehicle body between a fully closed position and a fully open position, the closure panel system comprising: a biasing member 37 for coupling with the closure panel 14 to assist in opening and closing of the closure panel between the fully closed position and the fully open position, the biasing member including: a housing 59"" coupled at one end 60"" to one of the closure panel and the body 11 of a vehicle 10 by a first connector 61"" and at another end 62"" by a second connector 63"" to the other of the body and the closure panel, the housing having an inner tube 82"" positioned adjacent to an outer tube 84"", such that outer tube extends and retracts along a longitudinal axis 41"" with respect to the inner tube during operation of the biasing member; and a water shield connected adjacent to an end 208"" of the inner tube, such that an overlap portion 210"" of the water shield overlaps with a portion 212"" of an exterior surface 83"" of the outer tube when the outer tube is in a retracted position with respect to the inner tube, the water shield spaced apart by a gap 202"" from the exterior surface to inhibit contact between the water shield and the exterior surface during said operation of the biasing member; wherein when the closure panel is in the fully closed position and the outer tube is in the retracted position, the overlap portion extends downwardly.

Further provided is a water shield for a biasing member for coupling with the closure panel 14 to assist in opening and closing of the closure panel between a fully closed position and a fully open position, the biasing member comprising an outer tube extendable and retractable along a longitudinal axis 41"" with respect to the inner tube during operation of the biasing member, the water shield comprising: a main body 206"" connectable adjacent to an end 208"" of an inner tube of the biasing member; and an overlap portion 210"" extending from the main body for overlapping with a portion 212"" of an exterior surface 83"" of the outer tube when the outer tube is in a retracted position with respect to the inner tube, the overlap portion defining a gap 202"" from the exterior surface to inhibit contact between the overlap portion and the exterior surface during said operation of the biasing member.

We claim:

1. A counterbalance mechanism for coupling with a closure panel to assist in opening and closing of the closure panel between a closed position and an open position of the closure panel, the counterbalance mechanism including:

a housing coupled at a first end to one of the closure panel and a body of a vehicle by a first connector and at a second end by a second connector to the other of the body and the closure panel, the housing containing an extension member and a spring positioned along a longitudinal axis, the spring positioned adjacent to the first connector;

the first connector having a first connector body with a connection portion coupled by a connection to the first end of the housing; and a spring retention mechanism positioned between the spring and the first end for inhibiting extension of the spring out of the first end of the housing upon decoupling of the connection portion with the first end.

2. The counterbalance mechanism of claim 1, wherein the connection is a crimp connection between the housing and the connection portion.

3. The counterbalance mechanism of claim 1, wherein the connection is a shear connection comprising a hole in the connection portion aligned with a hole in the extension member, such that a shear pin is positioned in the holes.

4. The counterbalance mechanism of claim 3, wherein the spring retention mechanism is configured to fail by disconnection of a retaining pin from the extension member after disconnection of the shear pin from the extension member.

5. The counterbalance mechanism of claim 1 further comprising a body of a spring retainer having a main body, an aperture and an extension portion, such that the main body is oriented transverse to the longitudinal axis, the main body is connected to the extension portion which extends along the longitudinal axis between the main body and the first end, and the aperture allows the extension member to pass there through; wherein the spring acts against the main body and biases the extension portion into contact with the first end.

6. The counterbalance mechanism of claim 5, wherein biasing the extension portion into contact with the first end compresses a seal positioned between the main body and the first end.

7. The counterbalance mechanism of claim 1, wherein the first connector body is a ball joint.

8. The counterbalance mechanism of claim 1, wherein the first connector body is a ball socket.

9. The counterbalance mechanism of claim 1, wherein the spring retention mechanism has a predisposed failure point greater than a predisposed failure point of the connection portion.

10. The counterbalance mechanism of claim 1, wherein the is housing comprises a sliding tube, and wherein the connection is a crimp connection with the sliding tube.

11. The counterbalance mechanism of claim 1, wherein the housing comprises a sliding tube, and wherein the connection is a shear connection comprising a hole in the connection portion aligned with a hole in the extension member, such that a shear pin is positioned in the holes.

12. The counterbalance mechanism of claim 1, wherein the spring retention mechanism has a spring retainer which acts as a bypass around a retainer pin in order to couple a bias of the spring to act against the first end.

* * * * *